(12) United States Patent
Toyoda et al.

(10) Patent No.: US 6,474,880 B2
(45) Date of Patent: Nov. 5, 2002

(54) SHUTTER DEVICE

(75) Inventors: Yasuhiro Toyoda, Ohmiya; Akira Tomitaka, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/731,277

(22) Filed: Dec. 6, 2000

(65) Prior Publication Data

US 2001/0003559 A1 Jun. 14, 2001

(30) Foreign Application Priority Data

Dec. 10, 1999 (JP) .......................................... 11-351753
Dec. 20, 1999 (JP) .......................................... 11-361856

(51) Int. Cl.[7] ................................................. G03B 9/40
(52) U.S. Cl. ....................................... 396/486; 396/488
(58) Field of Search ................................. 396/483, 484, 396/489, 492, 486

(56) References Cited

U.S. PATENT DOCUMENTS 3,834,802 A * 9/1974 Kitai et al. .................. 396/486
4,714,336 A * 12/1987 Suzuki ........................ 396/492
4,975,722 A * 12/1990 Suzuki et al. ............... 396/484
5,159,371 A * 10/1992 Fukadu ....................... 396/492
5,875,368 A * 2/1999 Hasuda et al. .............. 396/484

* cited by examiner

Primary Examiner—Christopher Mahoney
(74) Attorney, Agent, or Firm—Robin, Blecker & Daley

(57) ABSTRACT

A shutter device with a shutter base plate having an aperture part and a protruding part. First and second shutter blade members are arranged to travel a predetermined movement distance and a distance shorter than the predetermined distance, respectively, over the aperture part. The second shutter blade member has a slot engaging the protruding part of the base plate. First and second arm members are pivotally supported by the shutter base plate and the second arm member supports the first and second shutter blade members in a swingable manner. The second arm member is also connected to the second shutter blade member, wherein the first shutter blade member and the second shutter blade member are caused to travel over the aperture part by the second arm being driven, 14 Claims, 39 Drawing Sheets

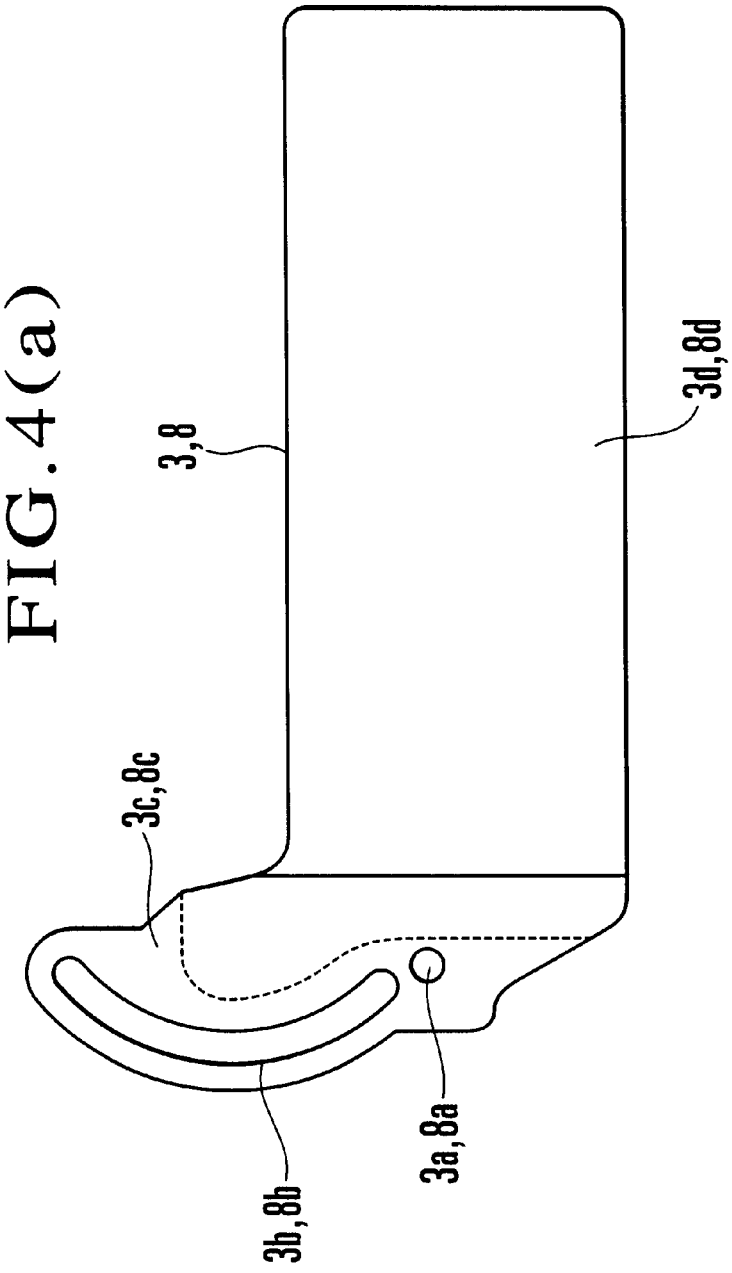
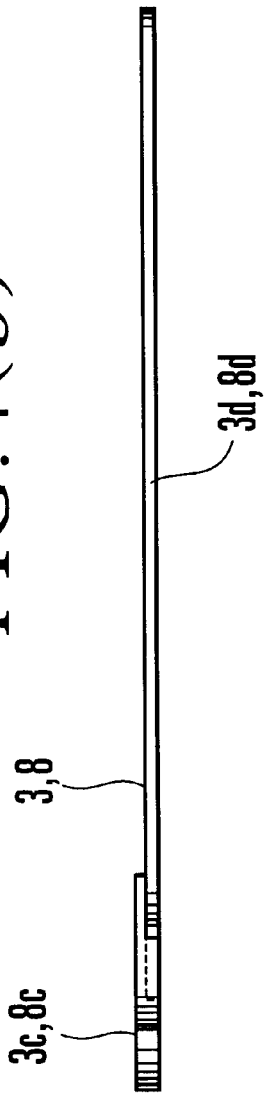

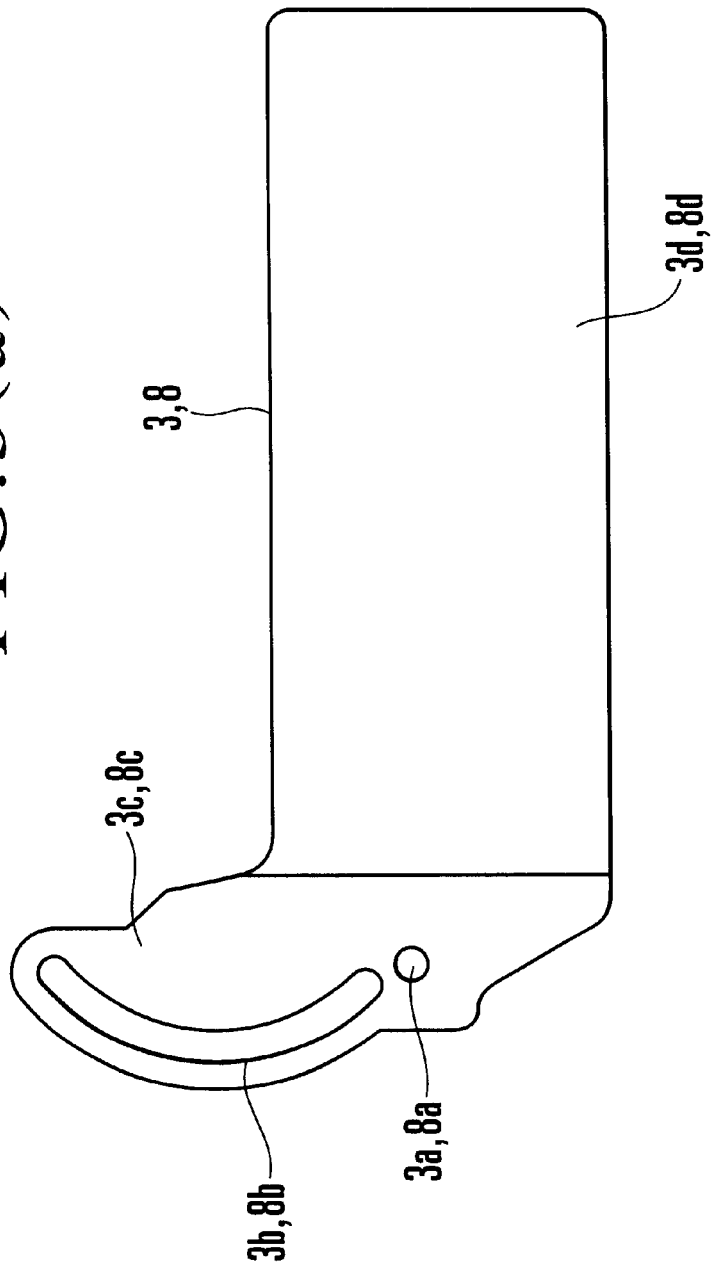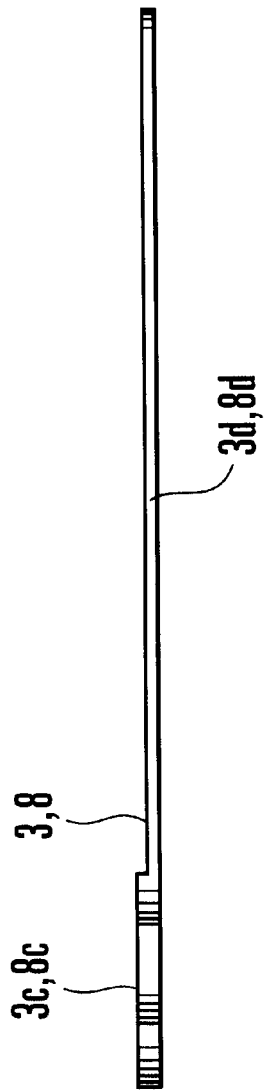

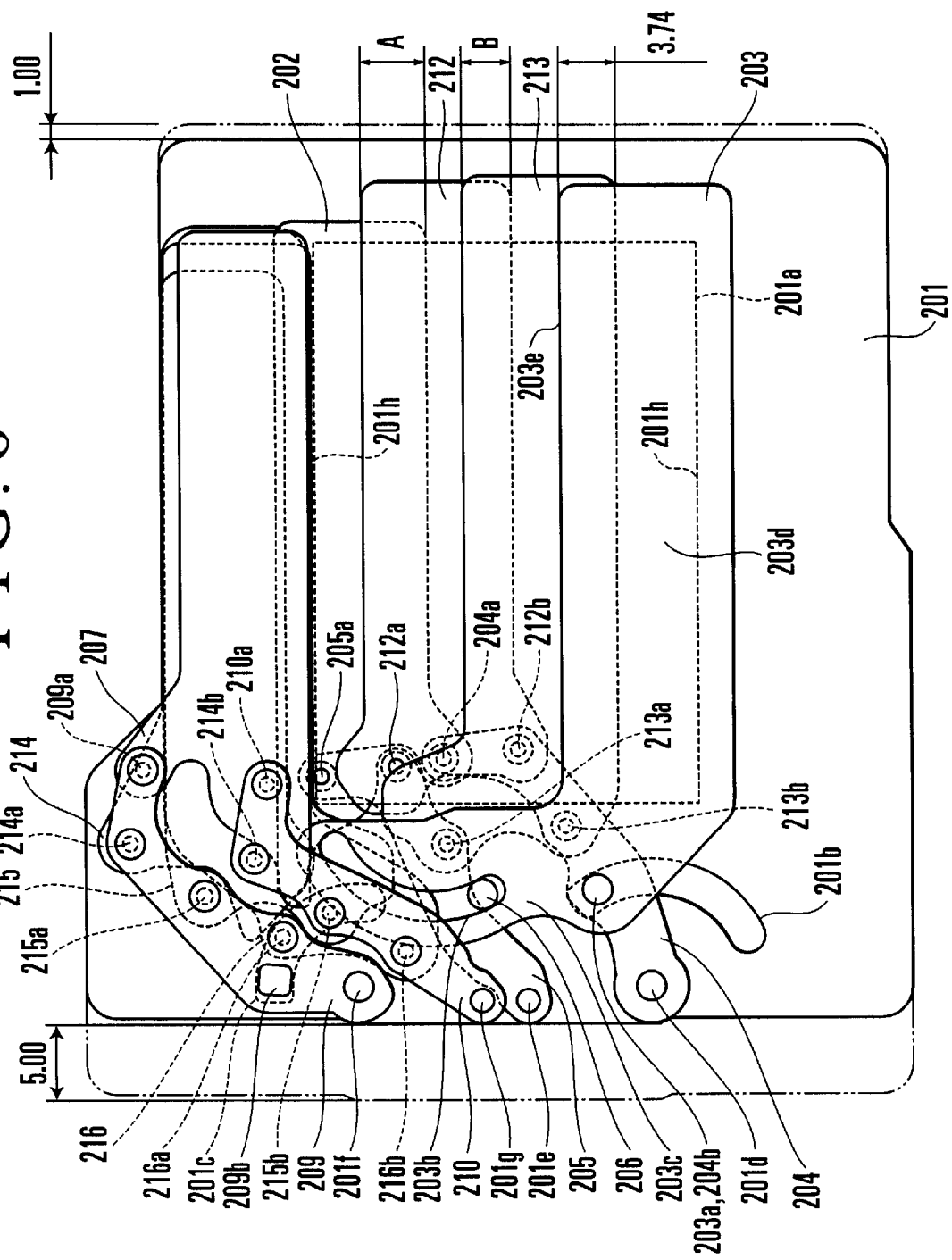

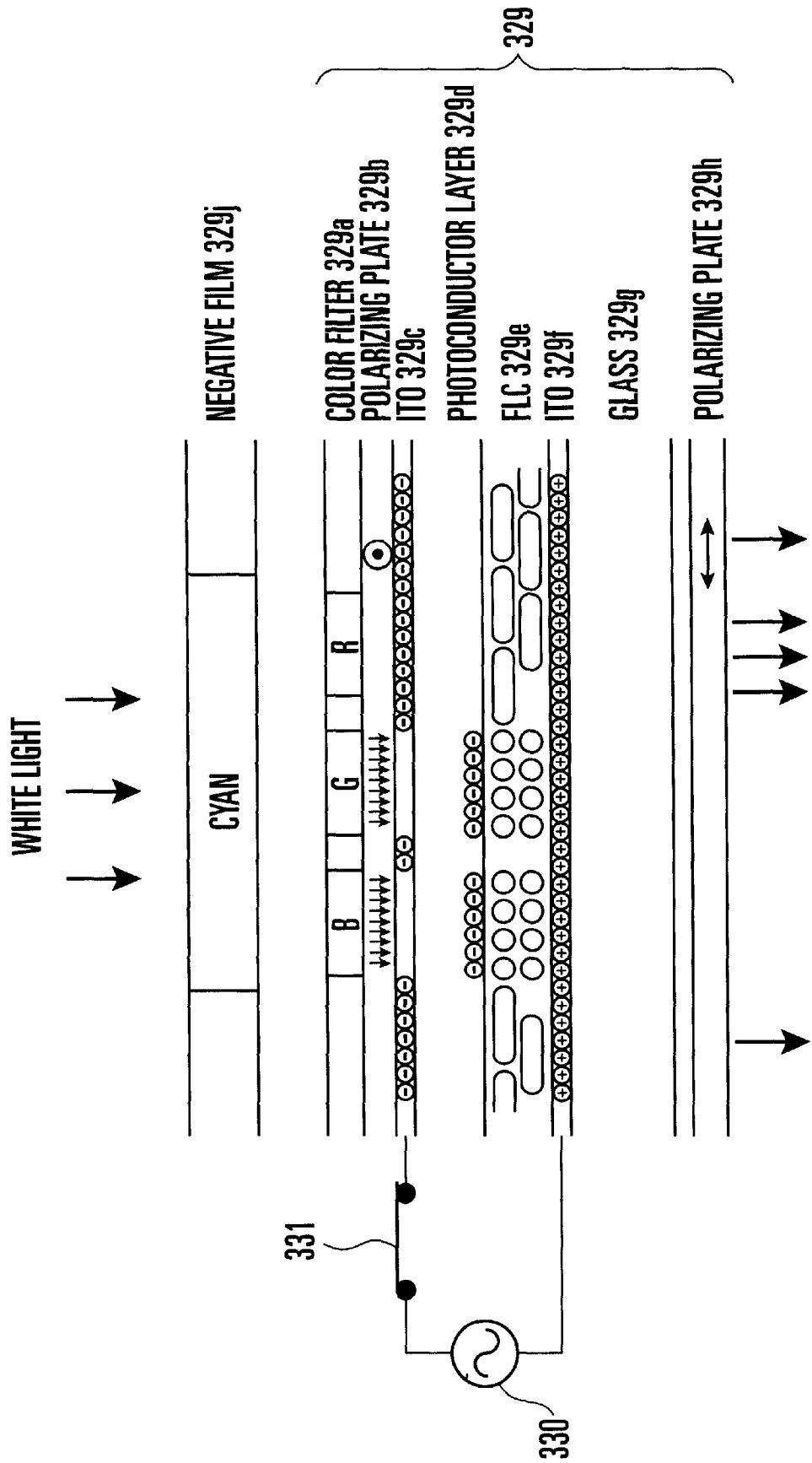

SHUTTER DEVICE

BACKGROUND OF THE INVENTION

1. Field of the Invention

The present invention relates to a shutter device of the split-blade type.

2. Description of Related Art

The mechanism of a focal plane shutter of the split-blade type is generally arranged as shown in FIGS. 38 to 40. Of these figures, FIG. 38 shows the shutter in a state having blades thereof ready to travel (a travel ready state). FIG. 39 shows the shutter in a state obtained while the blades are in process of making a slit exposure (a slit-exposure in-process state). FIG. 40 shows the shutter in a state obtained after completion of the travel of the blades (a travel completion state).

The focal plane shutter, which is shown in FIGS. 38 to 40 as a first example of the conventional arrangement, is composed of a shutter base plate 501 which is provided with a shutter aperture 501a, a first arm 504 and a second arm 505 which have their base end parts mounted on the shutter base plate 501 in such a way as to be swingable thereon, a slit forming blade 502 and covering blades 503, 512 and 513 which are rotatably connected to the first and second arms 504 and 505 and are arranged to open and close the shutter aperture 501a. A parallel link is formed by the first and second arms 504 and 505 in conjunction with each of the blades 502, 503, 512 and 513.

A second example of the conventional arrangement is a focal plane shutter disclosed in Japanese Laid-Open Utility Model Application No. SHO 52-84231. In the case of this shutter, a slit forming blade forms a parallel link in conjunction with first and second arms. One end of each covering blade is connected to one of the arms to be swingable thereon. The other end of each covering blade has either a working groove or slot or a working pin arranged to enable the covering blade to swing when the shutter is in operation.

A third example of the conventional arrangement is a focal plane shutter disclosed in Japanese Utility Model Publication No. SHO 53-21109. This shutter is arranged to support an arm by a blade group driving lever which is supported by a base plate having a shutter aperture. One end of the arm is connected to a slit forming blade in a swingable manner. A groove (or slot) part is arranged to guide the other end of the arm and the slit forming blade in such a way as to cause the slit forming blade to move in parallel when the blade group driving lever swings. The focal plane shutter is thus arranged to permit a reduction in size of the shutter.

In cases where a reduction in size (particularly in width) of a shutter is desired, it is advantageous in general to have a fewer number of split blades, because the number of connection parts whereby the blades are connected to arms becomes fewer accordingly. Thus, the use of a fewer number of blades lessens an area to be occupied by the connection parts. However, if the number of shutter blades is too few, the amount of mutual overlapping of the blades necessary for blocking a shutter aperture from light would become insufficient and, therefore, it is difficult to ensure an adequate light-blocking effect.

In respect of this point, the first example of the conventional arrangement does not allow much latitude in determining a position where the covering blades are to be connected to the arms. It is, therefore, difficult to increase the amount of mutual overlapping of the slit forming blade and the covering blade in a state of having them spread to close the shutter aperture.

In the case of the second example of the conventional arrangement, the covering blade is caused to make a swinging or revolving motion while the shutter is in process of shifting from a state of opening the shutter aperture and a state of closing the shutter aperture. This motion increases a difference in locus of motion between the covering blade and the slit forming blade which move in parallel with each other. Therefore, in order to efficiently attain a light-blocking effect (to uniform the amount of mutual overlapping of the blades in process of moving or spreading), the blades must be arranged to have complex shapes. In addition to this problem, inertia of the blades increases as the blades unnecessarily overlap in the neighborhood of the center of rotation of the covering blade which makes a swinging motion. The increased inertia becomes an impediment to a high-speed travel of the blades.

Shutter blades are generally arranged to be folded together in a space of a rectangular shape before opening the shutter. The rectangular space arrangement permits efficient use of space. However, the blades in the second example of the conventional arrangement are in a complex shape. In the case of the second example, therefore, the shape of the blade folding space deviates from such a rectangular shape, thereby preventing efficient use of space, and thus prevents the shutter from being arranged to be compact and yet to be adequately shielded from light.

In the third example of the conventional arrangement, a parallel moving mechanism including a guide groove (slot) and a guide pin, which has a larger working resistance than the parallel link of the first example, is used for the slit forming blade which has the longest distance from the center of swing and the longest moving distance among the blades. Therefore, it is difficult to ensure a smooth action of the shutter.

BRIEF SUMMARY OF THE INVENTION

In view of the problems of the prior art, it is a first object of the invention to provide a shutter device arranged to permit a reduction in size, particularly in width, of the shutter device, and yet to effectively prevent degradation of a light-blocking effect by ensuring an adequate amount of mutual overlapping of blades in their spread state without impairing the smoothness of motion of the blades.

It is a second object of the invention to provide a brake mechanism arranged for a shutter device to be capable of minimizing heat generation without increasing the number of necessary parts.

To attain the above objects, in accordance with an aspect of the invention, there is provided a shutter device, which comprises a shutter base plate having an aperture part and a protruding part, a first shutter blade member arranged to travel a predetermined movement distance over the aperture part, a second shutter blade member arranged to travel a movement distance shorter than the predetermined movement distance of travel of the first shutter blade member over the aperture part, the second shutter blade member having a slot engaging the protruding part, a first arm member having one end part thereof pivotally supported by the shutter base plate and another end part thereof supporting the first shutter blade member in a swingable manner, and a second arm member having one end part thereof pivotally supported by the shutter base plate and another end part thereof supporting the first shutter blade member in a swingable manner, the second arm member being connected to the second shutter blade member, wherein the first shutter blade member and the second shutter blade member are caused to travel over the aperture part by the second arm member being driven.

In particular, in the shutter device, a connecting part of the second arm member where the second arm member is connected to the second shutter blade member is located between the one end part and the other end part of the second arm member.

Further, in the shutter device, the first shutter blade member includes a plurality of blade members.

Further, in the shutter device, the slot is formed in a curved shape.

Further, in the shutter device, the slot has such a shape as to impart a predetermined frictional force to the second shutter blade member in the middle of travel of the second shutter blade member.

Further, in the shutter device, a part of the second shutter blade member having the slot formed therein has a greater strength than a part of the second shutter blade member arranged to travel over the aperture part.

Further, in the shutter device, the part of the second shutter blade member having the slot formed therein is thicker than the part of the second shutter blade member arranged to travel over the aperture part.

Further, in the shutter device, the second shutter blade member has a greater strength than the first shutter blade member.

The shutter device further comprises an imparting member arranged to impart a braking force to the second shutter blade member in the middle of travel of the second shutter blade member.

Further, in the shutter device, the first shutter blade member and the second shutter blade member are in such oblong shapes that longitudinally extend in a direction perpendicular to a travel direction thereof, and are always parallel with each other with respect to the longitudinal direction.

Further, the shutter device is a focal plane shutter disposed in an image plane position.

In accordance with another aspect of the invention, there is provided a shutter device, which comprises a shutter base plate having an aperture part, a first shutter blade member arranged to travel a predetermined movement distance over the aperture part, a second shutter blade member arranged to travel a movement distance shorter than the predetermined movement distance of travel of the first shutter blade member over the aperture part, the first shutter blade member and the second shutter blade member traveling over the aperture part in a state of being linked to each other, and imparting means for imparting a braking action to the second shutter blade member in the middle of travel of the second shutter blade member.

Further, in the shutter device, the shutter base plate is provided with a protruding part, and the second shutter blade member is provided with a slot engaging the protruding part.

Further, in the shutter device, the slot is formed in such a shape as to impart the braking action to the second shutter blade member in the middle of travel of the second shutter blade member.

The shutter device further comprises a first arm member having one end part thereof pivotally supported by the shutter base plate and another end part thereof supporting the first shutter blade member in a swingable manner, and a second arm member having one end part thereof pivotally supported by the shutter base plate and another end part thereof supporting the first shutter blade member in a swingable manner, the second arm member being connected to the second shutter blade member, wherein the first shutter blade member and the second shutter blade member are caused to travel over the aperture part by the second arm member being driven.

Further, in the shutter device, the first shutter blade member and the second shutter blade member are in such oblong shapes that longitudinal extend in a direction perpendicular to a travel direction thereof, and are parallel with each other with respect to the longitudinal direction at least at a travel starting position or a travel ending position.

These and further objects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 4(*a*) and 4(*b*) are a front view and a bottom view, respectively, showing a modification of the covering blade included in the focal plane shutter according to the first embodiment.

FIGS. 5(*a*) and 5(*b*) are a front view and a bottom view, respectively, showing another modification of the covering blade included in the focal plane shutter according to the first embodiment.

FIG. 6 is a front view showing a focal plane shutter according to a second embodiment of the invention in the travel ready state.

DETAILED DESCRIPTION OF THE INVENTION

Hereinafter, preferred embodiments of the invention will be described in detail with reference to the drawings.

Figure 1:
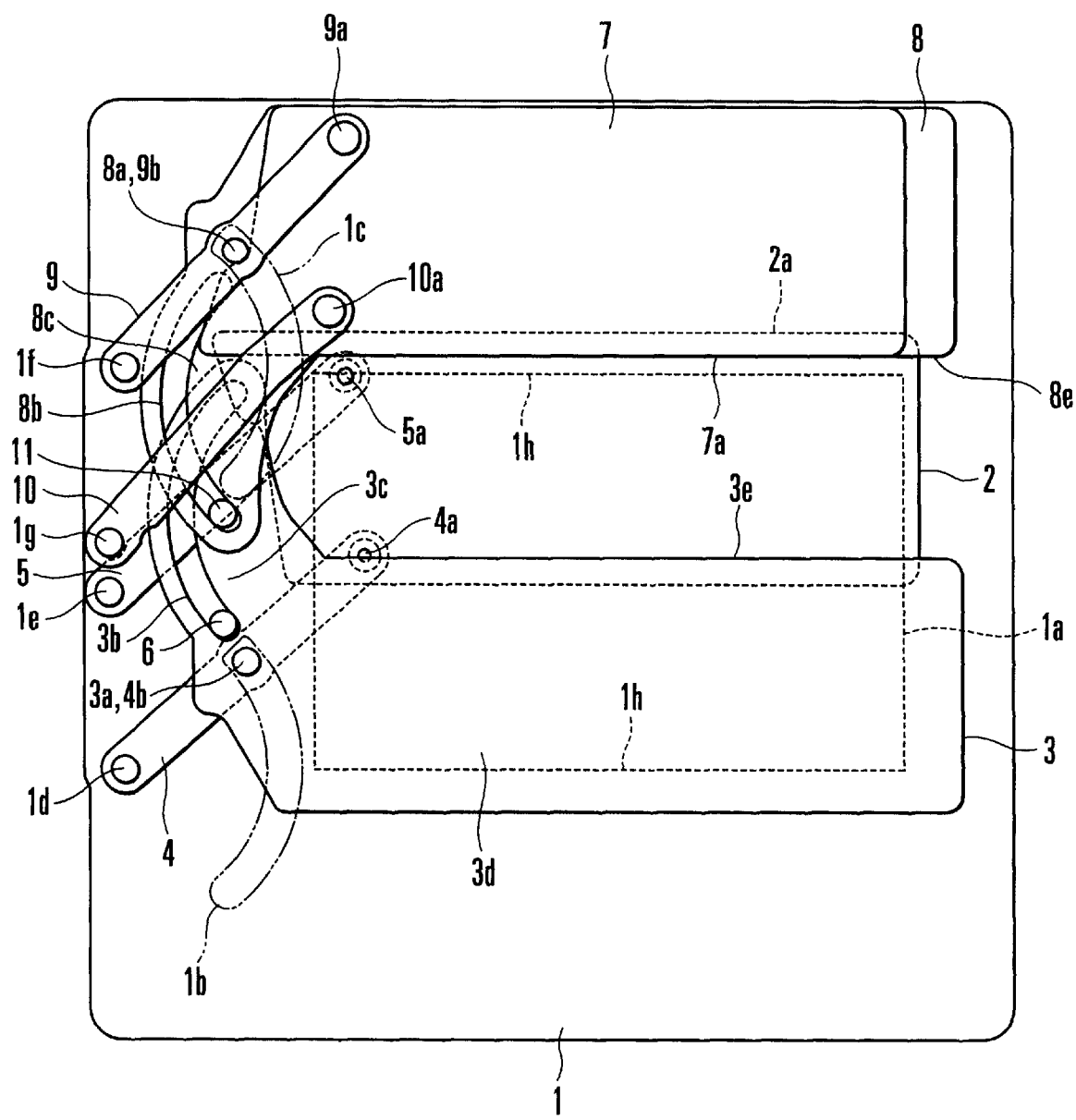
FIG. 1 is a front view showing a focal plane shutter according to a first embodiment of the invention in the travel ready state.
Figure 2:
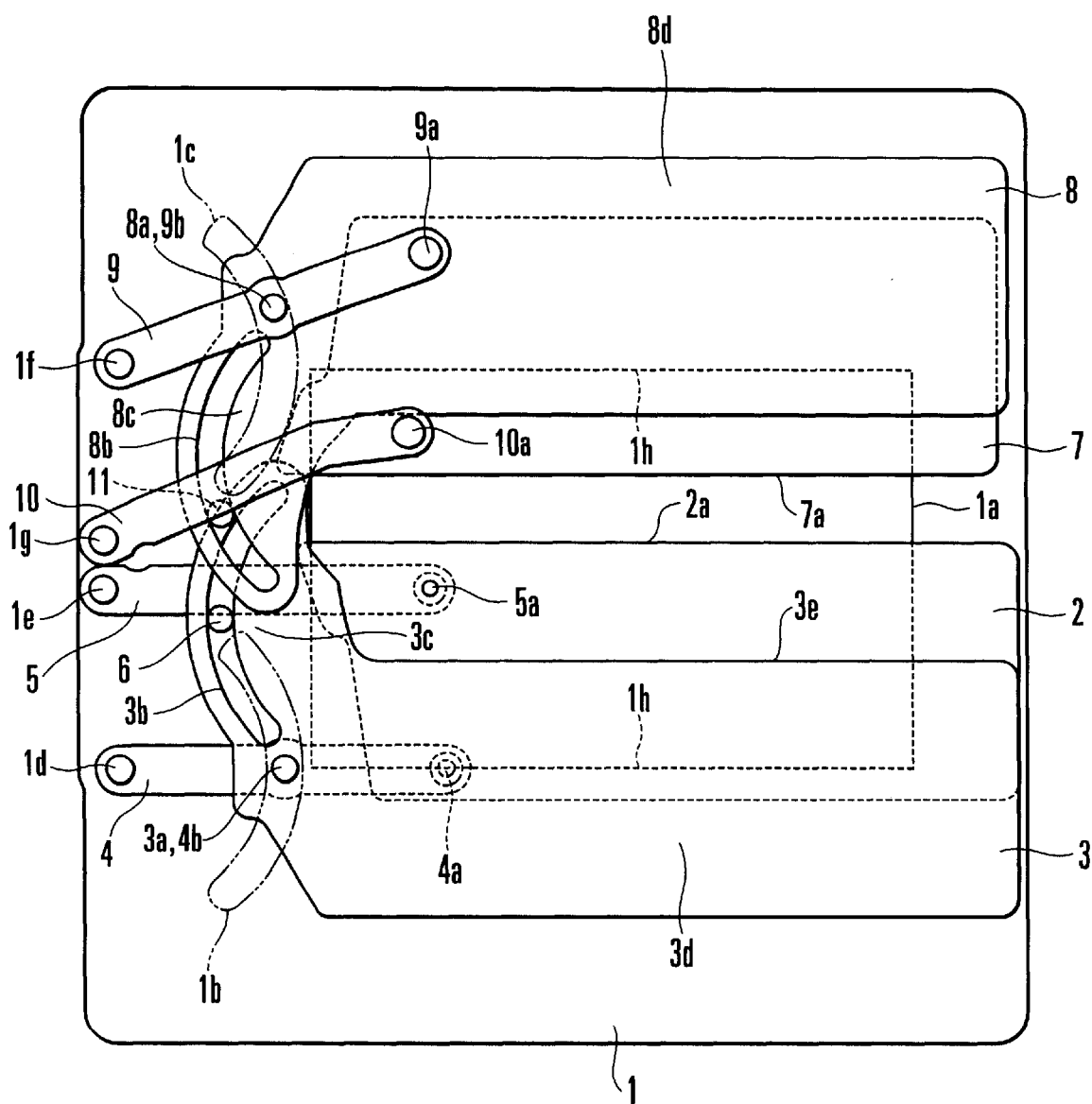
FIG. 2 is a front view showing the focal plane shutter according to the first embodiment in the slit-exposure in-process state.
Figure 3:
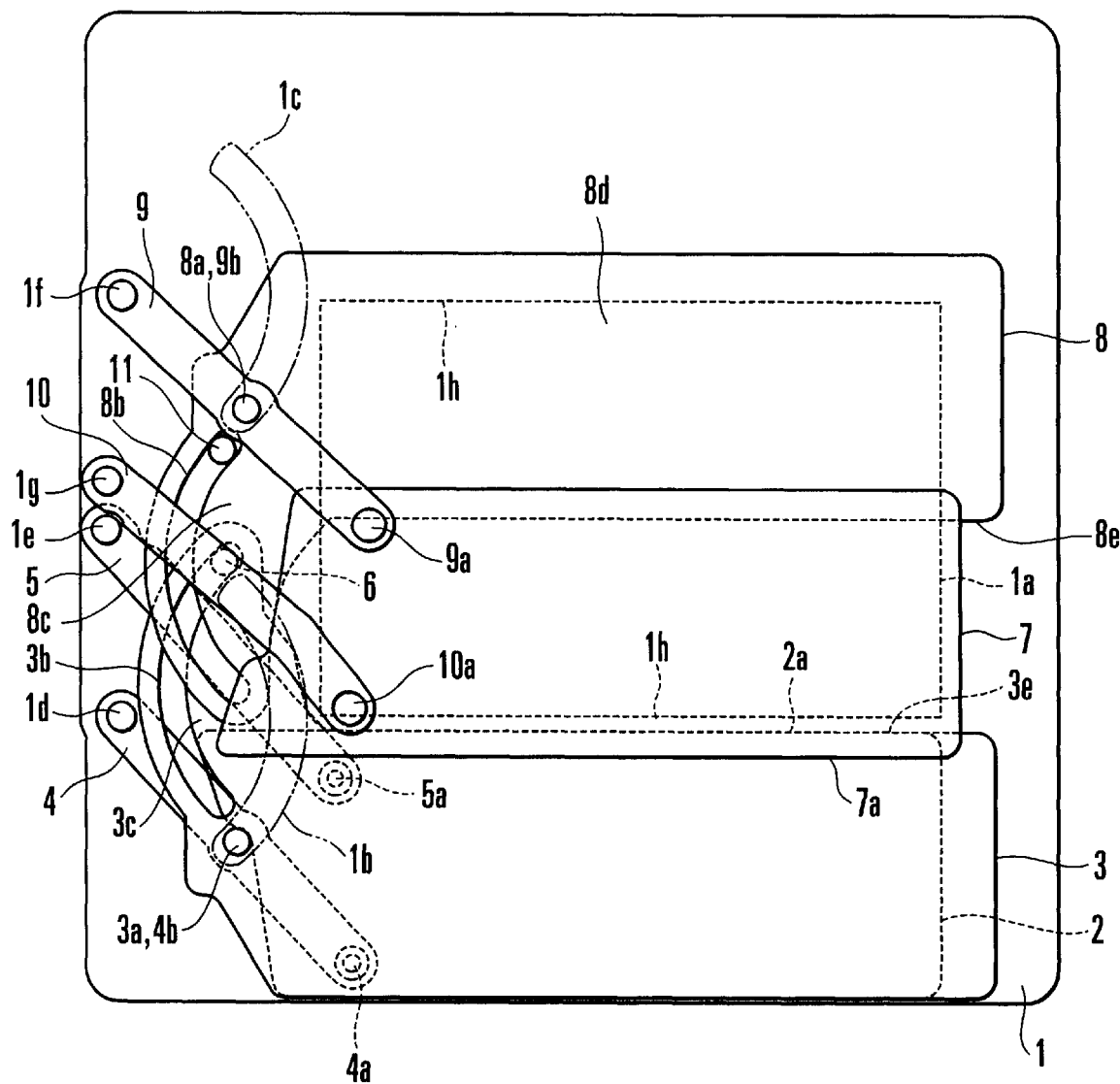
FIG. 3 is a front view showing the focal plane shutter according to the first embodiment in the travel completion state.

FIGS. 1 to 5 show a focal plane shutter disposed adjacent to an image plane (a film), according to a first embodiment of the invention. Of these figures, FIG. 1 is a front view showing the focal plane shutter in the travel ready state. FIG. 2 is a front view showing the focal plane shutter in the slit-exposure in-process state. FIG. 3 is a front view showing the focal plane shutter in the travel completion state. FIGS. 4(a) and 4(b) and FIGS. 5(a) and 5(b) show modification examples of a covering blade. FIGS. 4(a) and 5(a) are front views, and FIGS. 4(b) and 5(b) are bottom views, as viewed from below in the front views of FIGS. 4(a) and 5(a), for illustrating the thickness of the covering blade. This focal plane shutter is adapted for a camera.

Referring to these figures, a shutter base plate 1, which is disposed in the image plane position, has a shutter aperture 1a formed therein. A slot 1b forms a moving space for a driving pin mounted on a leading-curtain driving lever (not shown) which is arranged to impart traveling energy to a leading curtain by means of a spring force or the like. A slot 1c forms a moving space for a driving pin mounted on a trailing-curtain driving lever (not shown) which is arranged to impart traveling energy to a trailing curtain by means of a spring force or the like. The leading-curtain driving lever and the trailing-curtain driving lever thus correspond to driving members.

A leading-curtain slit forming blade 2 is a first blade member and has a leading-curtain slit forming end 2a. A leading-curtain covering blade 3 is a second blade member.

A first arm 4 for the leading curtain is a first link forming member. The base end part of the first arm 4 is mounted on a shaft 1d on the shutter base plate 1 in such a way as to be swingable on the shaft 1d. A caulked dowel 4a is provided at the fore end of the first arm 4 and has the leading-curtain slit forming blade 2 mounted thereon in such a way to be swingable thereon.

The first arm 4 is provided with a hole 4b for fitting the driving pin of the leading-curtain driving lever therein. With the driving pin fitted in the hole 4b, a driving force is transmitted to the first arm 4 from the leading-curtain driving lever, which has a rotating shaft arranged coaxially with the shaft 1d.

A second arm 5 for the leading curtain is a second link forming member. The base end part of the second arm 5 is mounted on a shaft 1e on the shutter base plate 1 in such a way as to be swingable on the shaft 1e. A caulked dowel 5a is provided at the fore end of the second arm 5 and has the leading-curtain slit forming blade 2 mounted thereon in a swingable manner.

A parallel link is thus formed jointly by the leading-curtain slit forming blade 2 and the first and second arms 4 and 5 for the leading curtain.

Meanwhile, the driving pin of the leading-curtain driving lever is fitted in a hole 3a formed in a leading-curtain covering blade 3. A driving force is thus transmitted directly to the leading-curtain covering blade 3 from the leading-curtain driving lever without being transmitted through the first arm 4.

The leading-curtain covering blade 3 is composed of a light-blocking part 3d which is arranged to open and close the shutter aperture 1a, and a working part 3c in which the above-stated hole 3a and a cam slot (a guide cam) 3b are formed. The working part 3c is formed at an end part in a longitudinal direction (in the direction of width of the shutter aperture) of the light-blocking part 3d to extend in an upward direction perpendicular to that longitudinal direction.

A guide pin 6 is provided on a partition plate which is arranged to form a partitioned space to be used as a travel space for the travel of the leading and trailing curtains between the shutter base plate 1 and the partition plate. The shutter base plate 1 and the partition plate correspond to a base-plate forming member. The guide pin 6 is fitted in the cam slot 3b of the leading-curtain covering blade 3. The guide pin 6 and the cam slot 3b are arranged to be smoothly slidable on each other.

The cam slot 3b is formed approximately on a line extending from the locus of motion (the slot 1b) of the driving pin of the leading-curtain driving lever. The cam slot 3b is thus arranged to eliminate waste of energy in the direction of exertion of power for smooth motion of the leading-curtain covering blade 3.

An end part 3e of the leading-curtain covering blade 3 which longitudinally extends along the upper end of the light-blocking part 3d is parallel with the upper and lower sides 1h of the shutter aperture 1a. The leading curtain of the shutter is formed in the above-mentioned manner.

The shutter has a trailing curtain arranged in the same manner as the leading curtain. The trailing curtain is provided with a trailing-curtain slit forming blade 7 (a first blade member), a trailing-curtain slit forming end 7a and a trailing-curtain covering blade 8 (a second blade member).

A first arm 9 for the trailing curtain is a first link forming member. The base end part of the first arm 9 is mounted on a shaft 1f on the shutter base plate 1 in such a way as to be swingable on the shaft 1f. A caulked dowel 9a is provided at the fore end of the first arm 9 and has the trailing-curtain slit forming blade 7 mounted thereon in a swingable manner.

The first arm 9 is provided with a hole 9b for fitting therein the driving pin of a trailing-curtain driving lever (not shown). With the driving pin fitted in the hole 9b, a driving force is transmitted to the first arm 9 from the trailing-curtain driving lever, which has a rotating shaft arranged coaxially with the shaft 1f.

A second arm 10 for the trailing curtain is a second link forming member. The base end part of the second arm 10 is mounted on a shaft 1g on the shutter base plate 1 in such a way as to be swingable on the shaft 1g. A caulked dowel 10a is provided at the fore end of the second arm 10 and has the leading-curtain slit forming blade 7 mounted thereon in a swingable manner.

A parallel link is thus formed jointly by the trailing-curtain slit forming blade 7 and the first and second arms 9 and 10 for the trailing curtain.

Meanwhile, the driving pin of the trailing-curtain driving lever is fitted in a hole 8a formed in a trailing-curtain covering blade 8. A driving force is thus transmitted directly to the trailing-curtain covering blade 3 from the trailing-curtain driving lever without being transmitted through the first arm 9.

The trailing-curtain covering blade 8 is composed of a light-blocking part 8d which is arranged to open and close the shutter aperture 1a, and a working part 8c in which the above-stated hole 8a and a cam slot (a guide cam) 8b are formed. The working part 8c is formed at an end part in a longitudinal direction of the light-blocking part 8d (in the direction of width of the shutter aperture) to extend in a downward direction perpendicular to that longitudinal direction.

A guide pin 11 is provided on the above-stated partition plate. The guide pin 11 is fitted in the cam slot 8b of the trailing-curtain covering blade 8. The guide pin 11 and the cam slot 8b are thus arranged to be smoothly slidable on each other.

The cam slot 8b is formed approximately on a line extending from the locus of motion (the slot 1c) of the driving pin of the trailing-curtain driving lever. The cam slot 3b is thus arranged to eliminate waste of energy in the direction of exertion of power for smooth motion of the trailing-curtain covering blade 8.

An end part 8e of the trailing-curtain covering blade 8 which longitudinally extends along the lower end of the light-blocking part 8d is parallel with the upper and lower sides 1h of the shutter aperture 1a. The trailing curtain of the shutter is formed in the above-mentioned manner.

The operation of the focal plane shutter which is arranged as the first embodiment of the invention as described above is next described as follows. In the travel ready state shown in FIG. 1, the leading-curtain and trailing-curtain driving levers are kept attracted respectively by shutter-speed control magnets.

The attracting action of the shutter-speed control magnet for the leading curtain is first canceled by a shutter release signal. Then, the force of a leading-curtain driving spring which generates a clockwise swinging force is exerted on the leading-curtain driving lever to cause the first arm 4 and the second arm 5 to swing also in the clockwise direction. Following this swing, the parallel link allows the leading-curtain slit forming blade 2 to travel in such a way as to open the shutter aperture 1a downward from the upper part thereof while keeping the leading-curtain slit forming end 2a parallel with the major side 1h of the shutter aperture 1a.

A travel driving force is imparted from the leading-curtain driving lever to the leading-curtain covering blade 3. The leading-curtain covering blade 3 is thus caused to travel over the shutter aperture 1a downward from the upper part of the shutter part 1a while keeping the end part 3e of the light-blocking part 3d parallel with the major side 1h of the shutter aperture 1a, under the guiding action of the cam slot 3b and the guide pin 6.

The state of the leading curtain thus shifts to the state shown in FIG. 3 through the state shown in FIG. 2 in such a way as to open the shutter aperture 1a.

After the lapse of a predetermined period of time corresponding to a set exposure time from the cancellation of the attraction by the shutter-speed control magnet for the leading curtain, the attraction by the shutter-speed control magnet for the trailing curtain is canceled. The trailing-curtain driving lever, which is driven clockwise by the force of a trailing-curtain driving spring (not shown), causes the first and second arms 9 and 10 to swing also clockwise. Following this swing, the parallel link acts to allow the trailing-curtain slit forming blade 7 to travel in such a way as to close the shutter aperture 1*a* downward from the upper part thereof while keeping the trailing-curtain slit forming end 7*a* parallel with the major side 1*h* of the shutter aperture 1*a*.

A travel driving force is imparted from the trailing-curtain driving lever to the trailing-curtain covering blade 8. The trailing-curtain covering blade 8 is thus caused to travel over the shutter aperture 1*a* downward from the upper part of the shutter part 1*a* while keeping the end part 8*e* of the light-blocking part 8*d* parallel with the major side 1*h* of the shutter aperture 1*a*, under the guiding action of the cam slot 8*b* and the guide pin 11.

The state of the trailing curtain thus shifts through the state shown in FIG. 2 to the state shown in FIG. 3 to terminate an exposure.

In charging the shutter, a charging mechanism (not shown) causes the leading-curtain and trailing-curtain driving levers to swing counterclockwise, without opening the shutter aperture 1*a* by letting the leading curtain travel first. By the action of the charging mechanism, the leading and trailing curtains are thus allowed to travel to bring the shutter from the state shown in FIG. 3 back to the state shown in FIG. 1.

In the case of the first embodiment, as described above, both of the leading and trailing curtains are arranged to have the respective slit forming blades 2 and 7 driven to travel by means of the parallel link. Meanwhile, the covering blades 3 and 8, each of which has a less amount of travel movement than that of each of the slit forming blades 2 and 7, are arranged to be caused to move approximately in parallel by the guiding actions of the guide pins 6 and 11 and the cam slots 3*b* and 8*b* without recourse to the parallel link. The arrangement of the first embodiment, therefore, allows the blades to be in relatively simple shapes. The arrangement thus permits a reduction in size, particularly in width, of the shutter device as a whole. Besides, the blades are arranged to overlap each other sufficiently in the spread state as shown in FIGS. 1 and 3, without impairing the smoothness of their motions, so that an adequate light-blocking effect can be attained.

In the case of the first embodiment, each of the covering blades 3 and 8 is provided with the working part 3*c* or 8*c*, which is long and narrow to extend in a direction approximately perpendicular to the longitudinal direction of the light-blocking part 3*d* or 8*d* of the covering blade 3 or 8. The whole shape of the covering blade 3 or 8 is thus formed into an approximately L shape, which is very advantageous for a reduction in size of the shutter in the direction of width thereof.

In the first embodiment, the guide slots 3*b* and 8*b* are formed in such a way as to allow the covering blades 3 and 8 to move in parallel including when they are in process of traveling. The covering blades 3 and 8 are arranged such that they are parallel with each other both in the state shown in FIG. 1 (the travel ready state) and in the state shown in FIG. 3 (the travel completion state) in which the shutter aperture 1*a* is opened and closed. The shutter is arranged to have the end parts 3*e* and 8*e* of the covering blades 3 and 8 remain parallel with the major side 1*h* of the shutter aperture 1*a* in these states. For this purpose, the guide slots 3*b* and 8*b* may be arranged to cause the covering blades 3 and 8 to make a slightly rotative motion as necessary while they are in process of travel.

In the first embodiment, the shutter aperture 1*a* is formed in a rectangular shape. However, this shape of the shutter aperture may be changed to have its minor side curved or to be in a polygonal shape such as a triangular, pentagonal or hexagonal shape. In other words, according to the invention, the shutter aperture can be arranged in any shape as long as one of its sides is linear.

Referring to FIGS. 4(*a*) and 4(*b*) which show the covering blade 3 or 8, the light-blocking part 3*d* or 8*d* of the blade 3 or 8 may be made of a light-weight material, such as PET (polyethylene terephthalate) or the like. The working part 3*c* or 8*c* of the blade 3 or 8 has a hole 3*a* or 8*a*, and the cam slot 3*b* or 8*c* is formed therein. Since the covering blade 3 or 8 receives a force at the working part 3*c* or 8*c* when it travels, this part must have a high degree of strength and is, therefore, made of a strong material such as titanium, Super Duralumin, etc. The light-blocking part 3*d* or 8*d* and the working part 3*c* or 8*c* prepared in this manner may be joined together by adhesion or the like in a suitable manner.

For the purpose of strengthening the working part 3*c* or 8*c*, this part may be arranged to be thicker than the light-blocking part 3*d* or 8*d*, as shown in FIGS. 5(*a*) and 5(*b*).

According to the arrangement described above, the barycenters of the covering blades 3 and 8 can be set closer to the working parts without unnecessarily increasing their weight. Therefore, the inertia of the group of blades can be advantageously minimized for a high-speed travel and for suppression of energy for the travel of the blades.

Meanwhile, the strength of the working parts 3*c* and 8*c* may be increased by arranging the covering blades 3 and 8 either to be made of, in its entirety, a material having a greater strength than the material used for the slit forming blades 2 and 7 or to be thicker in plate thickness than the slit forming blades 2 and 7.

It is possible to prevent the occurrence of friction while the shutter is in operation by applying surface treatment, such as metal plating or hard coating, to the parts on the inner sides of the cam slots 3*b* and 8*b* on which the guide pins 6 and 11 slide, or to parts around the cam slots 3*b* and 8*b*, or to the guide pins 6 and 11. It is also possible to have the guide pins 6 and 11 made of a high abrasion-resisting material or to apply a heat treatment, such as a nitriding treatment, to the guide pins 6 and 11 if they are made of metal.

The smoothness of movement of the shutter may be enhanced also by applying surface treatment, such as highly slippy coating (Teflon resin coating, for example), painting with a slippy paint material, oil or a lubricant such as molybdenum disulfide, to the parts on the inner sides of the cam slots 3*b* and 8*b* on which the guide pins 6 and 11 slide, or to parts around the cam slots 3*b* and 8*b*, and further to the guide pins 6 and 11. It is also possible to form the covering blades 3 and 8 in their entirety with a slippy material, such as a PET, PEN (polyethylene naphthalate) or Teflon resin film material.

Further, in the case of the first embodiment, the guide pin 6 which is provided on the partition plate is arranged to be fitted in the cam slot 3*b* which is formed in the covering blade 3. However, this arrangement may be changed to arrange the guide pin on the covering blade to engage a cam slot or some other guide cam formed in the partition plate or in the shutter base plate.

Figure 7:
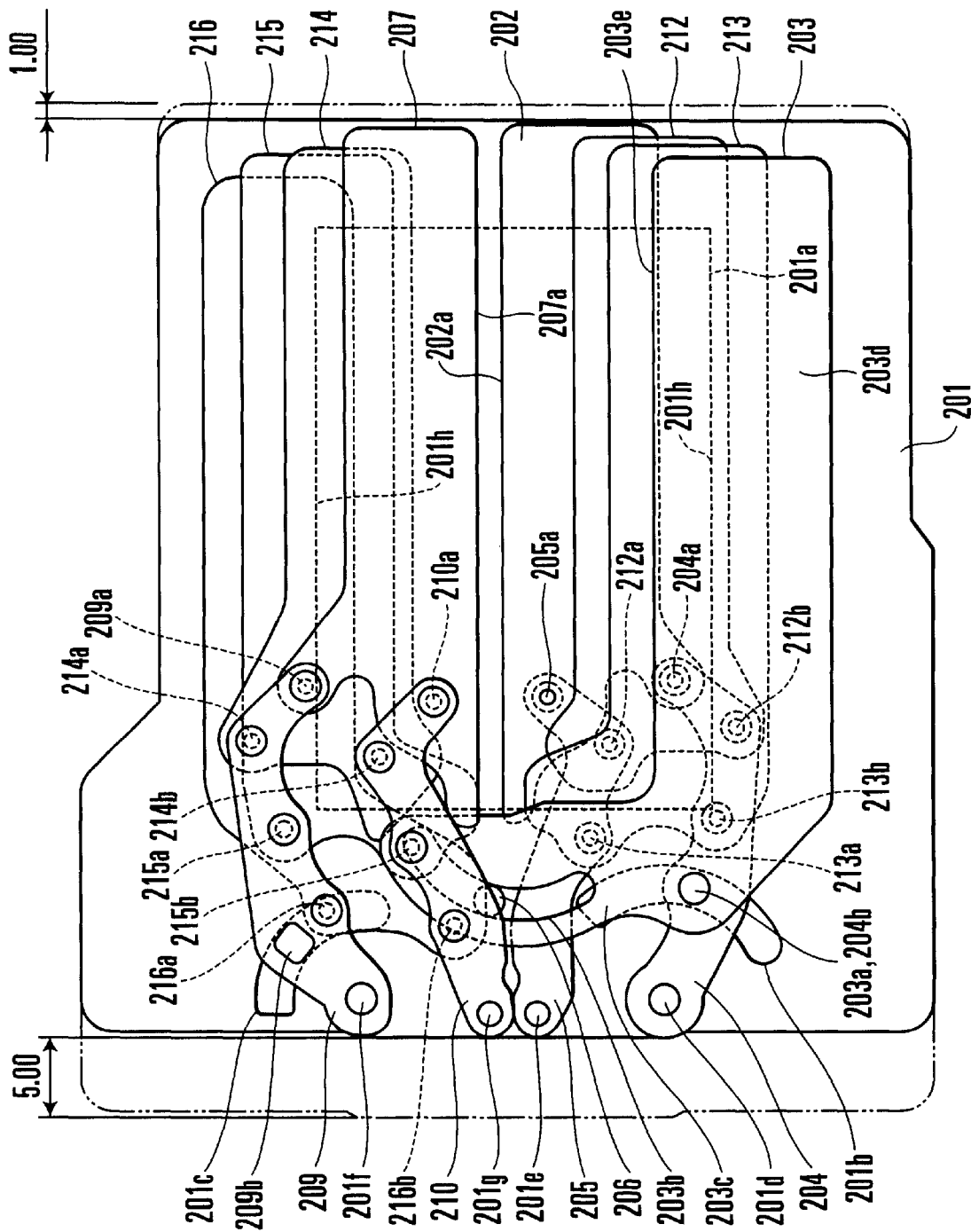
FIG. 7 is a front view showing the focal plane shutter according to the second embodiment in the slit-exposure in-process state.
Figure 8:
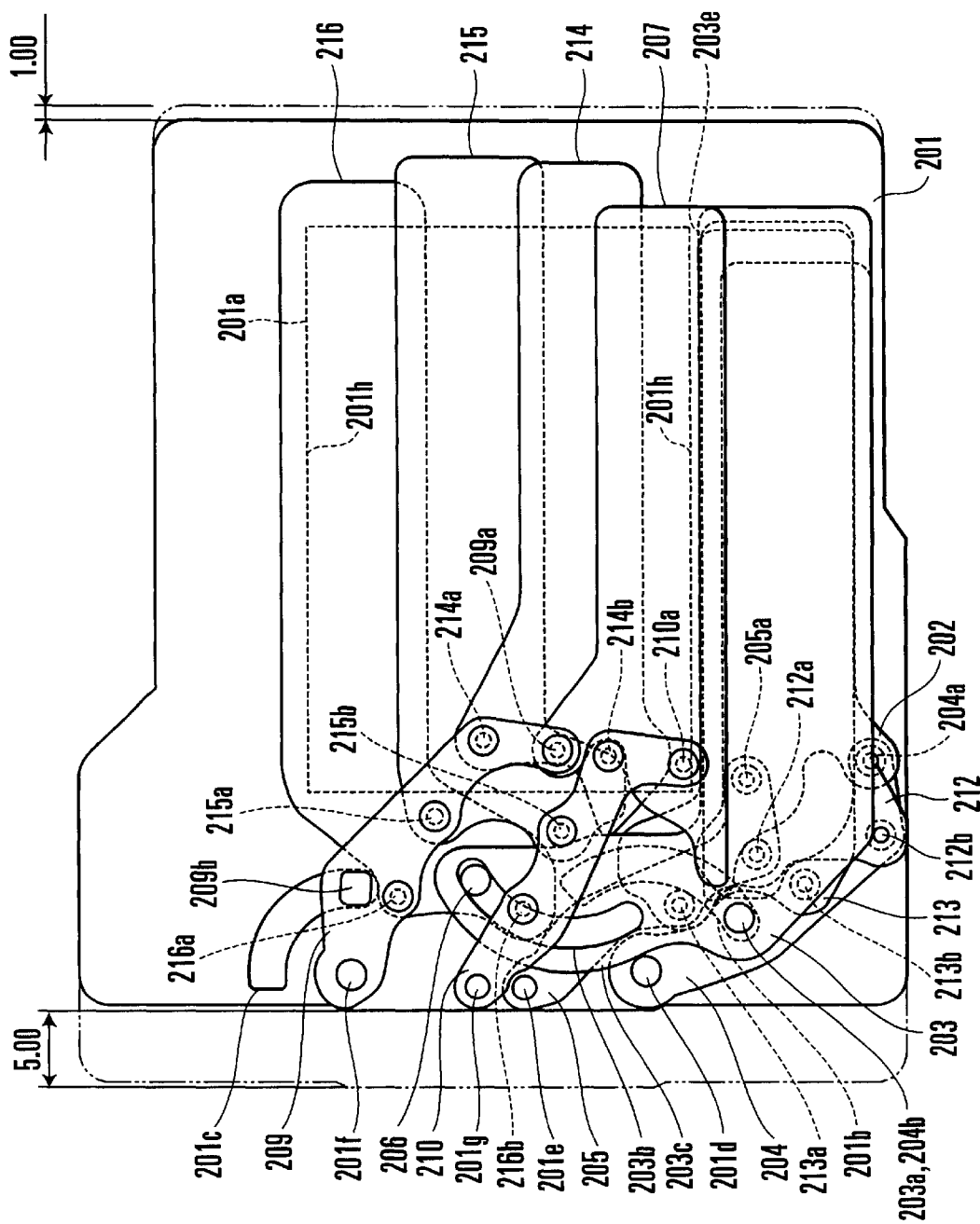
FIG. 8 is a front view showing the focal plane shutter according to the second embodiment in the travel completion state.

FIGS. 6, 7 and 8 show the arrangement of a focal plane shutter according to a second embodiment of the invention. Of these figures, FIG. 6 shows the shutter in the travel ready state, FIG. 7 shows the shutter in the slit-exposure in-process state, and FIG. 8 shows the shutter in the travel completion state.

In the second embodiment, all parts that are the same as those of the first embodiment are indicated by reference numerals having "200" added to the reference numerals of corresponding parts of the first embodiment.

The focal plane shutter according to the second embodiment of the invention differs from the first embodiment in that the size of the shutter in the direction of height (vertical direction as viewed in FIGS. 6 to 8) is made to be reduced by arranging a plurality of covering blades and that the invention is applied only to the leading curtain of the shutter.

Further, compared with the conventional ordinary focal plane shutter of the split-blade type using the parallel link arrangement (indicated by two-dot chain lines in FIGS. 6 and 8, the outside lateral dimension of the shutter according to the second embodiment is arranged to be shorter by 5 mm on the side of the arm base end part of the shutter and by 1 mm on the side of the blade fore end part thereof.

Referring to FIGS. 6 to 8, a shutter base plate 201 has a shutter aperture 201a formed therein. A slot 201b forms a moving space for a driving pin arranged on a leading-curtain driving lever (not shown) which is arranged to impart traveling energy to a leading curtain by means of a spring force or the like. A slot 201c forms a moving space for a driving pin arranged on a trailing-curtain driving lever (not shown) which is arranged to impart traveling energy to a trailing curtain by means of a spring force or the like. The leading-curtain and trailing-curtain driving levers are thus arranged to be driving members.

A leading-curtain slit forming blade 202 is a first blade member and has a leading-curtain slit forming end 202a. Leading-curtain covering blades 212 and 213 (a first blade member) are arranged for the leading curtain. The leading curtain is provided with another leading-curtain covering blade 203 (a second blade member).

A first arm 204 for the leading curtain is a first link forming member. The base end part of the first arm 204 is mounted on a shaft 201d on the shutter base plate 201 in such a way as to be swingable on the shaft 201d. A caulked dowel 204a is provided at the fore end of the first arm 204 and has the leading-curtain slit forming blade 202 mounted thereon to be swingable there. The first arm 204 is provided with a hole 204b for fitting therein the driving pin of the leading-curtain driving lever. With the driving pin fitted in the hole 204b, a driving force is transmitted to the first arm 204 from the leading-curtain driving lever, which has a rotating shaft arranged to be coaxial with the shaft 201d.

A second arm 205 (a second link forming member) for the leading curtain has its base end part mounted on a shaft 201e which is provided on the shutter base plate 201 and is arranged to be swingable on the shaft 201e. A caulked dowel 205a is provided at the fore end of the second arm 205 and has the leading-curtain slit forming blade 202 mounted thereon to be swingable there.

A parallel link is thus formed by the leading-curtain slit forming blade 202 and the first and second arms 204 and 205 for the leading curtain.

The leading-curtain covering blades 212 and 213 are provided respectively with caulked dowels 212a, 212b, 213a and 213b which are attached to the middle parts of the first and second arms 204 and 205 in a swingable manner. The leading-curtain covering blades 212 and 213 thus form a parallel link in conjunction with the first and second arms 204 and 205.

Meanwhile, the driving pin of the leading-curtain driving lever is fitted in a hole 203a which is formed in the leading-curtain covering blade 203. By the driving pin, a driving force of the leading-curtain driving lever is transmitted directly to the leading-curtain covering blade 203 without being transmitted through the first arm 204.

The leading-curtain covering blade 203 is composed of a light-blocking part 203d which is arranged to open and close the shutter aperture 201a, and a working part 203c in which the above-stated hole 203a and a cam slot (guide cam) 203b are formed. The working part 203c is formed at an end part in a longitudinal direction (the direction of width of the shutter aperture) of the light-blocking part 203d to extend in an upward direction perpendicular to that longitudinal direction.

A guide pin 206 is provided on a partition plate which is arranged to form a partitioned space to be used as a travel space for the travel of the leading and trailing curtains between the shutter base plate 201 and the partition plate (not shown). The shutter base plate 201 and the partition plate are base plate forming members. The guide pin 206 is fitted in the cam slot 203b of the leading-curtain covering blade 203. The guide pin 206 and the cam slot 203b are thus arranged to be smoothly slidable on each other.

The cam slot 203b is formed approximately on a line extending from the locus of motion (the slot 201b) of the driving pin of the leading-curtain driving lever. The cam slot 203b is thus arranged to eliminate waste of energy in the direction of exerting power for smooth motion of the leading-curtain covering blade 203.

An end part 203e of the leading-curtain covering blade 203 which longitudinally extends along the upper end of the light-blocking part 203d is parallel with the upper and lower sides 201h of the shutter aperture 201a. The leading curtain is formed in the above-mentioned manner.

The trailing curtain is arranged to be in the shape of a parallel link as a whole. The trailing curtain is provided with a trailing-curtain slit forming blade 207 which has a trailing-curtain slit forming end 207a, and trailing-curtain covering blades 214, 215 and 216.

A first arm 209 for the trailing curtain is a first link forming member and is mounted on a shaft 201f on the shutter base plate 201 in such a way as to be swingable on the shaft 201f.

A caulked dowel 209a is provided at the fore end of the first arm 209 and has the trailing-curtain slit forming blade 207 mounted thereon in a swingable manner.

The first arm 209 is provided with a hole 209b for fitting therein the driving pin of a trailing-curtain driving lever (not shown). With the driving pin fitted in the hole 209b, a driving force is transmitted to the first arm 209 from the trailing-curtain driving lever which has a rotating shaft arranged coaxially with the shaft 201f.

A second arm 210 for the trailing curtain is mounted on a shaft 201g on the shutter base plate 201 in such a way as to be swingable on the shaft 201g. A caulked dowel 210a is provided at the fore end of the second arm 210 and has the leading-curtain slit forming blade 207 mounted thereon in a swingable manner.

A parallel link is thus formed jointly by the trailing-curtain slit forming blade 207 and the first and second arms 209 and 210 for the trailing curtain.

The trailing-curtain covering blades 214, 215 and 216 also have caulked dowels 214a, 214b, 215a, 215b, 216a and 216b swingably attached to the middle parts of the first and second arms 209 and 210. The trailing-curtain covering blades 214, 215 and 216 thus form a parallel link in conjunction with the first and second arms 209 and 210. The trailing curtain is formed in the above-mentioned manner.

The operation of the focal plane shutter which is arranged as described above is next described as follows. In the travel ready state shown in FIG. 6, the leading-curtain and trailing-curtain driving levers are kept attracted respectively by shutter-speed control magnets. The attracting action of the shutter-speed control magnet for the leading curtain is first canceled by a shutter release signal. Then, the force of a leading-curtain driving spring which generates a clockwise swinging force is exerted on the leading-curtain driving lever to cause the first arm 204 and the second arm 205 to swing also in the clockwise direction. Following this swing, the parallel link allows the leading-curtain slit forming blade 202 and the leading-curtain covering blades 212 and 213 to travel in such a way as to open the shutter aperture 201a downward from the upper part thereof while keeping the leading-curtain slit forming end 202a and the upper and lower end parts of the leading-curtain covering blades 212 and 213 parallel with the major side 201h of the shutter aperture 201a.

A travel driving force is imparted from the leading-curtain driving lever to the leading-curtain covering blade 203. The leading-curtain covering blade 203 is thus caused to travel over the shutter aperture 201a downward from the upper part of the shutter aperture 201a while keeping the end part 203e of the light-blocking part 203d parallel with the major side 201h of the shutter aperture 201a, under the guiding action of the cam slot 203b and the guide pin 206.

The state of the leading curtain thus shifts to the state shown in FIG. 8 through the state shown in FIG. 7 in such a way as to open the shutter aperture 201a.

After the lapse of a predetermined period of time corresponding to a set exposure time from the cancellation of the attraction by the shutter-speed control magnet for the leading curtain, the attraction by the shutter-speed control magnet for the trailing curtain is canceled. The trailing-curtain driving lever which is driven clockwise by the force of a trailing-curtain driving spring (not shown) causes the first and second arms 209 and 210 to swing clockwise. The parallel link then acts to allow the trailing-curtain slit forming blade 207 and the trailing-curtain covering blades 214, 215 and 216 to travel in such a way as to close the shutter aperture 201a downward from the upper part thereof while keeping the trailing-curtain slit forming end 207a and the upper and lower end parts of the trailing-curtain covering blades 214, 215 and 216 parallel with the major side 201h of the shutter aperture 201a.

The state of the trailing curtain thus shifts through the state shown in FIG. 7 to the state shown in FIG. 8 to terminate an exposure.

In charging the shutter, a charging mechanism (not shown) causes the leading-curtain and trailing-curtain driving levers to swing counterclockwise, without opening the shutter aperture 201a by letting the leading curtain travel first. By the action of the charging mechanism, the leading and trailing curtains are thus allowed to travel to bring the shutter from the state shown in FIG. 8 back to the state shown in FIG. 6.

In the case of the second embodiment, the slit forming blade 202 and the covering blades 212 and 213 of the leading curtain are driven through the parallel link. Meanwhile, the covering blade 203, which has a less amount of travel movement than that of each of the blades 202, 212 and 213, i.e., the traveling amount of which is the smallest of the group of blades, is arranged to be caused to move approximately in parallel by the guiding actions of the guide pin 206 and the cam slot 203b instead of being caused to move by the parallel link. The arrangement of the second embodiment, therefore, allows the blades to be formed in relatively simple shapes. The arrangement thus permits a reduction in size, particularly in width, of the shutter device as a whole. Besides, the blades are arranged to overlap each other sufficiently in the spread state as shown in FIGS. 6 and 8, without impairing the smoothness of motion, so that an adequate light-blocking effect can be attained.

In the second embodiment, the working part 203c, which is long and narrow, is formed at the covering blade 203 to extend in a direction approximately perpendicular to the longitudinal direction of the light-blocking part 203d of the covering blade 203. The whole shape of the covering blade 203 is thus formed into an approximately L shape, which is very advantageous for a reduction in size of the shutter in the direction of width thereof.

In the case of a single-lens reflex camera, for example, the shutter is readied for travel and kept in the travel ready state as shown in FIG. 6, in general, before the start of the next photo-taking action after film loading or after completion of photo-taking. The leading curtain, therefore, must be arranged to adequately block light. In a focal plane shutter of the split-blade type, the light-blocking effect depends greatly on the mutual overlapping amount of blades.

Figure 38:
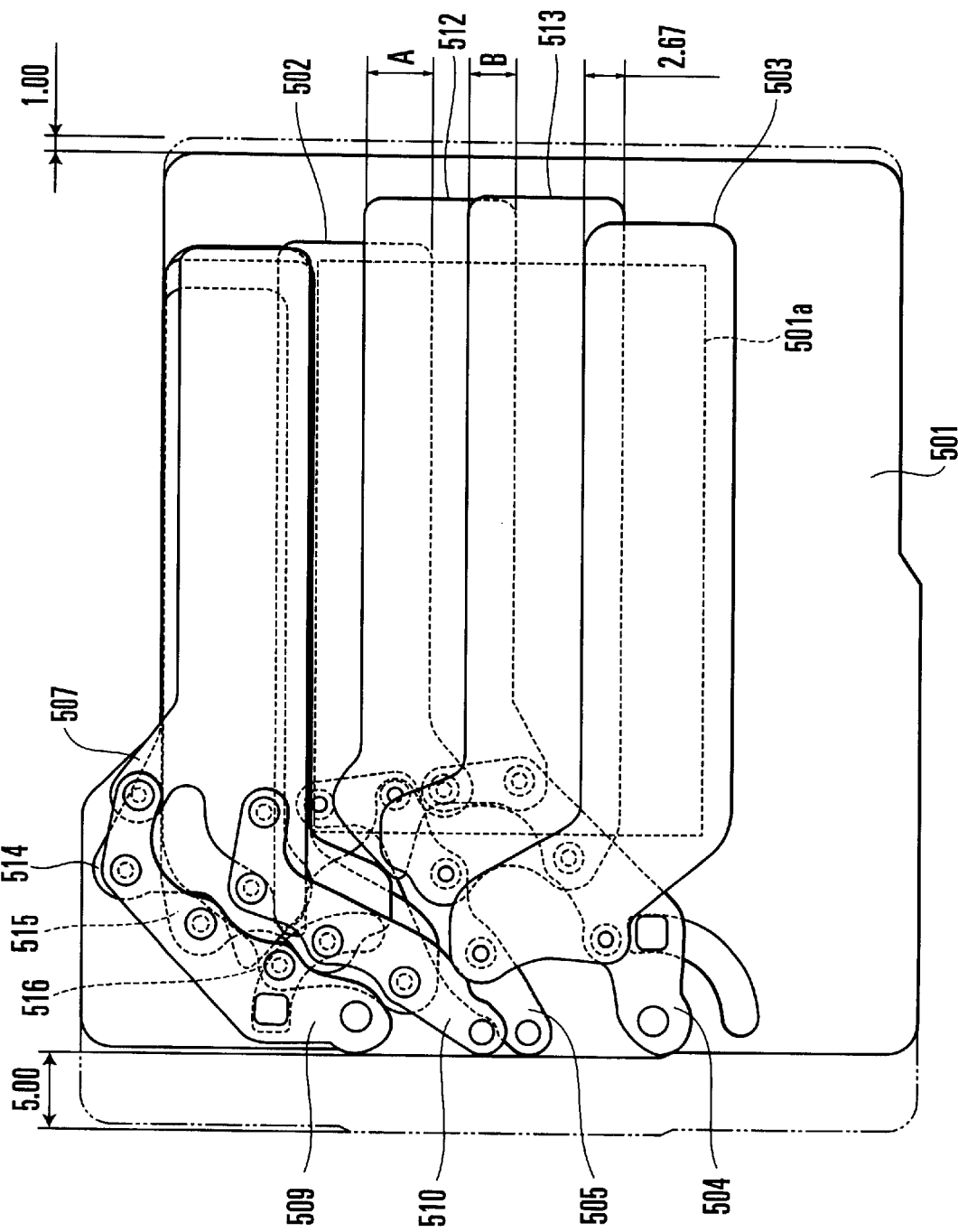
FIG. 38 is a front view showing a conventional focal plane shutter in the travel ready state.
Figure 39:
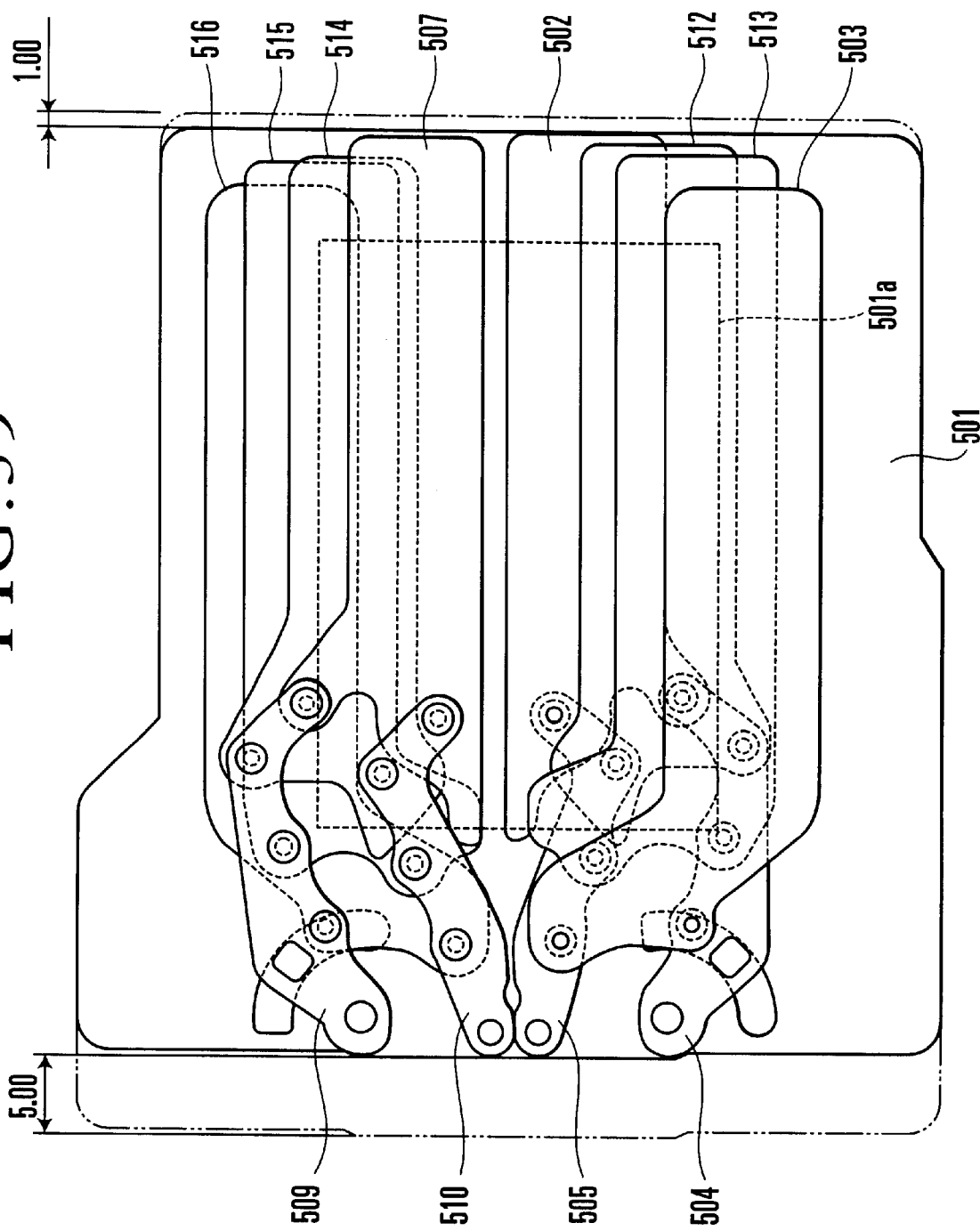
FIG. 39 is a front view showing the conventional focal plane shutter in the slit-exposure in-process state.
Figure 40:
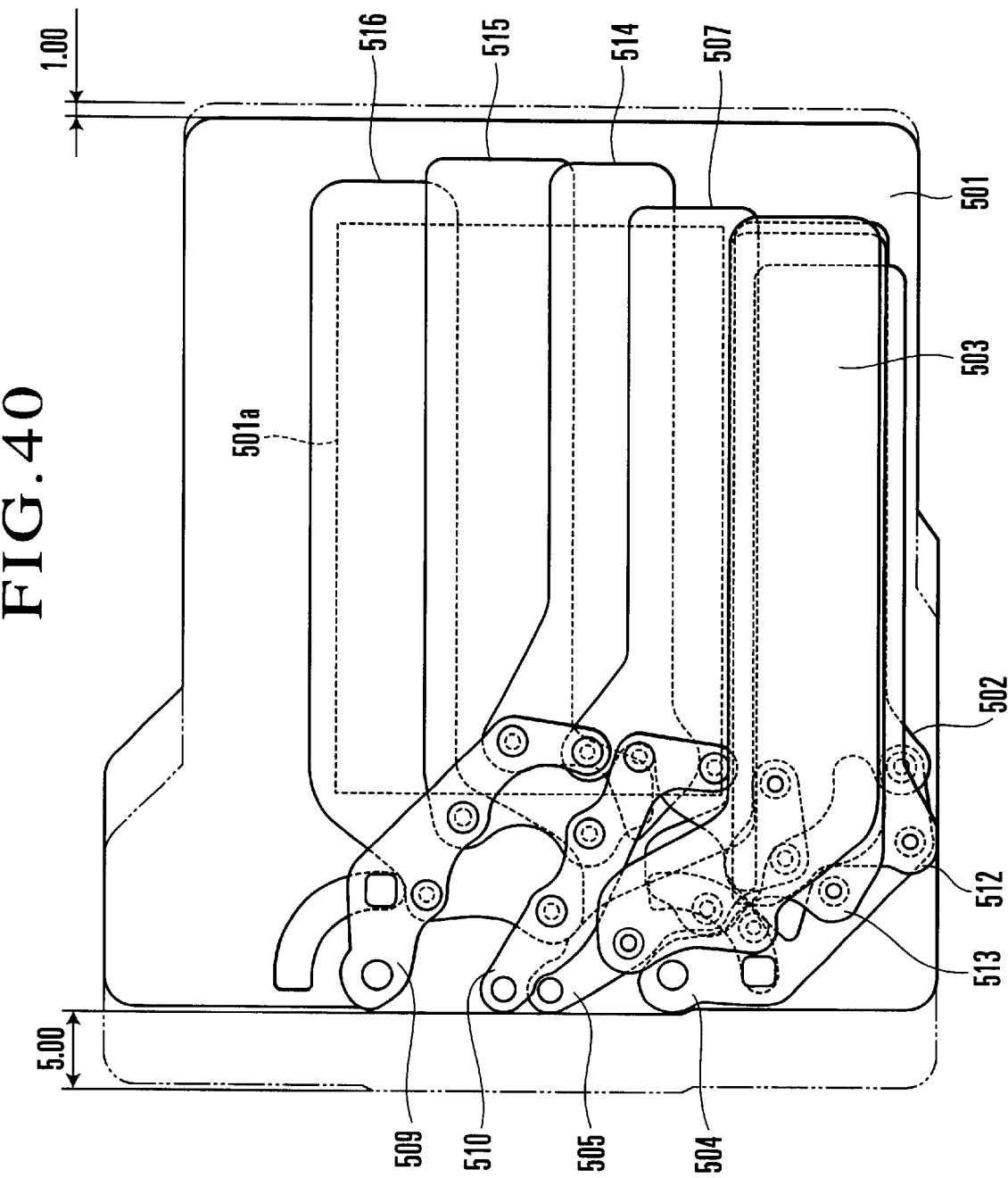
FIG. 40 is a front view showing the conventional focal plane shutter in the travel completion state.

Compared with the first example of the conventional shutter arrangement shown in FIGS. 38, 39 and 40, in this respect, the mutual overlapping amounts A and B of blades of the leading curtain in the second embodiment of the invention are same as those of the conventional shutter. However, the overlapping amount of the covering blade 203 having the smallest amount of travel movement and the covering blade 213 adjacent thereto can be increased easily to 3.74 mm from the overlapping amount of 2.67 mm of the covering blades 503 and 513 of the conventional shutter. The second embodiment, therefore, has an advantage over the conventional shutter in respect of light-blocking.

The advantage results from the follow point. The conventional arrangement using the parallel link allows a less amount of latitude for allocation of the caulked dowels as they interfere with each other. On the other hand, the second embodiment allows a greater amount of latitude, as it has a less amount of such restriction, so that the covering blade 203 can be disposed at a position where it can have a large radius of swing on the first arm 204.

Further, to increase the amount of overlapping the adjoining covering blade 213, the covering blade 203 is arranged to have a greater amount of travel movement than that of the conventional covering blade 503. The width of the covering blade 203 in the second embodiment is, therefore, larger than the conventional covering blade 503 in the vertical direction, as shown FIG. 6.

However, since the amount of travel movement of the covering blade 203 is much shorter than those of the slit forming blade 202 and the other covering blades 212 and 213, its travel only slightly increases the inertia of the whole leading curtain. Therefore, the adverse effect on the smoothness of motion of blades, such as engagement of the cam slot and the guide pin, can be minimized. In other words, an increase in amount of energy required for obtaining the same shutter curtain speed as the conventional shutter can be minimized.

In the second embodiment, the guide slot 203b is formed in such a shape as to allow the covering blade 203 to be parallel even while it is traveling. The covering blade 203 is arranged such that it is parallel with the shutter aperture 201a both in the state shown in FIG. 6 (the travel ready state) and the state shown in FIG. 8 in which the shutter aperture 201a is opened and closed. The end part 203e of the covering blade 203 is thus arranged to remain parallel with the major side 201h of the shutter aperture 201a in these states. The guide slots 203b may be arranged to cause the covering blade 203 to make a slightly rotative motion as necessary while the covering blade 203 is in process of travel.

In the second embodiment, the shutter aperture 201a is formed in a rectangular shape. However, this shape of the shutter aperture 201a may be changed to have its minor side curved or to be in a polygonal shape such as a triangular, pentagonal or hexagonal shape. In other words, according to the invention, the shutter aperture 201a can be arranged in any shape as long as one of its sides is linear.

The light-blocking part 203d of the covering blade 203 may be made of, in the same manner as the covering blade 3 or 8 in the first embodiment shown in FIGS. 4(a) and 4(b), a light-weight material such as polyethylene terephthalate (PET) or the like. The working part 203c of the blade 203 has the hole 203a and the cam slot 203b formed therein. Since the covering blade 203 receives a force at the working part 203c when it travels, this part must have a high degree of strength and is, therefore, made of a strong material such as titanium, Super Duralumin, etc. The light-blocking part 203d and the working part 203c which is prepared in this manner may be joined together by adhesive or the like in a suitable manner.

For the purpose of strengthening the working part 203c, this part may be arranged to be thicker than the light-blocking part 203d, as in the case of the first embodiment shown in FIGS. 5(a) and 5(b).

According to the arrangement described above, the barycenters of the covering blade 203 can be set closer to the working parts without unnecessarily increasing its weight. Therefore, the inertia of the group of blades can be advantageously minimized for a high-speed travel and for suppression of energy for the travel of blades.

The strength of the working parts 203c may be increased by arranging the covering blade 203 either to be made of, in its entirety, a material having a greater strength than the material used for the slit forming blade 202 and the covering blades 212 and 213 or to be thicker in plate thickness than the slit forming blade 202 and the covering blades 212 and 213.

It is possible to prevent the occurrence of friction while the shutter is in operation by applying surface treatment, such as metal plating or hard coating, to the part on the inner side of the cam slots 203b on which the guide pin 206 slides, or to parts around the cam slot 203b, or to the guide pin 206. It is also possible to have the guide pin 206 made of a high abrasion resisting material or to apply a heat treatment, such as nitriding, to the guide pin 206 if the pin is made of metal.

The smoothness of motion of the shutter may be enhanced also by applying surface treatment, such as highly slippy coating (Teflon resin coating for example), painting with a slippy paint material, oil or a lubricant such as molybdenum disulfide, to the parts on the inner sides of the cam slot 203b on which the guide pin 206 slides, or to parts around the cam slot 203b, and further to the guide pin 206. It is also possible to form the covering blade 203 in its entirety with a slippy material, such as a PET, PEN (polyethylene naphthalate) or Teflon resin film material.

Further, in the case of the second embodiment, the guide pin 206 which is provided on a partition plate is arranged to be fitted in the cam slot 203b which is formed in the covering blade 203. However, this arrangement may be changed to arrange the guide pin 206 on the covering blade to engage a cam slot or some other guide cam formed in the partition plate or in the shutter base plate.

FIGS. 9 to 18 relate to a third embodiment of the invention, which is a shutter device for an image display apparatus. The image display apparatus is adapted for a photo stand or an electronic album and arranged to display images taken and recorded on a film.

The image display apparatus is arranged to have a negative image optically projected on a display screen. The screen is composed of a spatial light modulator (hereinafter abbreviated to SLM) which is capable of inverting negative images to enable the user to easily view images recorded on a negative film. A ferroelectric liquid crystal element (hereinafter abbreviated to FLC) is used for the liquid crystal element of the SLM. The memorizing property of the FLC is utilized to instantly write a negative image into the SLM by means of a flash device used for a camera or the like. The image is then read out with light to be observed by the user.

Figure 9:
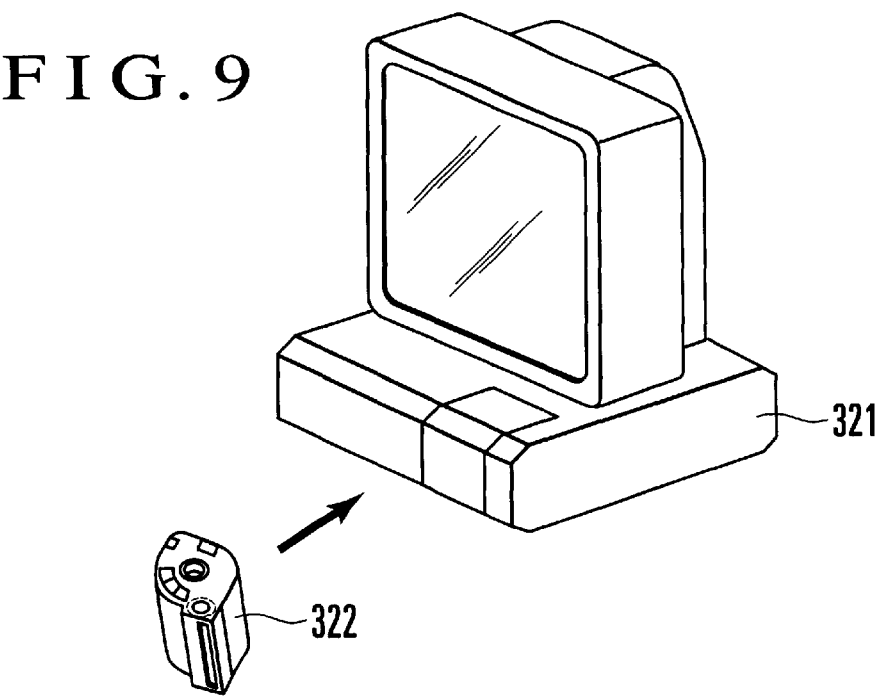
FIG. 9 is a conceptual view showing an image display apparatus according to a third embodiment of the invention.

FIG. 9 is a conceptual view showing an image display apparatus 321. A developed IX240 film 322 (hereinafter referred to as a D cartridge) is loaded on the image display apparatus 321 as the negative film. The image display apparatus 321 then reverses the negative image on the film into a positive image to be displayed with a high degree of definition.

Figure 10:
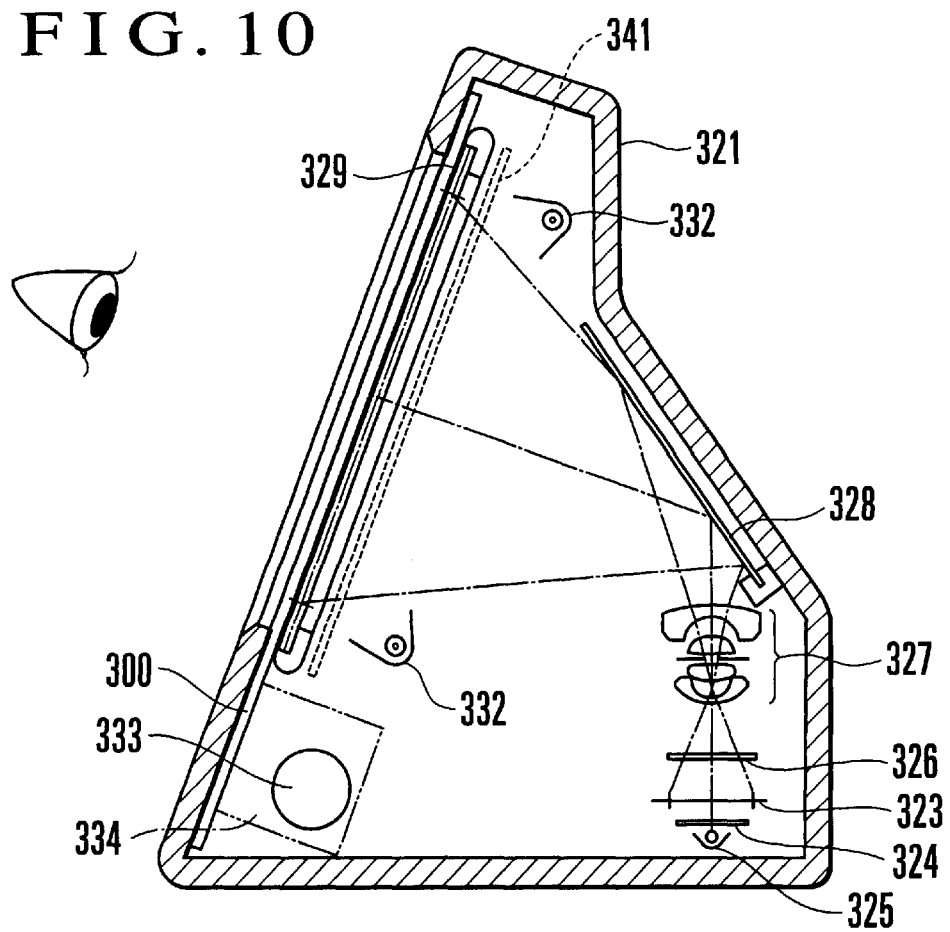
FIG. 10 is a sectional view showing the image display apparatus shown in FIG. 9.

FIG. 10 is a sectional view of the image display apparatus 321. Referring to FIG. 10, a developed negative film 323 on which images are recorded by photo-taking shots is pulled out from the D cartridge 322. The frames of the film are indexed one by one to be brought to a position as shown in FIG. 10 by means of a film transport mechanism 342 (see FIG. 15).

A diffusing plate 324 which is in a milky white color is arranged to diffuse light emitted from a flash device 325 to uniformly illuminate the negative film 323.

The flash device 325 is of the kind generally used for a camera or the like and is composed of a xenon lamp, a reflector, a light emission circuit, etc. The flash device 325 is arranged to emit light in response to a trigger signal from a microprocessor (not shown).

An orange-base removing filter 326 is arranged to remove the color of an orange base from the negative image. The filter 326 is composed of an optical filter having a blue color complementary to an orange color.

A projection lens 327 is arranged to project a negative image of the negative film 323 at a predetermined enlarging magnification on a photoelectric conversion layer of the SLM 329 through a reflection mirror 328.

Figure 11B:
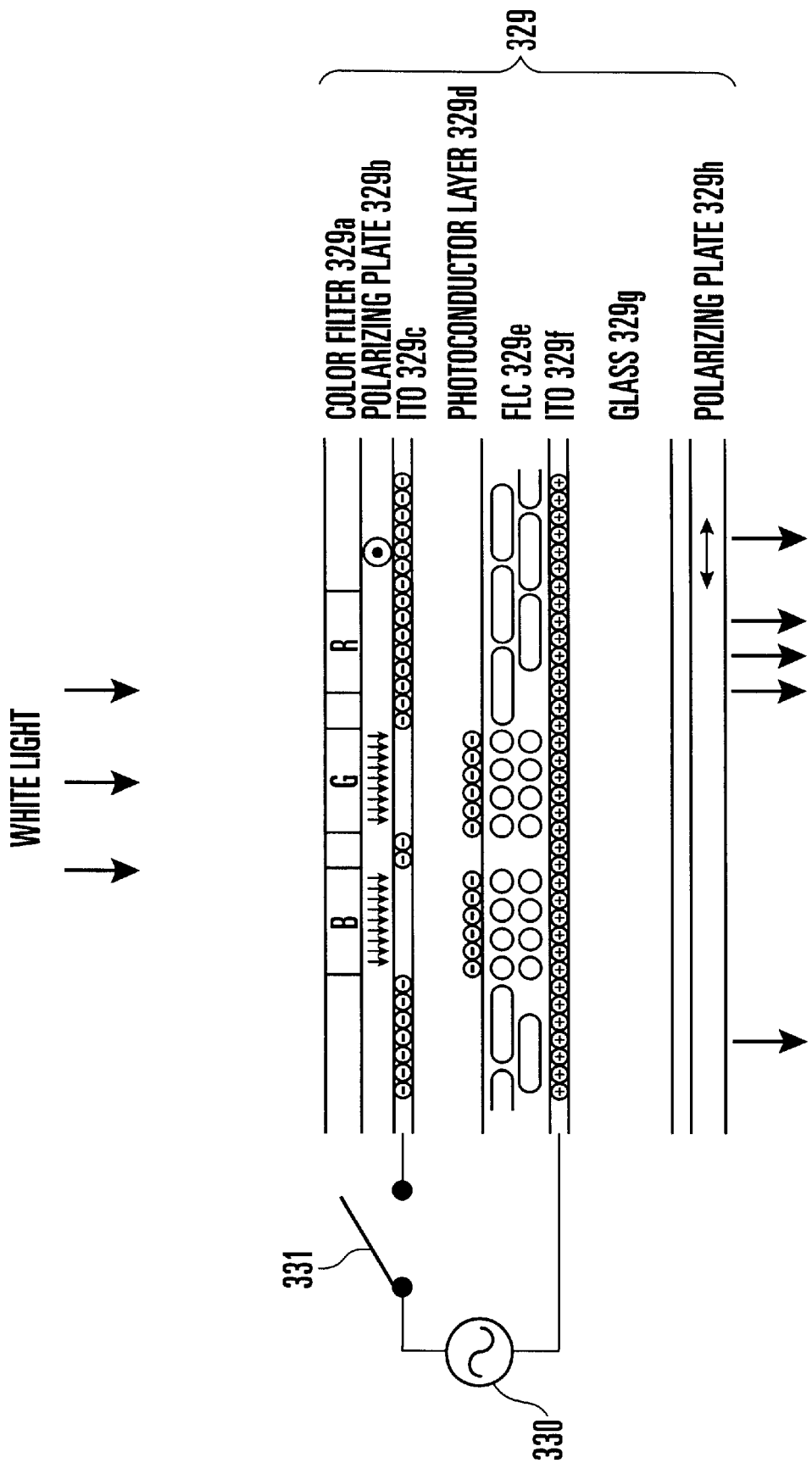
FIGS. 11(*a*) and 11(*b*) are conceptual views showing an SLM (spatial light modulator) used for the image display apparatus in states obtained in writing an image and in observing an image, respectively.

The details of the SLM 329 are shown in FIGS. 11(a) and 11(b). FIG. 11(a) shows the SLM 329 in a state obtained in writing an image. FIG. 11(b) shows the SLM 329 in a state for image observation.

A color filter 329a is either a filter of pure colors or of complementary colors. For the image display apparatus, the color filter 329a is preferably a fine-mesh filter generally used for the image sensor (CCD) of a video camera as it permits observation without deteriorating a silver-halide image.

Polarizing plates 329b and 329h are arranged to have a liquid crystal layer sandwiched between them. The polarizing direction of the polarizing plate 329b is perpendicular to the drawing plane of FIG. 11(a) and that of the other polarizing plate 329h is in the lateral direction of the drawing plane of FIG. 11(a). In other words, the polarizing plates 329b and 329h are arranged to have the so-called crossed Nicols structure.

The SLM 329 includes transparent conductive films 329c and 329f (hereinafter referred to as ITO films). The ITO films 329c and 329f are normally made of indium oxide or the like. An AC power source 330 and a circuit (not shown) provided for driving the AC power source 330 are arranged to apply potentials of opposite polarities to the ITO films 329c and 329f through a switch 331.

A photoconductor layer 329d is composed of a photodiode layer with an amorphous film or OPC (organic semiconductive film) or the like. One side of the photoconductor layer 329d is in tight contact with the ITO film 329c and the other side to an FLC 329e.

The FLC 329e is a liquid crystal layer. One side of the FLC 329e is in tight contact with the photoconductor layer 329d while the other side is in tight contact with the above-stated ITO film 329f.

A glass part 329g is arranged to seal the liquid crystal layer and also to protect other layers.

A negative film 329j is an imaged representation of the pixels of the negative film 323 projected by the projection lens 327.

Again referring to FIG. 10, an illumination means 332 is of a linear type (hereinafter referred to as a reading light source). A shutter device 300 is disposed in front of the SLM 329 on the side of the observer.

Figure 12:
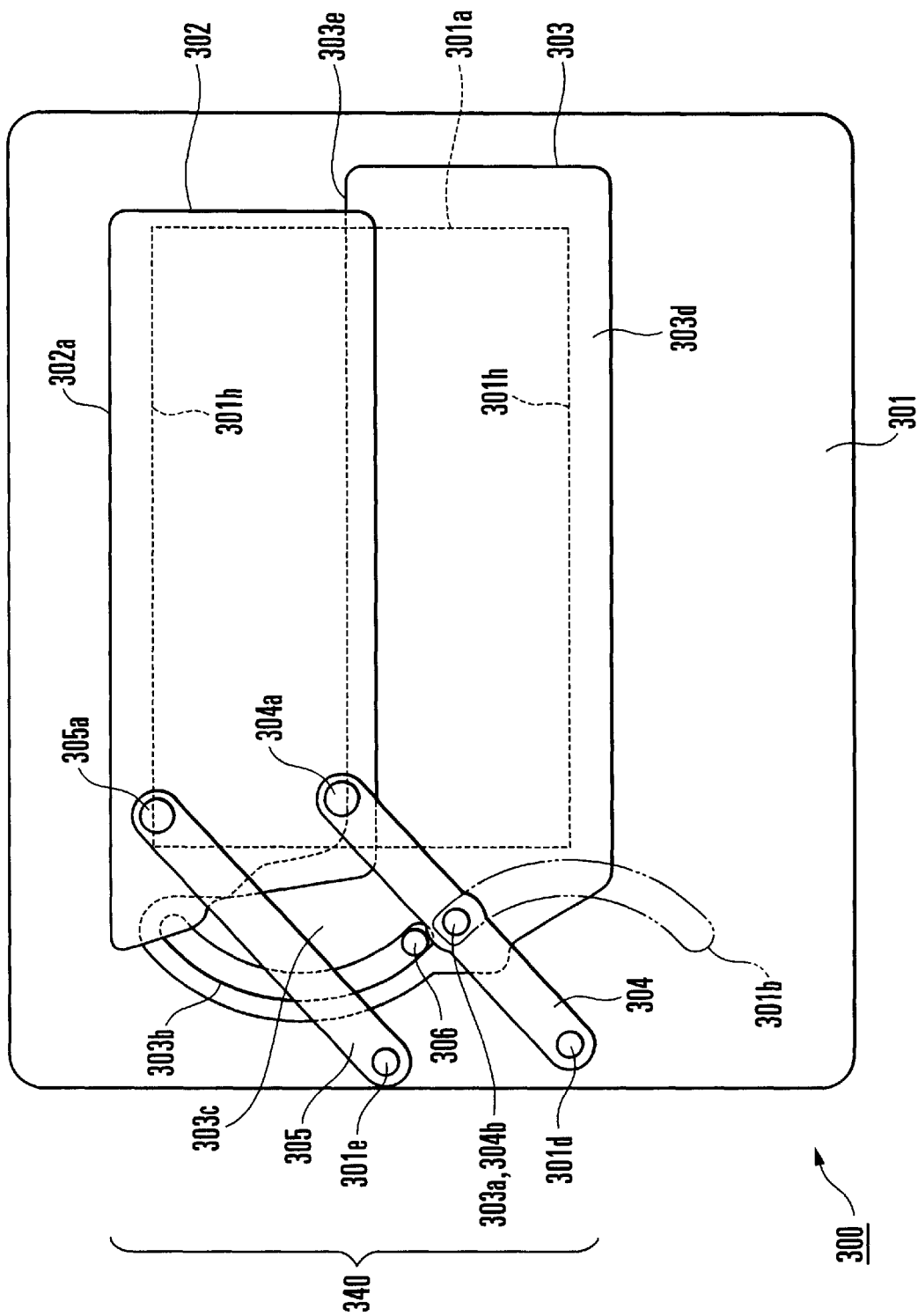
FIG. 12 is a front view showing a shutter device used for the image display apparatus when the shutter device is in the closed state.
Figure 13:
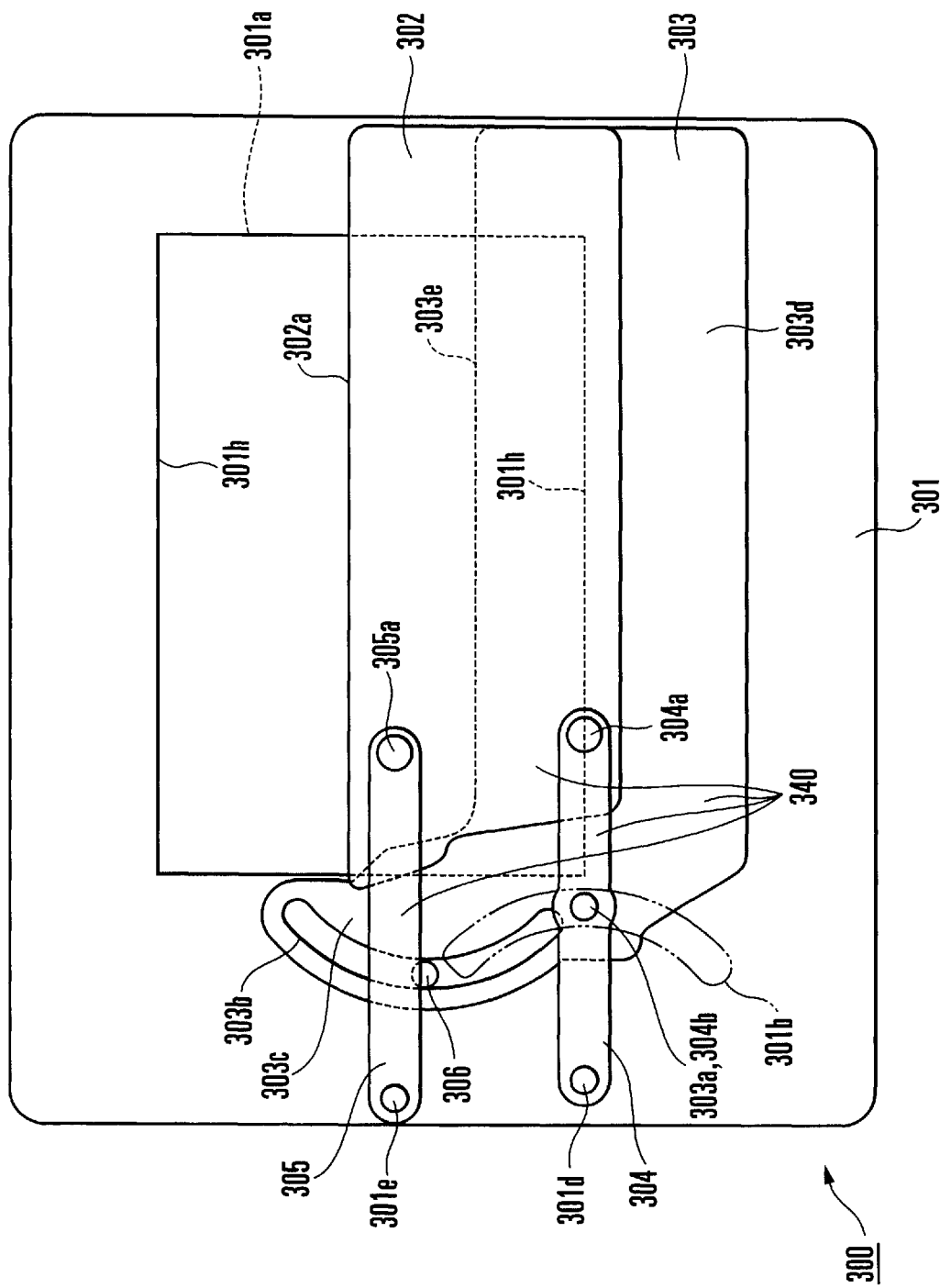
FIG. 13 is a front view showing the shutter device shown in FIG. 12 when the shutter device is in process of shifting from the closed state to the open state.
Figure 14:
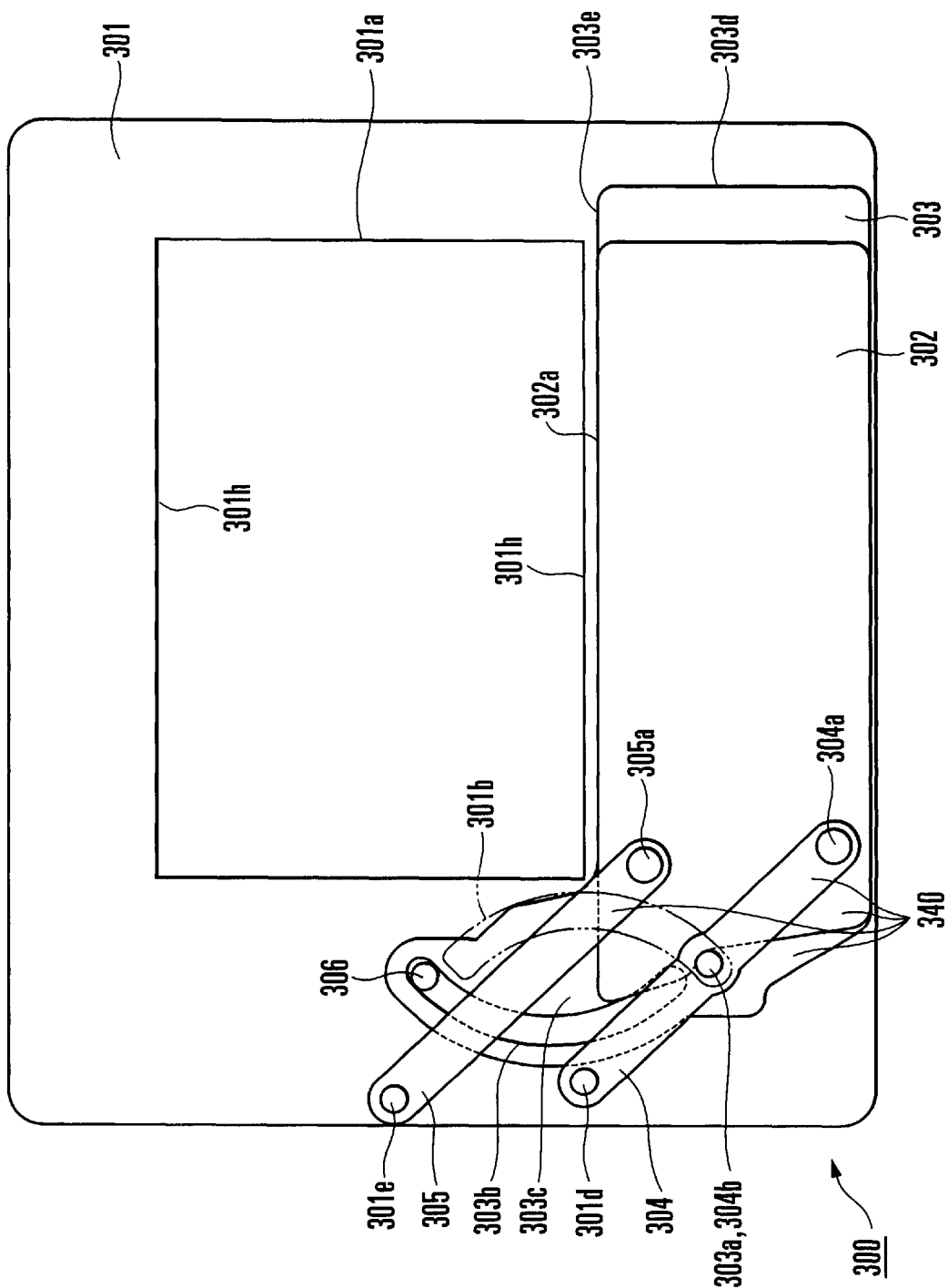
FIG. 14 is a front view showing the shutter device shown in FIG. 12 when the shutter device is in the open state.

FIGS. 12, 13 and 14 show the arrangement of the shutter device 300. FIG. 12 shows the shutter device 300 in a state obtained with external light blocked from the image plane of the SLM 329. FIG. 13 shows the shutter device 300 in a state obtained while the image plane of the SLM 329 is in process of being released from the light-blocked state. FIG. 14 shows the shutter device 300 in a state obtained with the image plane of the SLM 329 opened to external light.

Referring to FIGS. 12, 13 and 14, a shutter base plate 301 has a shutter aperture 301a formed therein. A slot 301b forms a moving space for a driving pin arranged on a leading-curtain driving lever (not shown) which is arranged to impart traveling energy to a blade unit.

A first shutter blade 302 is a first blade member and has an end (side) part 302a linearly extending in the longitudinal direction of the blade 302.

A second shutter blade 303 is a second blade member. A first arm 304 is a first link forming member and has a base end part mounted on a shaft 301d on the shutter base plate 301 in such a way as to be swingable thereon. The first shutter blade 302 is mounted in a swingable manner on a caulked dowel 304a which is provided at the fore end of the first arm 304.

The first arm 304 is provided with a hole 304b for fitting the driving pin therein. With the driving pin fitted in the hole 304b, a driving force is transmitted to the first arm 304 from the driving lever, which has a rotating shaft arranged coaxially with the shaft 301d. A driving force generated by a motor 333 is arranged to be transmitted to the driving lever through a gear train 334 (indicated by a two-dot chain line in FIG. 10).

A second arm 305 is a second link forming member. The base end part of the second arm 305 is mounted in a swingable manner on a shaft 301e on the shutter base plate 301. A caulked dowel 305a is provided at the fore end of the second arm 305 and has the first shutter blade 302 mounted thereon in a swingable manner.

A parallel link is thus formed jointly by the first shutter blade 302 and the first and second arms 304 and 305.

Meanwhile, the driving pin of the driving lever is fitted in a hole 303a formed in the second shutter blade 303. A driving force is thus transmitted directly to the second shutter blade 303 from the driving lever without being transmitted through the first arm 304.

The second shutter blade 303 is composed of a light-blocking part 303d which is arranged to open and close the shutter aperture 301a, and a working part 303c in which the above-stated hole 303a and a cam slot (a guide cam) 303b are formed. The working part 303c is formed at an end part in a longitudinal direction (in the direction of width of the shutter aperture) of the light-blocking part 303d to extend in an upward direction perpendicular to that longitudinal direction.

A guide pin 306 is provided on the shutter base plate 301. The shutter base plate 301 is a base plate forming member. The guide pin 306 is fitted in the cam slot 303b of the second shutter blade 303. The guide pin 306 and the cam slot 303b are arranged to be smoothly slidable on each other.

The cam slot 303b is formed approximately on a line extending from the locus of motion (the slot 301b) of the driving pin of the driving lever. The cam slot 303b is thus arranged to eliminate waste of energy in the direction of exertion of power for smooth motion of the second shutter blade 303.

An end part 303e of the second shutter blade 303 which longitudinally extends along the upper end of the light-blocking part 303d of the second shutter blade 303 is parallel with the upper and lower sides 301h of the shutter aperture 301a. The blade unit 340 is formed in the above-mentioned manner.

Figure 15:
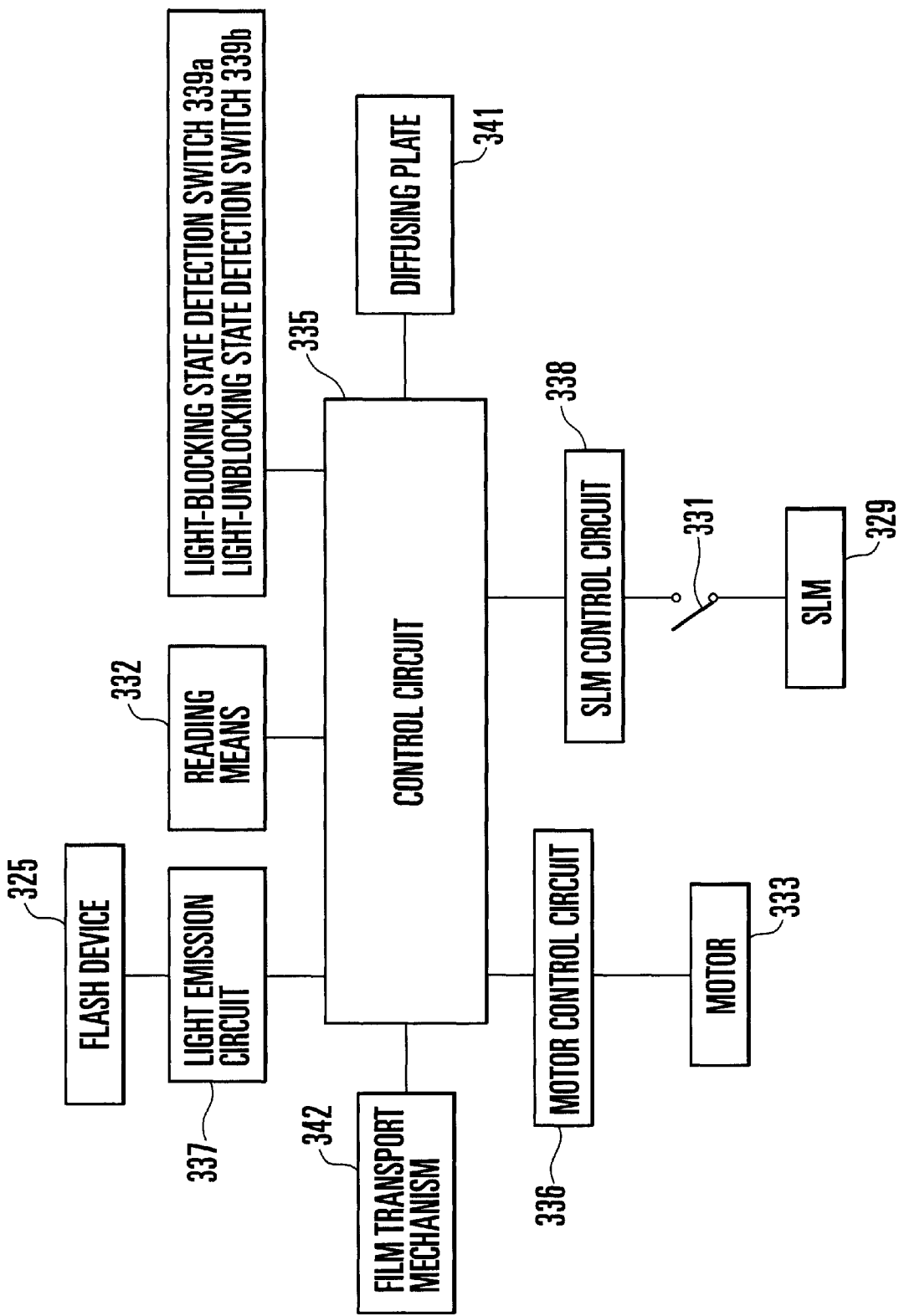
FIG. 15 is a block diagram showing the electric circuit arrangement of the image display apparatus.

FIG. 15 shows the electric circuit arrangement of the image display apparatus 321. The image display device 321 has a control circuit 335 arranged to control a sequence of actions of the whole apparatus. A motor control circuit 336 controls the forward and reverse rotations of the motor 333.

A light emission circuit 337 controls the light emission of the flash device 325. An SLM control circuit 338 controls the switch 331, which is arranged to turn on and off the supply of power to the SLM 329.

A light-blocking state detection switch 339a is arranged to turn on when the shutter aperture 301a is completely closed by the blade unit 340. A light-unblocking state detection switch 339b is arranged to turn on when the shutter aperture 301a is completely opened by the blade unit 340.

A diffusing plate 341 is arranged on the back side of the SLM 329 to operate in association with the opening and closing actions of the blade unit 340. The diffusing plate 341 comes to take a diffusing state when the blade unit 340 is open to diffuse the illumination light of a reading light source (reading means) 332 in such a way as to approximately uniformly illuminate the SLM 329. The diffusing plate 341 becomes transmissive when the blade unit 340 is closed.

The operation of the image display apparatus 321 is next described with reference to FIG. 16 which is a flow chart. The flow of procedures of this flow chart begins when the image display apparatus 321 is loaded with the D cartridge 322. At this moment, the shutter aperture 301a is in a state of being completely closed with the blade unit 340. In other words, at this point of time, the image on the SLM 329 can not be seen by the user (observer).

Figure 16:
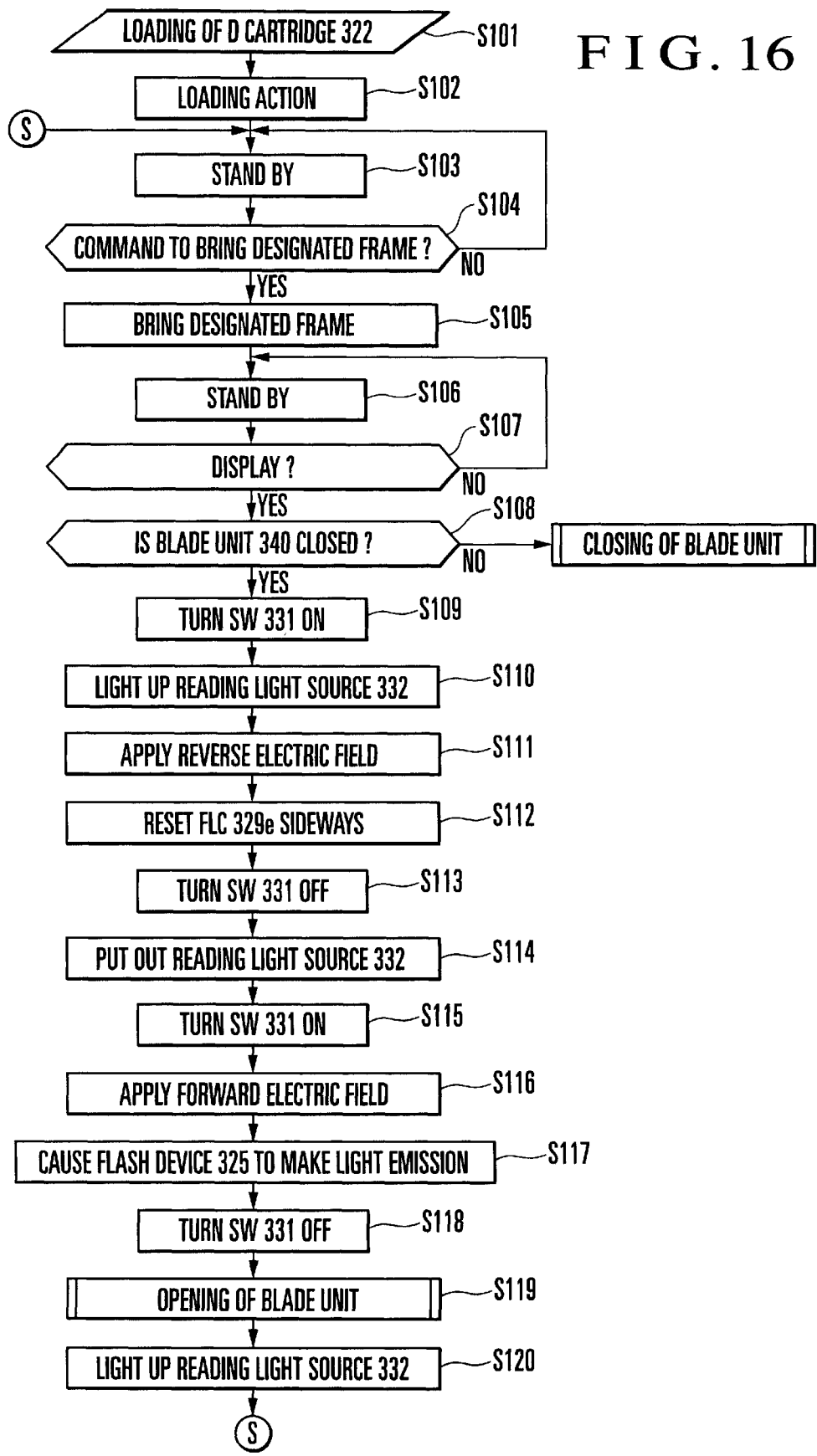
FIG. 16 is a flow chart showing the operation of the image display apparatus.

Referring to FIG. 16, at step S101, the user loads the image display apparatus with the D cartridge 322 for viewing images existing within the D cartridge 322. At step S102, the control circuit 335 drives the film transport mechanism 342 to perform a thrust action to move the negative film 323 out from the inside of the D cartridge 322. The first frame portion of the film in the D cartridge 322 is then brought to an aperture part (not shown) of the image display apparatus 321. At step S103, the control circuit 335 takes the state of a stand-by mode in which it waits for arrival of a signal from some of switches (not shown).

At step S104, when a signal for advancing the picture on the image plane to the image of a certain frame is received, for example, from a remote control device, the flow of operation proceeds to step S105. At the step S105, the control circuit 335 causes the frame thus designated to be sent to the aperture part of the image display apparatus 321. At step S106, the flow waits for a command as to whether or not this frame is to be displayed.

At step S107, when a display command is received from the user, the flow proceeds to step S108. At the step S108, the control circuit 335 makes a check through the on-state or off-state of the light-blocking state detection switch 339a to find if the blade unit 340 is closed. In other words, in order to erase the image of a frame on display last time and to write a new image in a state of having the shutter aperture 301a completely closed with the blade unit 340, the control circuit 335 makes a check for a closed state of the blade unit 340.

If the blade unit 340 is found not in the closed state, the flow proceeds to a "closing of blade unit" subroutine which will be described later herein with reference to FIG. 17.

If the blade unit 340 is found to be in the closed state, the flow proceeds from the step S108 to step S109. At the step S109, the switch 331 is turned on to permit the supply of power. At the next step S110, the reading light source 332 is lighted up. At step Sill, an electric field of polarity which is reverse to the polarity of electric field obtained in writing is applied from the power source 330.

At step S112, all the cells of the FLC 329e are inverted sideways into a neutral state as indicated at a part of the FLC 329e in FIG. 11(a). At steps S113 and S114, the above-stated frame image erasing action is carried out for a sufficient period of time to make all cells into the above-stated neutral state. After that, the control circuit 335 turns the switch 331 off to put out the reading light source 332.

After the step S114, the flow proceeds to procedures for writing a new frame image on the SLM 329.

The current condition of the image display apparatus 321 is assumed to be set, for example, on top of a desk in an office or on a shelf in a house at an ambient brightness measuring approximately several hundred luxes. The brightness of external light is reduced approximately to one half thereof by allowing it to come through the polarizing plate 329h and the liquid crystal layer 329e before it falls on the photoconductor layer 329d. Under this condition, however, no electric field is applied between the ITO films 329c and 329f as the switch 331 still remains in its off-state. Therefore, the FLC 329e does not react to the incident light.

At step S115, the switch 331 is turned on to bring about an energized state. At step S116, a forward electric field which is required for image writing is applied from the power source 330 to the ITO films 329c and 329f. At step S117, the flash device 325 is caused to emit light. By the light of the flash device 325, an image on the negative film 323 is projected onto the SLM 329. The projected image is written (stored) in the SLM 329.

The light emission from the flash device 325 at the step S117 lasts about 500 μsec. Therefore, the switch 331 is allowed to be in its on state at the step S116 for a period of time which is about the same as the period of light emission.

At step S118, after completion of the light emission, the control circuit 335 promptly cuts off the electric field by turning off the switch 331.

Figure 18:
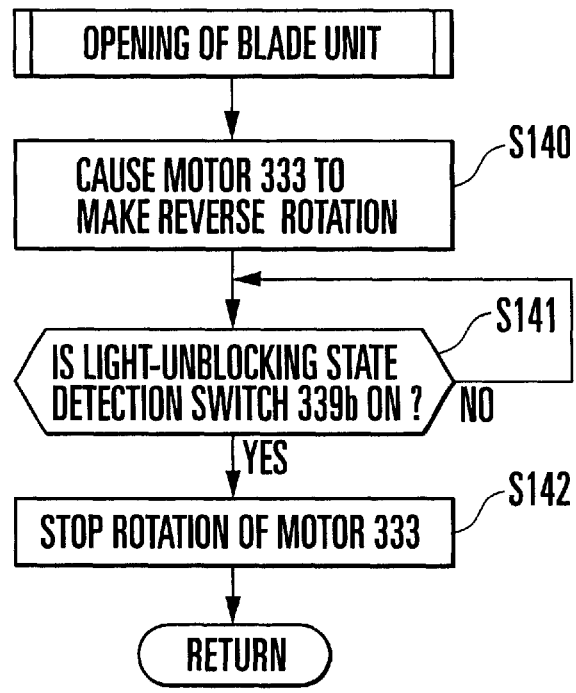
FIG. 18 is a further flow chart showing the operation of the image display apparatus.

At step S119, the flow proceeds to the "opening of blade unit" subroutine to enable the user to see the image written into the SLM 329 by opening the shutter aperture 301a. This subroutine is shown in FIG. 18.

At step S120, the control circuit 335 causes the reading light source 332 to light up to enable the user to view the image written in the SLM 329 with the aid of transmitted illumination. After that, the flow returns to the step S103 to wait for the next command.

Figure 17:
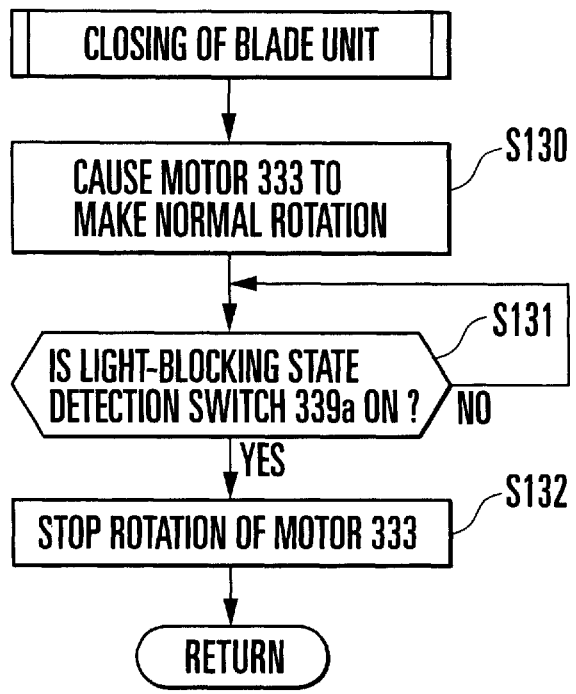
FIG. 17 is another flow chart showing the operation of the image display apparatus.

The "closing of blade unit" subroutine is next described referring to FIG. 17, which is a flow chart.

At step S130 of FIG. 17, to close the shutter from the open state shown in FIG. 14 into the closed state shown in FIG. 12, the control circuit 335 causes the motor 333 to make forward rotation through the motor control circuit 336. The driving force of the motor 333 causes, through the gear train 334, the first arm 304 to swing on the shaft 301d counterclockwise as viewed in FIG. 14. The first arm 304 then causes the blade unit 340 to shift its position to the state shown in FIG. 12 through the state shown in FIG. 13. Further, the control circuit 335 causes the diffusing plate 341 to shift its state from a diffusing state to a transmissive state.

The light-blocking state detection switch 339a turns on from its off-state at about the same time as the completion of the closing action of the blade unit 340 on the shutter aperture 301a. At step S131, the control circuit 335, therefore, makes a check to find if the blade unit 340 has come to its closing position. If so, the flow proceeds to step S132. At the step S132, the control circuit 335 stops the motor 333 from rotating through the motor control circuit 336. Then, this subroutine comes to an end.

The "opening of blade unit" subroutine is next described below referring to the flow chart of FIG. 18.

At step S140 of FIG. 18, to open the shutter from the closed state shown in FIG. 12, the control circuit 335 causes the motor 333 to make reverse rotation through the motor control circuit 336. The driving force of the motor 333 is transmitted to the first arm 304 through the gear train 334. The first arm 304 then swings clockwise on the shaft 301d as viewed in FIG. 12. This causes the blade unit 340 to shift its position to the position shown in FIG. 14 through the state shown in FIG. 13.

Further, the control circuit 335 causes the state of the diffusing plate 341 from the transmissive state to the diffusing state. The illumination light of the reading light source 332 is diffused by the diffusing plate 341 to approximately uniformly illuminate the SLM 329.

Then, the light-unblocking state detection switch 339b turns on from its off-state at about the same time as when the shutter aperture 301a is completely opened by the blade unit 340. At step S141, the control circuit 335, therefore, makes a check to find if the blade unit 340 has opened. If so, the flow proceeds to step S142. At the step S142, the control circuit 335 stops the motor 333 from rotating through the motor control circuit 336. Then, this subroutine comes to an end.

The image display apparatus according to the third embodiment is thus arranged to prevent external light from coming to the SLM 329 by means of the shutter device 300 in writing an image into the SLM 329. The arrangement effectively eliminates image noises due to external light, which hitherto occur in the conventional image display apparatuses arranged to write images with the SLM left exposed to external light. Therefore, while it has been necessary to project a film image by the aid of a large quantity of image writing light from a flash device for obtaining a clear image, the image display apparatus according to the third embodiment obviates the necessity of such a large quantity of light from the flash device 325. As a result, the flash device 325 can be compactly arranged to permit a reduction in size of the image display apparatus. Further, the projection lens 327 does not have to be arranged to have a bright F-number, so that the lens of an image projecting optical system can be designed to have a small outside diameter. Besides, a length of time required in writing an image can be shortened to a great extent.

In the third embodiment, while the first shutter blade 302 is arranged to be driven to travel through a parallel link, the second shutter blade 303 is arranged to be driven to travel approximately in parallel by the guiding action of the guide pin 306 of the shutter base plate 301 and the cam slot 303*b*, instead of traveling through any parallel like arrangement. This arrangement permits the blade to be in a relatively simple shape, which permits a reduction in size (particularly in width) of the shutter device 300 as a whole. Besides, a light-blocking effect can be adequately attained by ensuring a sufficient mutual overlapping amount of blades when they are in a spread state, as shown in FIG. 12, without impairing the smooth motion of the blades 302 and 303.

Further, in the third embodiment, the working part 303*c* is arranged to be in a long and narrow shape extending in the longitudinal direction of the light-blocking part 303*d* of the second shutter blade 303, and the second shutter blade 303 is thus formed approximately in an L shape as a whole. That arrangement is very advantageous for a reduction in lateral dimension (width) of the shutter.

In the third embodiment, the guide slot 303*b* is formed in such a shape as to allow the second shutter blade 303 to move in parallel even while it is traveling. The second shutter blade 303 is arranged such that it is parallel with the shutter aperture 301*a* both in the state shown in FIG. 12 (the travel ready state) and the state shown in FIG. 14 (the travel completion state) in which the shutter aperture 301*a* is open and closed. The end part 303*e* of the second shutter blade 303 is thus arranged to remain parallel with the major side 301*h* of the shutter aperture 301*a* in these states. The guide slots 303*b* may be arranged to cause the second shutter blade 303 to make a slightly rotative motion as necessary while the second shutter blade 303 is in process of travel.

In the third embodiment, the shutter aperture 301*a* is formed in a rectangular shape. However, this shape of the shutter aperture 301*a* may be changed to have its minor side curved or to be in a polygonal shape such as a triangular, pentagonal or hexagonal shape. In other words, according to the invention, the shutter aperture 301*a* can be arranged in any shape as long as one of its sides is linear.

The light-blocking part 303*d* of the second shutter blade 303 may be made of, as in the case of the first embodiment shown in FIGS. 4(*a*) and 4(*b*), a light-weight material such as PET (polyethylene terephthalate) or the like. The working part 303*c* of the blade 303 has the hole 303*a* and the cam slot 303*b* formed therein. Since the second shutter blade 303 receives a force at the working part 303*c* when it travels, this part must have a high degree of strength and is, therefore, made of a strong material such as titanium, Super Duralumin, etc. The light-blocking part 303*d* and the working part 303*c* which is prepared in this manner may be joined together by adhesive or the like in a suitable manner.

For the purpose of strengthening the working part 303*c*, this part may be arranged to be thicker than the light-blocking part 303*d*, as in the case of the first embodiment, as shown in FIGS. 5(*a*) and 5(*b*).

According to the arrangement of the third embodiment described above, the barycenter of the second shutter blade 303 can be set closer to the working part without unnecessarily increasing its weight. Therefore, the inertia of the group of blades can be advantageously minimized for a high-speed travel and for suppression of energy required for the travel of the blades.

The strength of the working part 303*c* may be increased by arranging the second shutter blade 303 either to be made of, in its entirety, a material having a greater strength than the material used for the first shutter blade 302 or to be thicker in plate thickness than the first shutter blade 302.

It is possible to prevent the occurrence of friction while the shutter is in operation by applying surface treatment, such as metal plating or hard coating, to the part on the inner side of the cam slot 303*b* on which the guide pin 306 slides, or to parts around the cam slot 303*b*, or to the guide pin 306. It is also possible to have the guide pin 306 made of a high abrasion resisting material or to apply a heat treatment, such as nitriding, to the guide pin 306 if the pin is made of metal.

The smoothness of movement of the shutter in the third embodiment may be enhanced also by applying surface treatment, such as highly slippy coating (Teflon resin coating, for example), painting with a slippy paint, oil or a lubricant such as molybdenum disulfide, to the parts on the inner sides of the cam slot 303*b* on which the guide pin 306 slides, or to parts around the cam slot 303*b*, and further to the guide pin 306. It is also possible to form the second shutter blade 203 in its entirety with a slippy material, such as a PET, PEN (polyethylene naphthalate) or Teflon resin film material.

Further, in the case of the third embodiment, the guide pin 306 which is provided on the shutter base plate 301 is arranged to be fitted in the cam slot 303*b* which is formed in the second shutter blade 303. However, this arrangement may be changed to arrange the guide pin 306 on the second shutter blade 303 to engage a cam slot or some other guide cam formed in the shutter base plate.

Each of the first to third embodiments described above is arranged such that, while the first blade member is driven to travel, the guiding action of the base plate forming members is arranged to allow the second blade member which travels to a less extent than the first blade member to travel in the same posture or attitude at least in both a state of having the shutter aperture open and a state of having the shutter aperture closed. The arrangement permits a simplification of the shapes of the blade members and a reduction in size (particularly in width) of the shutter as a whole. The arrangement further gives an adequate light-blocking effect ensuring that the blades retain a sufficient mutual overlapping amount when the group of the blades is spread without impairing the smoothness of motion of these blades.

FIGS. 19 to 25 show the arrangement of a focal plane shutter according to a fourth embodiment of the invention. The shutter is adapted for an optical apparatus, such as a camera, an interchangeable lens, an image display apparatus arranged to store and display images recorded on a film, etc. Further, the fourth embodiment and embodiments subsequent thereto which will be described hereinafter are improvements over the embodiments already described and have brake mechanisms added to the shutter devices.

Figure 19:
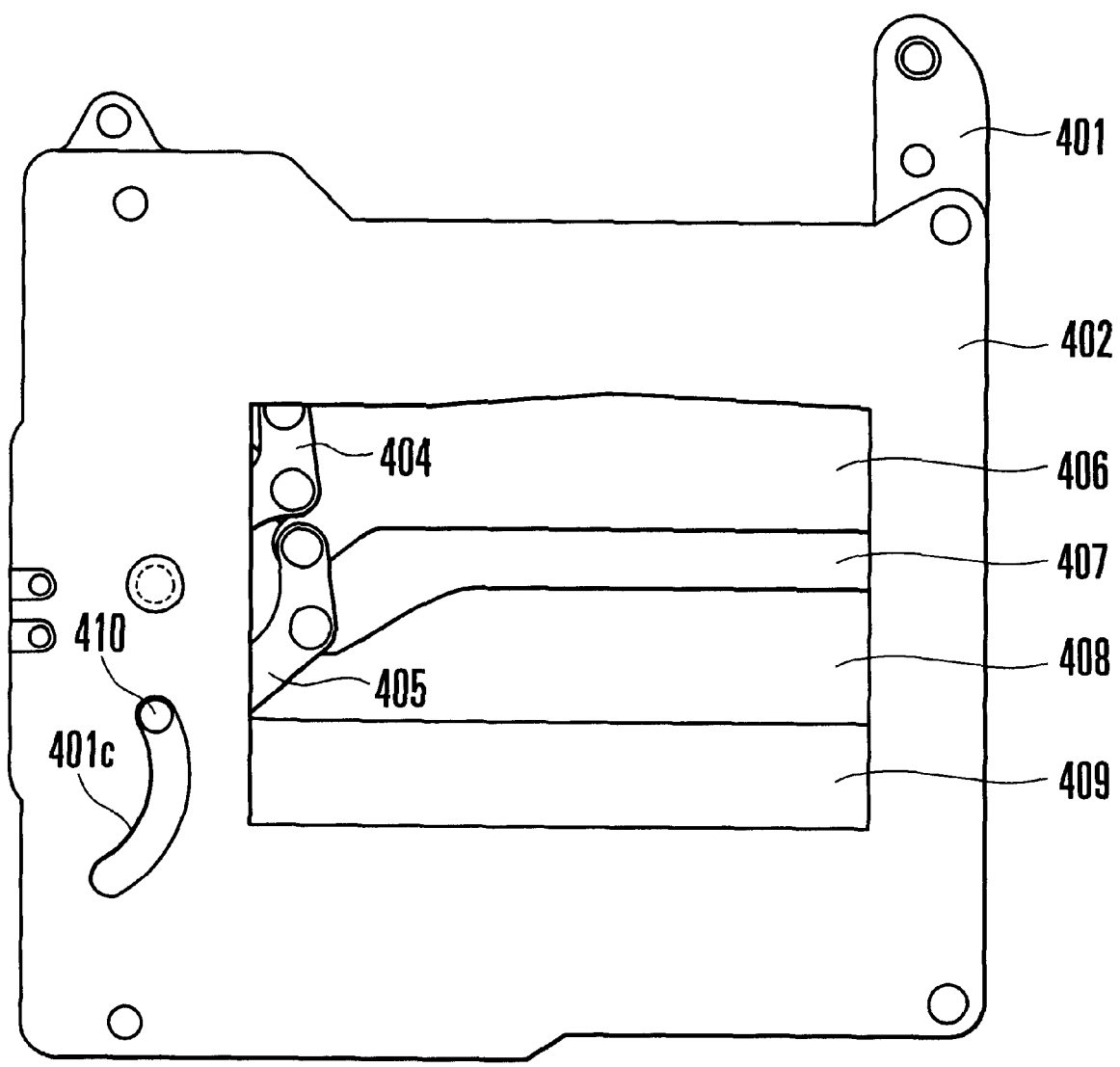
FIG. 19 is a front view showing the appearance of a focal plane shutter according to a fourth embodiment of the invention.
Figure 20:
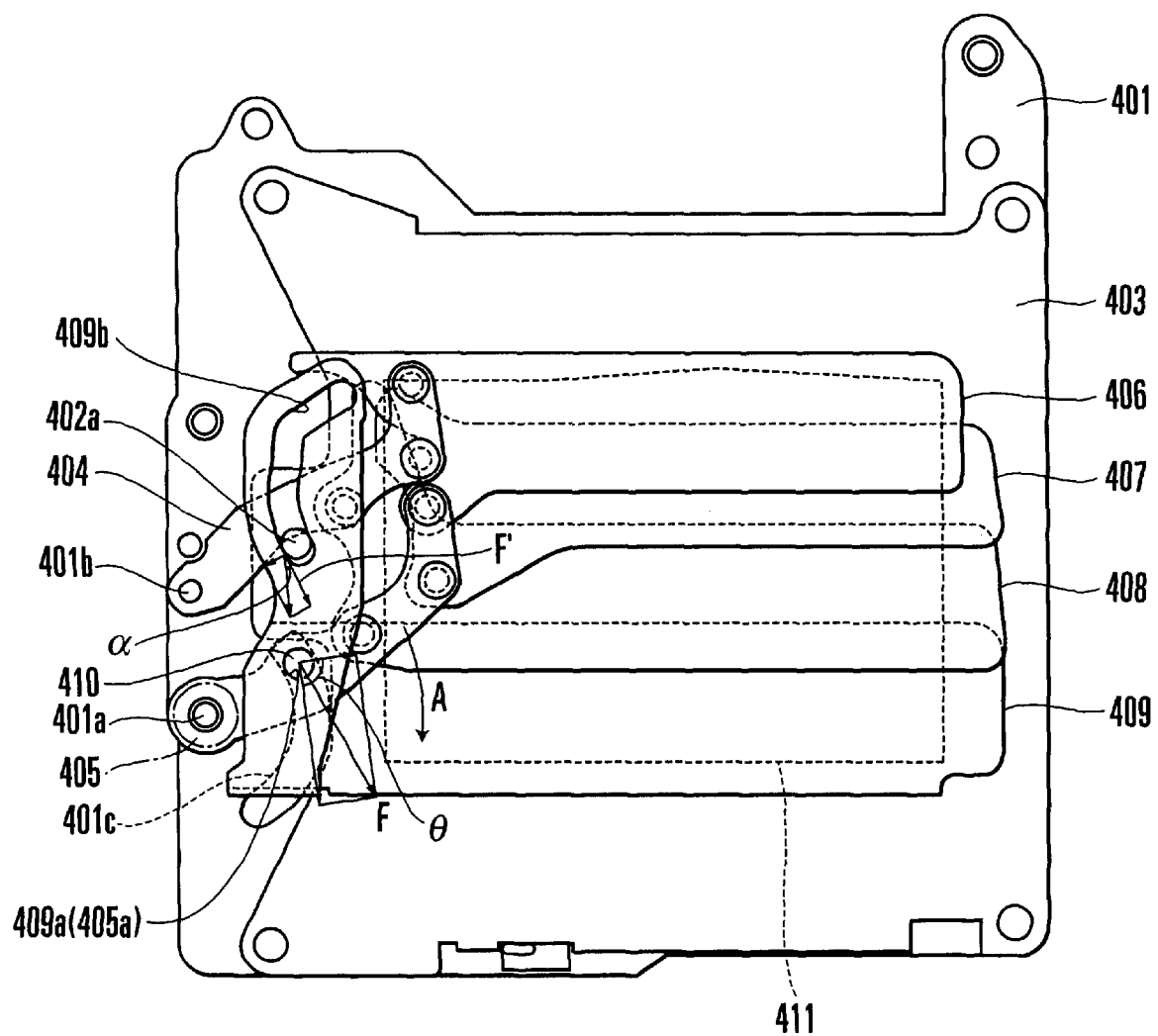
FIG. 20 is a front view showing the focal plane shutter according to the fourth embodiment in the leading-curtain spread state.
Figure 21:
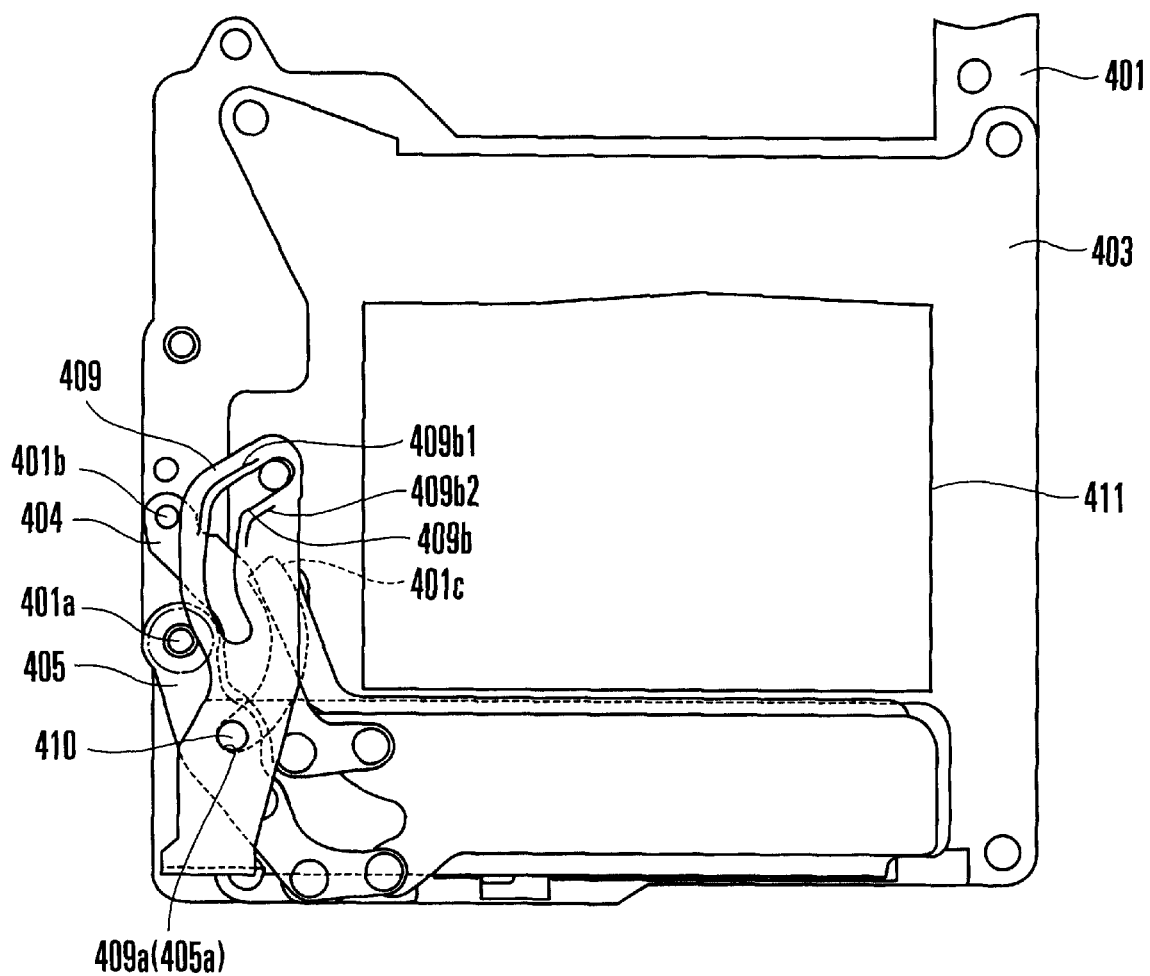
FIG. 21 is a front view showing the focal plane shutter according to the fourth embodiment in the leading-curtain superposed state.
Figure 22:
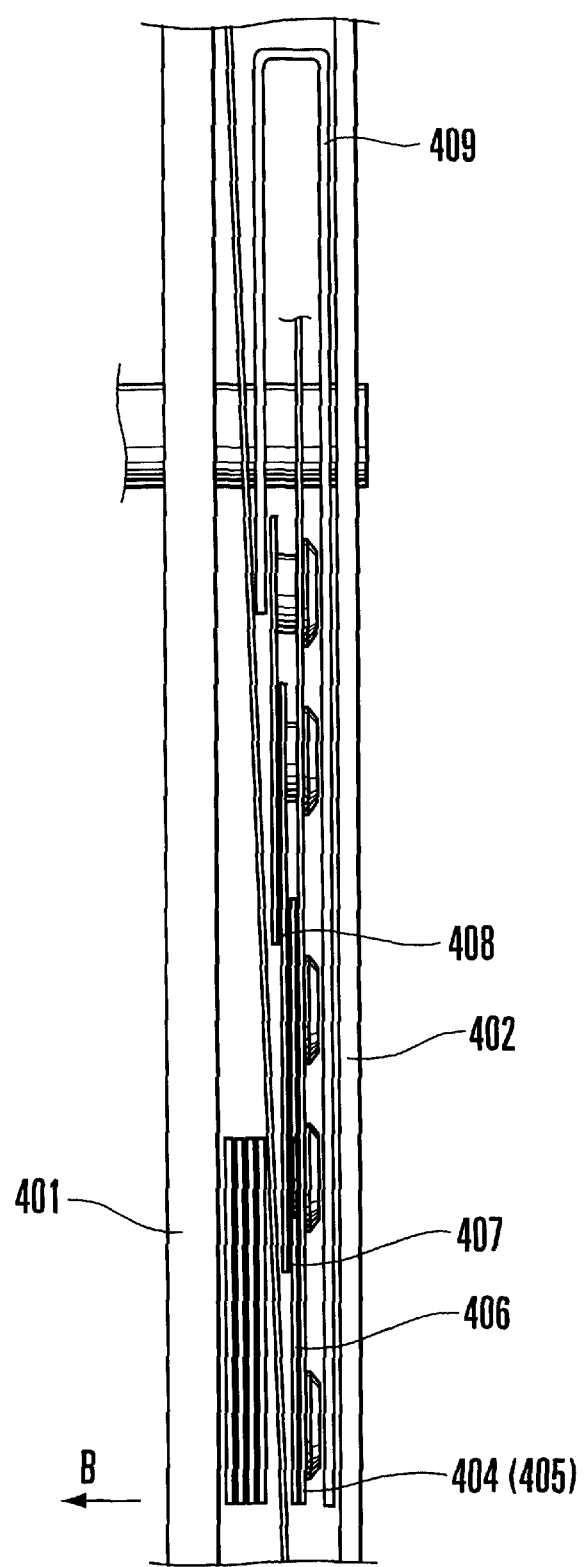
FIG. 22 is a side view showing the focal plane shutter according to the fourth embodiment in the leading-curtain spread state.
Figure 23:
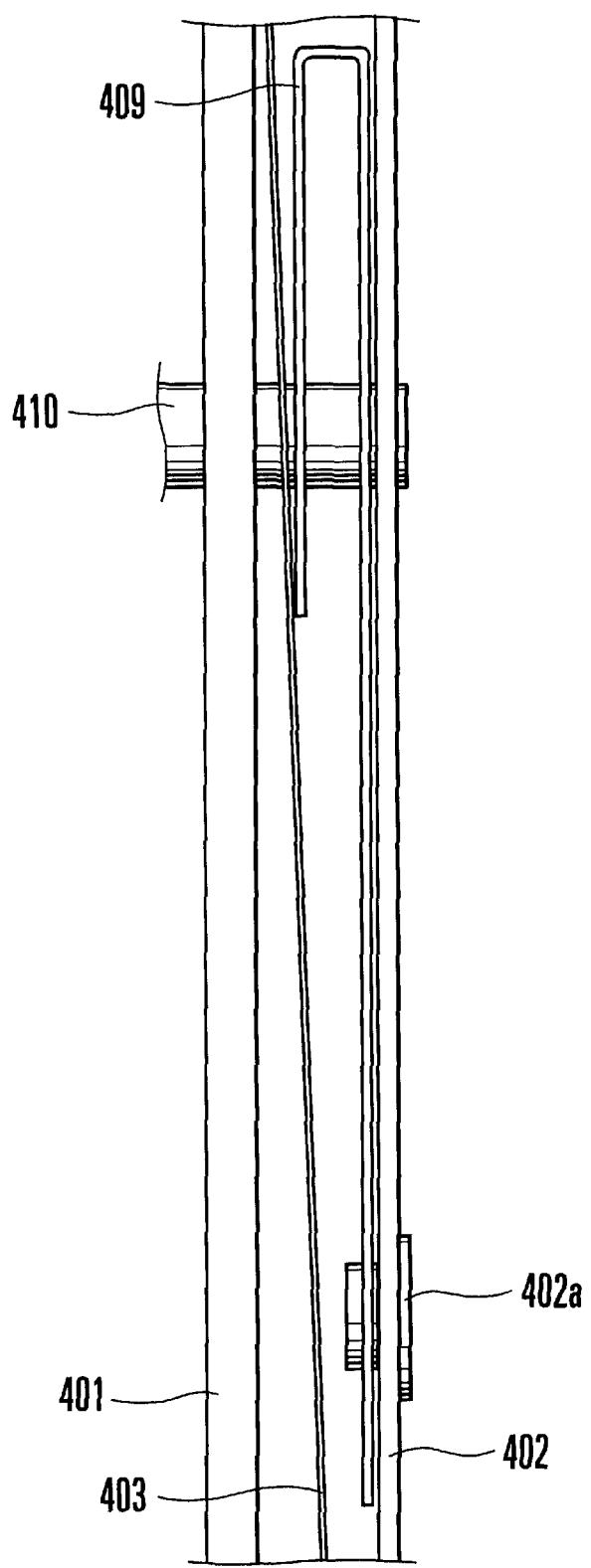
FIG. 23 is a side view showing, in the focal plane shutter according to the fourth embodiment, a state in which a fourth blade of the shutter engages a pin provided on the shutter base plate.
Figure 24:
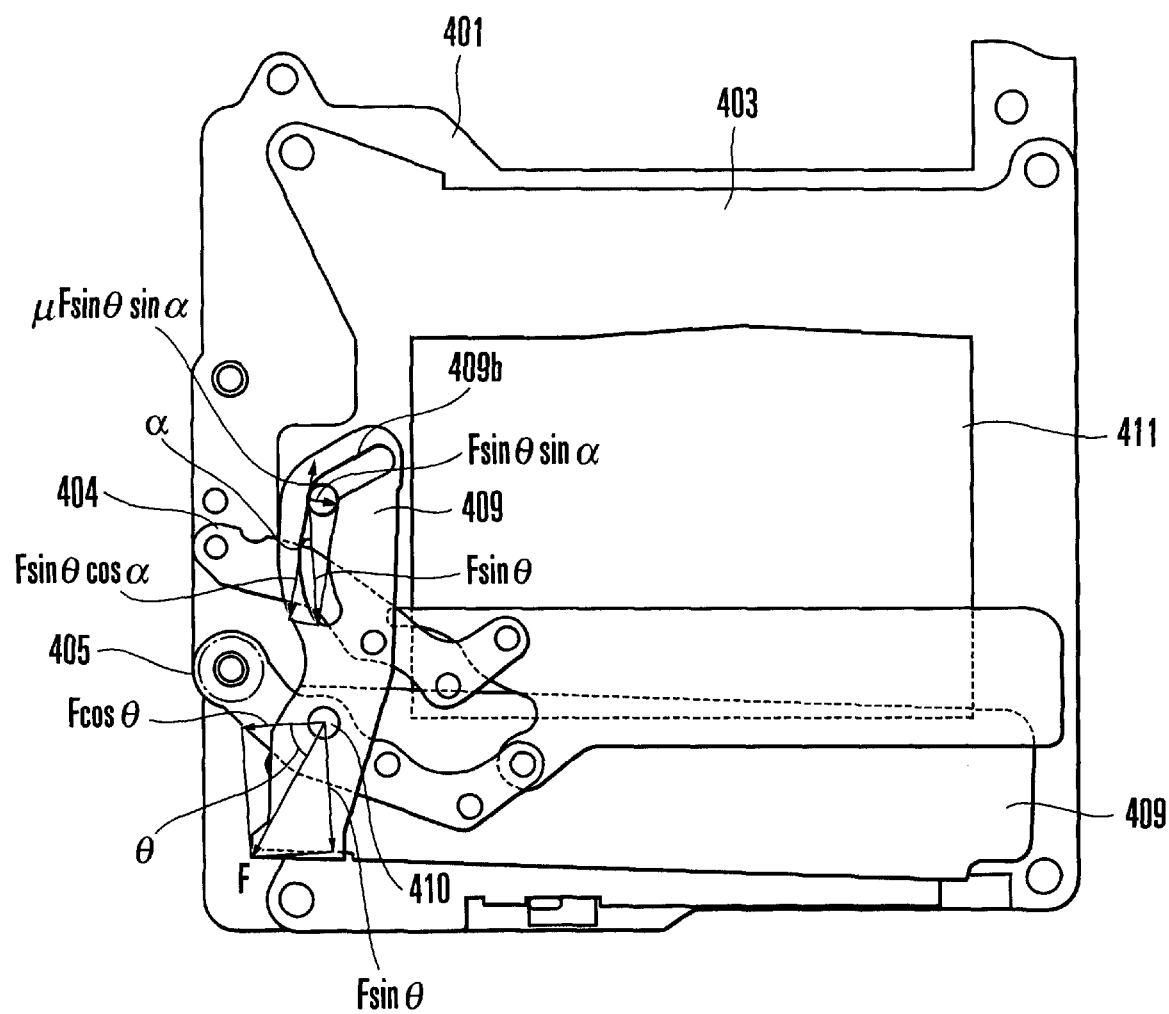
FIG. 24 is a front view showing, in the focal plane shutter according to the fourth embodiment, a force relationship obtained in the state where the shutter is traveling under a small amount of load.
Figure 25:
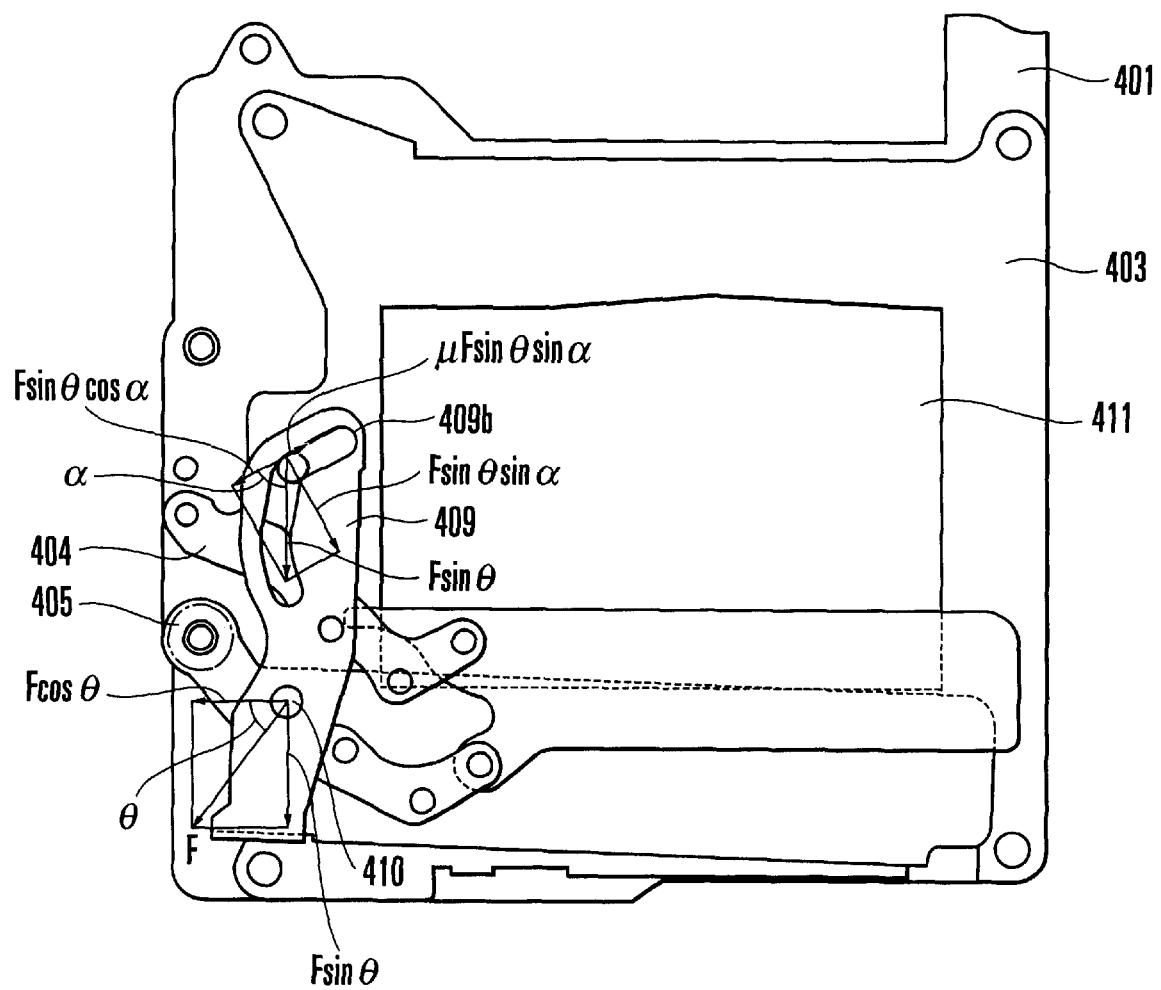
FIG. 25 is a front view showing, in the focal plane shutter according to the fourth embodiment, a force relationship obtained when a braking load begins to act during the travel of the shutter.

FIG. 19 is a plan view of the shutter. FIGS. 20 and 22 show the shutter in a state of spreading blades of the leading curtain of the shutter. FIG. 21 shows the shutter in a state of having the blades of the leading curtain superposed. FIG. 23 shows the shutter in a state of having a fourth blade 409 and a pin 402a engaging each other. FIG. 24 shows a force relationship obtained when the shutter is traveling under a small load. FIG. 25 shows the shutter in a state obtained with a braking load beginning to act while the shutter is traveling.

This shutter is arranged to form an exposure slit over an aperture 411 by alternately causing a shutter blade group forming the leading curtain and a shutter blade group forming the trailing curtain to be spread and superposed. The leading curtain and the trailing curtain are arranged substantially in the same manner except that the shutter blade groups swing in the opposite directions in spreading and the spread and superposed states obtained before and after the shutter travel of one blade group are reverse to those of the other blade group. Therefore, the following description covers only the leading curtain, and the trailing curtain is omitted from the description.

The shutter according to the fourth embodiment is composed of a shutter base plate 401, a cover plate 402 which is fixed in position opposite to the shutter base plate 401 to form a space for travel of shutter blades between them, a partition plate 403 which is arranged to partition the shutter travel space into a apace for the leading curtain and a space for the trailing curtain, a leading arm 405 and a trailing arm 404 which are mounted respectively on shafts 401a and 401b in such a way as to be swingable thereon, and a first blade 406, a second blade 407 and a third blade 408 which have their one end parts swingably connected to the leading arm 405 and the trailing arm 404.

The shutter further has a shutter driving lever (not shown) swingably mounted on a shaft (not shown) which is coaxial with the shaft 401a of the shutter base plate 401 and is located on the surface of the shutter base plate 401 on its side opposite to the side on which the shutter travel space is formed, and a fourth blade 409 which is arranged to be driven at the slowest speed together with the leading arm 405 by the swinging motion of the shutter driving lever.

An aperture 411 of an approximately rectangular shape is formed in each of the shutter base plate 401 and the cover plate 402.

A parallel link mechanism is formed with the leading arm 405 and the trailing arm 404 in conjunction with the first blade 406, the second blade 407 and the third blade 408 which are connected to the arms 405 and 404. An arm engaging pin 410 which is provided on the shutter driving lever rotatably engages a hole part 405a formed in the leading arm 405.

Therefore, when the leading arm 405 is driven to swing by the swinging motion of the shutter driving lever, the parallel link mechanism allows the first, second and third blades 406, 407 and 408 to move (travel) in parallel and in the direction of the minor side of the aperture 411. The first blade 406 then forms a slit for an exposure by traveling with its slit forming end moving in parallel with the slit forming end of a first blade of the trailing curtain (not shown).

The shutter driving lever is elastically urged to move in the direction of an arrow A shown in FIG. 20 by a spring or the like (not shown). The arm engaging pin 410 provided on the shutter driving lever rotatably engages also a hole part 409a formed in the fourth blade 409. Therefore, the fourth blade 409 also travels when the shutter driving lever swings.

Further, the arm engaging pin 410 is fitted in a guide slot 401c formed in an arcuate shape in the shutter base plate 401.

The fourth blade 409 has a cam slot (a cam part) 409b engaging a pin (an engaging part) 402a which is provided on the cover plate 402. The cam engaging action of the cam slot 409b and the pin 402a controls the posture of the fourth blade 409 while the shutter is traveling.

Further, as shown also in FIG. 23, the fourth blade 409 has its sectional shape in a U shape which is arranged to stow the first, second and third blades 406, 407 and 408 therein when the group of shutter blades is in a superposed state. When the shutter blades 406 to 409 are in a superposed state as shown in FIG. 21, the arm engaging pin 410 is abutting on a pin abutting member (not shown) to prevent the shutter from traveling further.

With the shutter (the fourth embodiment) arranged in the above-mentioned manner, in allowing the shutter to travel by releasing the shutter blades 406 to 409 from a charged state (a spread state), the shutter operates as described below.

The shutter is charged and kept in the charged state in a conventionally known manner. For example, the shutter is charged by causing the shutter driving lever to swing in the direction opposite to the direction of the arrow A against an urging force. After charging, the charged state is retained by energizing a magnetic coil to attract an armature provided on the shutter driving lever.

The shutter can be allowed to begin to travel by deenergizing the magnetic coil to cancel this charged state.

The shutter driving lever is arranged to exert an urging force constantly on the leading arm 405 in the direction of the arrow A while the shutter is in all of the different states. Therefore, when the shutter travel is allowed to begin by releasing the shutter from the charged state, the urging force causes the leading arm 405 to begin to swing in the direction of the arrow A.

Then, the swinging motion of the leading arm 405 causes the first, second and third blades 406, 407 and 408 to travel toward the superposed state shown in FIG. 21 while forming a slit in parallel with the major side of the aperture 411 perpendicular to the direction of travel of the shutter by virtue of the parallel link.

Meanwhile, since the urging force of the shutter driving lever in the direction of the arrow A is acting also on the fourth blade 409, the fourth blade 409 begins to travel at the same time as the commencement of travel of the first, second and third blades 406, 407 and 408. In this instance, the engagement of the cam slot 409b of the fourth blade 409 with the pin 402a of the cover plate 402 causes the fourth blade 409 to travel while varying its traveling attitude or posture.

As apparent from the comparison of FIG. 20 with FIG. 21, the amount of travel of the fourth blade 409 is smaller than that of each of the first, second and third blades 406, 407 and 408. Thus, the fourth blade 409 has the smallest amount of travel among all the shutter blades 406 to 409, and is driven at the slowest speed.

The shutter travel comes to a stop in a state of having the first, second and third blades 406, 407 and 408 stowed inside the U-shaped part of the fourth blade 409, as shown in FIG. 21.

Travel resistance taking place between the pin 402a and the cam slot 409b at the fourth blade 409 while the shutter is in process of travel, i.e., resistance to the travel of all the blades 406 to 409, varies as described below with reference to FIGS. 24 and 25.

Assuming that a driving force exerted on the arm engaging pin 410 in each of states taking place while the shutter is traveling is F, an effective component F' of the driving force F acting on the fourth blade 409 can be expressed, according to FIGS. 24 and 25, as follows:

$$F'=F \sin \theta \cos \alpha - \mu F \sin \theta \sin \alpha$$

In the right-hand side of the above formula, the second term "$\mu F \sin \theta \sin \alpha$" represents a sliding frictional force between the cam slot 409*b* and the pin 402*a*, and "$\mu$" represents a coefficient of friction.

When the effective component F' is at a negative value, the fictional force "$\mu F \sin \theta \sin \alpha$" becomes a value larger than a component force "$F \sin \theta \sin \alpha$" causing the cam slot 409*b* to move along the pin 402*a*. Then, the fourth blade 409 might ceases to travel. However, by setting an angle α shown in the formula above at such a value at which a kinetic energy given by the driving force F of the arm engaging pin 410 can be absorbed by the sliding friction term "$\mu F \sin \theta \sin \alpha$". Then, the kinetic energy can be arranged to act as a braking force immediately before the shutter travel is brought to a stop.

In the case of the fourth embodiment, the value of the term "$\mu F \sin \theta \sin \alpha$" is arranged to be suddenly increased by varying the angles a and θ during a period of time between the state shown in FIG. 24 and the state shown in FIG. 25. The arrangement is such that a frictional resistance force against the driving force component in the traveling direction of the cam slot 409*b* is increased to let the frictional resistance act as a braking force.

The brake arrangement effectively prevents an impact or a hitting noise from taking place when the arm engaging pin 410 abuts on the pin abutting member.

The above-stated brake applying action is arranged, through the shape of the cam slot 409*b*, to be performed when the leading curtain is allowed to travel from its spread state to its superposed state, i.e., when the charged state is canceled. However, if the brake applying action is arranged to be performed likewise also in charging the shutter, the charging action would be affected by such a brake applying action.

However, some amount of clearance is necessary for sliding contact between the pin 402*a* and the cam slot 409*b*. Therefore, the clearance exists when the fourth blade 409 travels and also in charging the shutter. The fourth embodiment is, therefore, arranged to generate some resistance at one side surface 409*b*1 of the cam slot 409*b*, at the time of travel, and at the other side surface 409*b*2 of the cam slot 409*b* in charging the shutter.

In this respect, the coefficient of friction of the side surface 409*b*2 of the cam slot 409*b* is set to be smaller than that of the side surface 409*b*1. The resistance taking place in charging the shutter can be lessened by applying a low friction treatment with, for example, a solid lubricant to make it different from the resistance taking place at the time of shutter travel. Therefore, the shutter can be smoothly charged by thus lowering the resistance of each of the shutter blades 406 to 409.

Generally, shutter blades are made of an opaque resin sheet material for a reduction in weight. However, the fourth blade 409 in the fourth embodiment must have some strength and durability as it is provided with the cam slot 409*b* for bringing about a braking force during the travel of the shutter and the hole part 409*a* for engaging the arm engaging pin 410. To meet this requirement, the fourth blade 409 is preferably made of, for example, a metal material or a light alloy such as duralumin and formed in one body.

In that instance, the weight of the fourth blade 409 becomes heavier than a blade made of a resin sheet material. However, since the travel speed of the fourth blade 409 is lower than all other blades, the inertia which becomes resistance to the shutter travel is small and is negligible for a shutter curtain travel speed of 1/2000 sec or thereabout.

Figure 32:
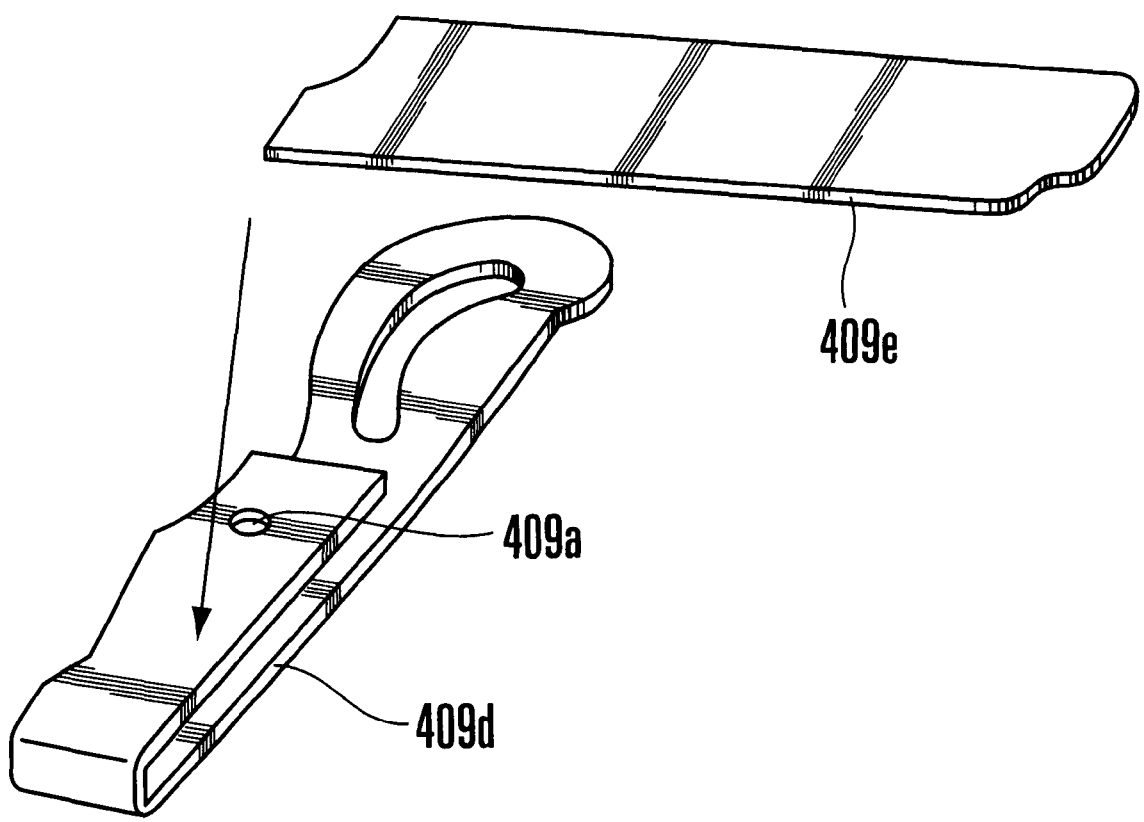
FIG. 32 is a schematic view showing a modification example of the fourth blade in the fourth and fifth embodiments.

In the case of a shutter curtain speed higher than 1/2000 sec, however, the fourth blade 409 can be arranged as shown in FIG. 32. In that case, a driven part 409*d* in which the cam slot 409*b* and the hole part 409*a* engaging the arm engaging pin 410 are formed are formed separately from the light-blocking part 409*e*. The light-blocking part 409*e* is formed with a resin sheet and the driven part with a metal or the like. The two parts are joined together by bonding or the like. The weight of the fourth blade 409 as a whole thus can be minimized to lessen an adverse effect of inertia.

In the fourth embodiment, the pin 402*a* provided on the cover member 402 (or the shutter base plate) is arranged to engage the cam slot 409*b* of the fourth blade 409. This arrangement, however, may be changed to form a cam slot in the cover member 402 and to arrange a pin on the fourth blade 409 to engage the cam slot.

FIGS. 26 to 31 show the arrangement of a focal plane shutter according to a fifth embodiment of the invention. The shutter is adapted for an optical apparatus such as a camera, an interchangeable lens, an image display apparatus arranged to store and display images recorded on a film.

Figure 26:
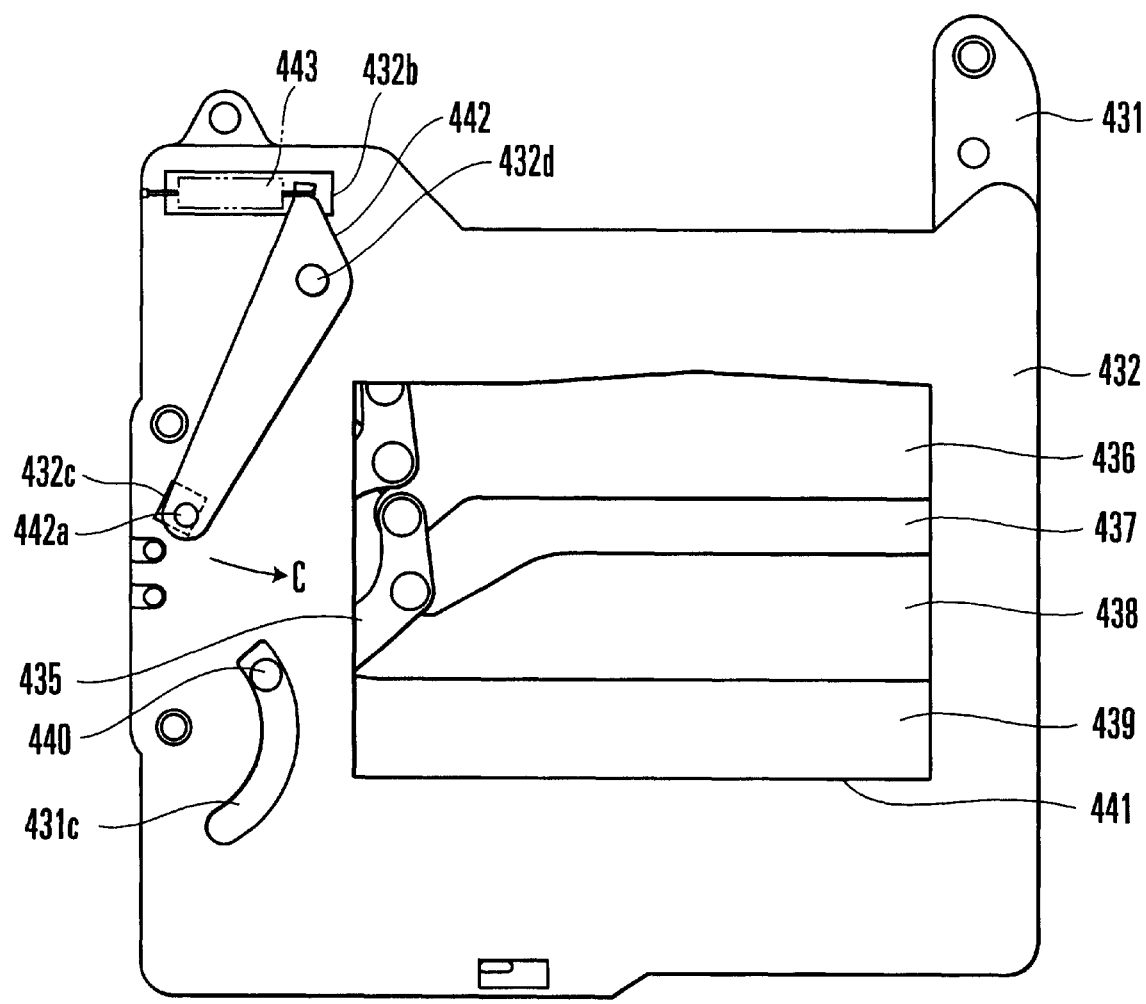
FIG. 26 is a front view showing the appearance of a focal plane shutter according to a fifth embodiment of the invention.
Figure 27:
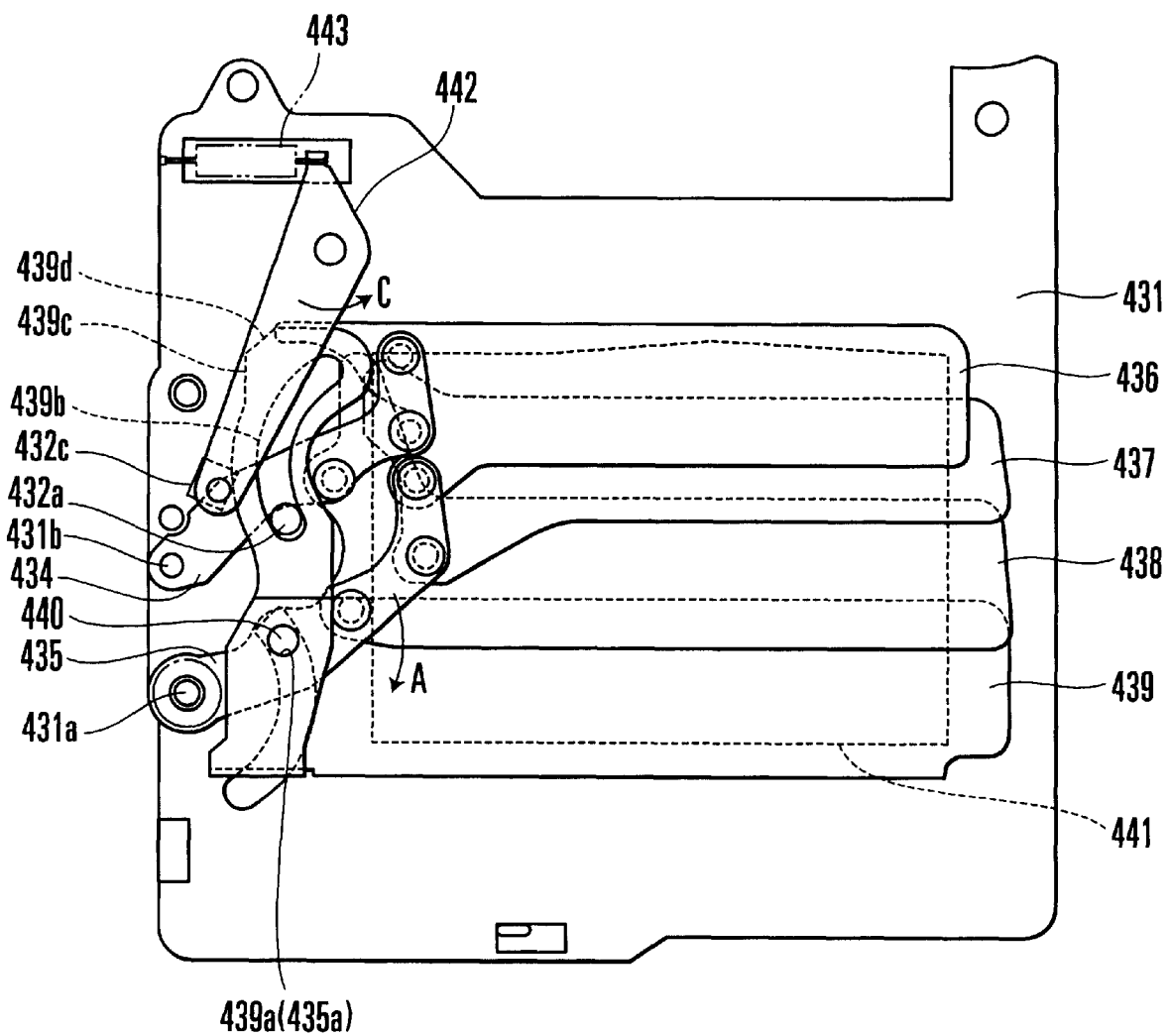
FIG. 27 is a front view showing the focal plane shutter according to the fifth embodiment in the leading-curtain spread state.
Figure 28:
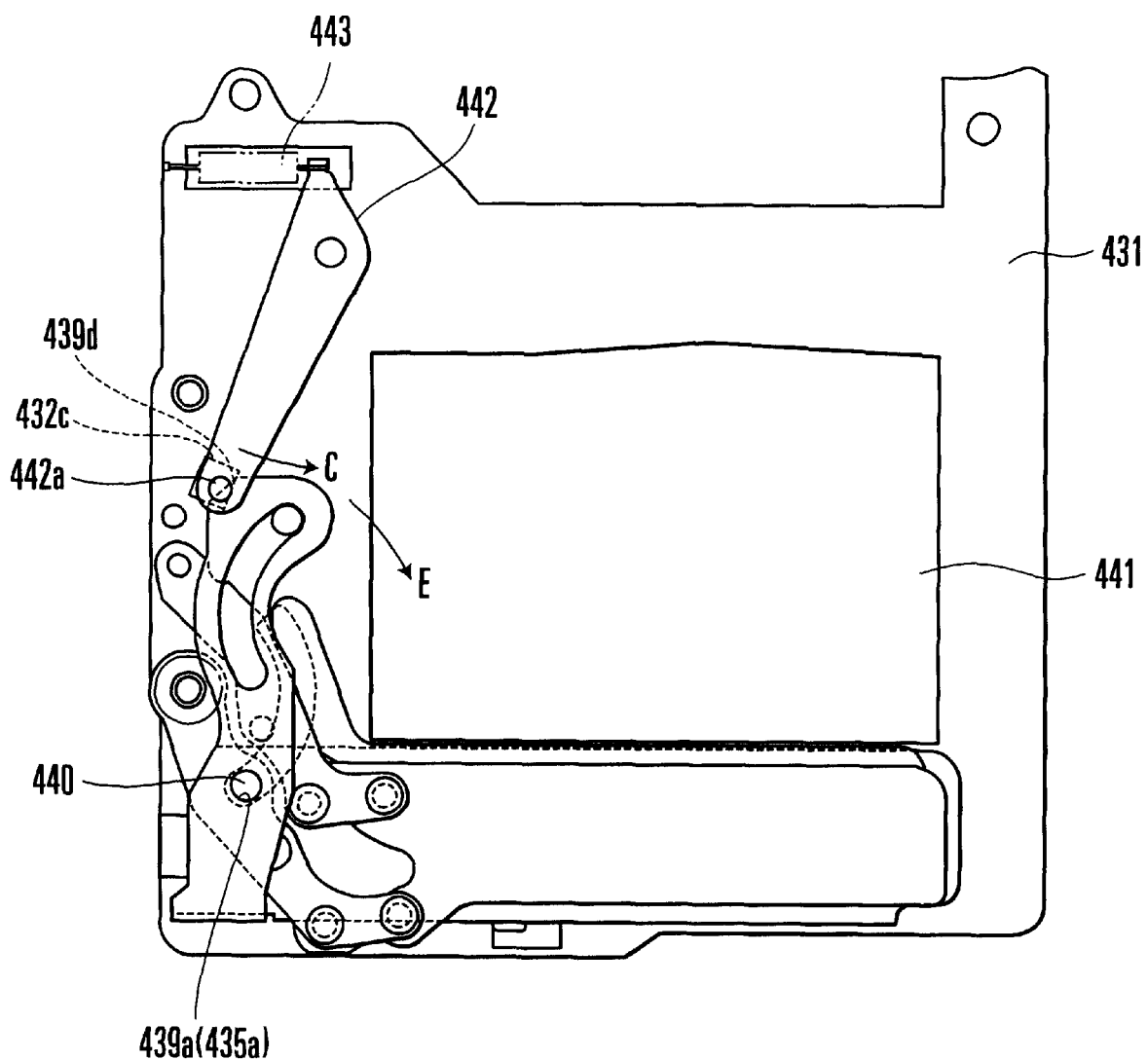
FIG. 28 is a front view showing the focal plane shutter according to the fifth embodiment in the leading-curtain superposed state.
Figure 29:
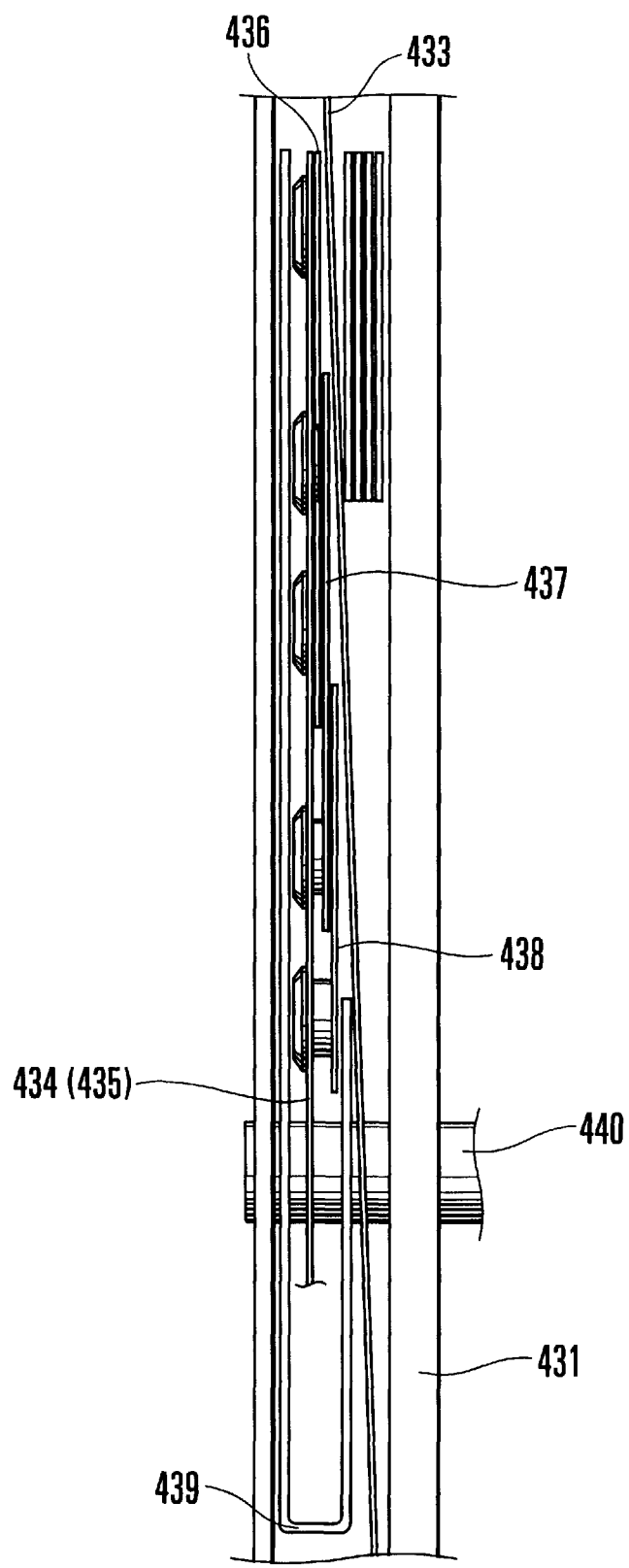
FIG. 29 is a side view showing the focal plane shutter according to the fifth embodiment in the leading-curtain spread state.
Figure 30:
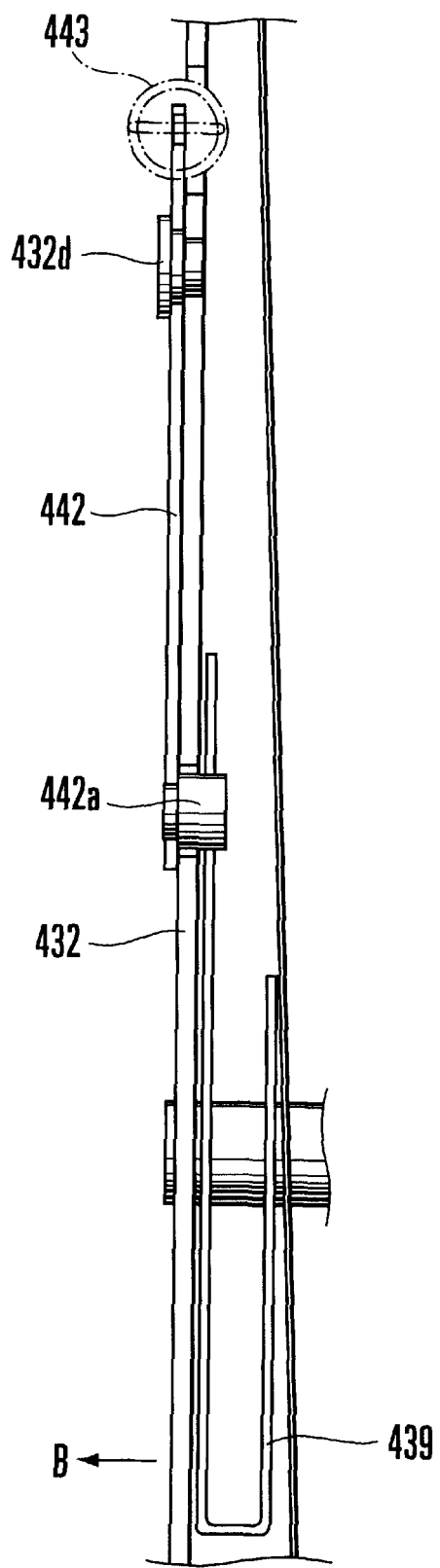
FIG. 30 is a side view showing, in the focal plane shutter according to the fifth embodiment, a state in which a fourth blade of the shutter engages a brake lever.
Figure 31:
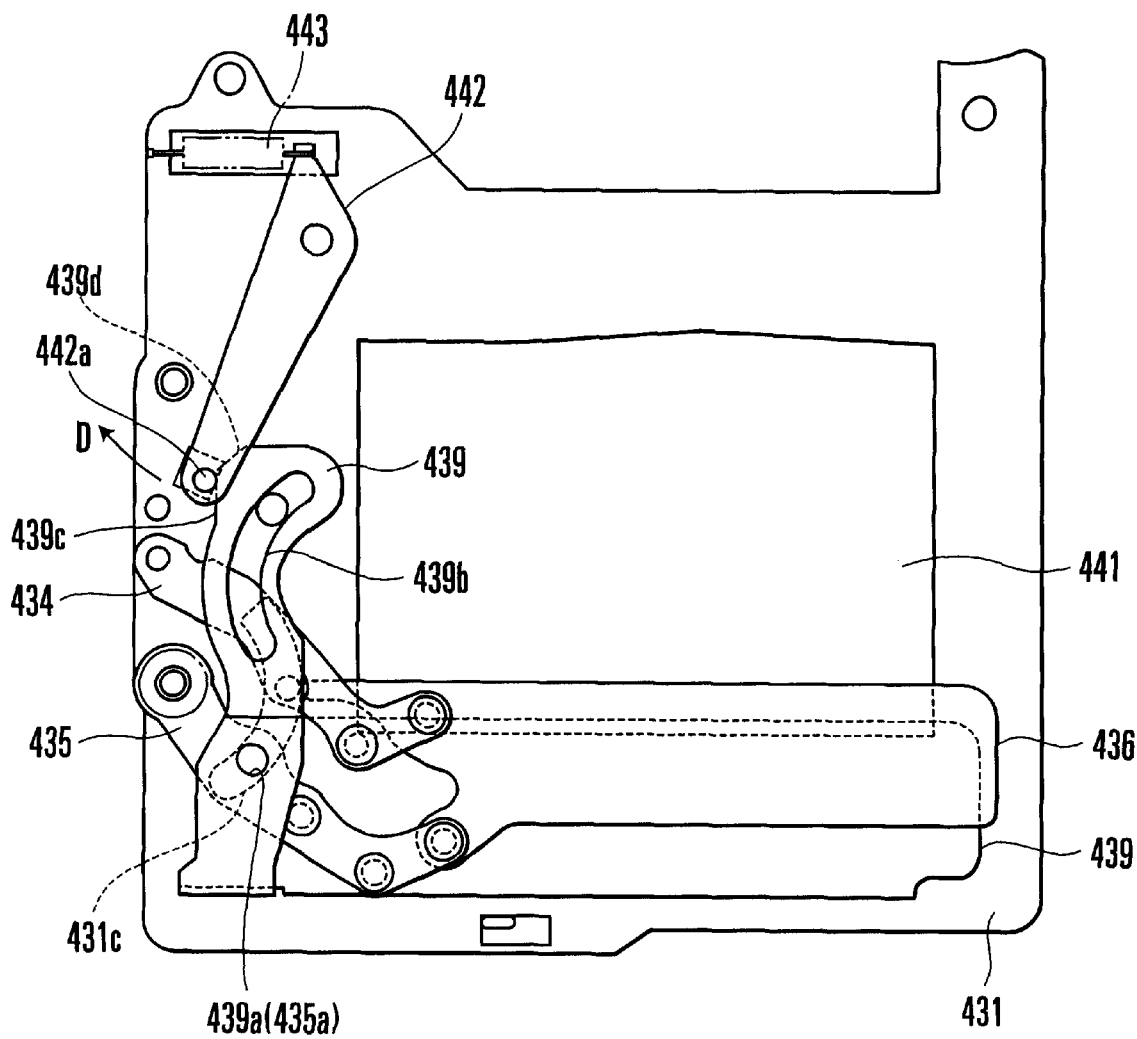
FIG. 31 is a front view showing, in the focal plane shutter according to the fifth embodiment, a state obtained when a braking load begins to act during the travel of the shutter.

FIG. 26 is a plan view showing the appearance of the shutter. FIGS. 27 and 29 show the shutter in a state of spreading the leading curtain of the shutter. FIG. 28 shows the shutter in a state of having shutter blades of the leading curtain superposed. FIG. 30 shows the shutter in a state of having a fourth blade 439 and a pin 432*a* engaging each other. FIG. 31 shows the shutter in a state obtained with a braking load beginning to act while the shutter is traveling.

The shutter is arranged to form an exposure slit over an aperture 441 by alternately causing a shutter blade group forming a leading curtain and a shutter blade group forming a trailing curtain to be spread and rag superposed. The leading curtain and the trailing curtain are arranged substantially in the same manner except that the shutter blade groups swing in the opposite directions in spreading and the spread and superposed states obtained before and after the shutter travel of one blade group are reverse to those of the other blade group. Therefore, the following description covers only the leading curtain, and the trailing curtain is omitted from the description.

The shutter according to the fifth embodiment is composed of a shutter base plate 431, a cover plate 432 which is fixed in position opposite to the shutter base plate 431 to form a space for shutter travel between them, a partition plate 433 which is arranged to partition the shutter travel space into a apace for the leading curtain and a space for the trailing curtain, a leading arm 435 and a trailing arm 434 which are mounted in a swingable manner respectively on shafts 431*a* and 431*b* provided on the shutter base plate 431, as shown in FIGS. 27 and 28, and a first blade 436, a second blade 437 and a third blade 438 which have their one end parts rotatably connected to the leading arm 435 and the trailing arm 434.

The shutter further has a shutter driving lever (not shown) swingably mounted on a shaft (not shown) which is coaxial with the shaft 431*a* of the shutter base plate 431 and is located on the surface of the shutter base plate 431 on its side opposite to the side on which the shutter travel space is formed, and a fourth blade 439 which is arranged to be driven together with the leading arm 435 by the swinging motion of the shutter driving lever.

The shutter is provided further with a brake lever 442 which is swingably supported by a shaft 432*d* on one side of the cover plate 432 opposite to the side on which the shutter travel space is formed, and a spring 443 which is arranged between the upper end of the brake lever 442 and the shutter base plate 431 to urge the brake lever 442 to rotate in the direction of an arrow C as shown in FIGS. 27 and 28.

The aperture 441, which is of an approximately rectangular shape, is formed in each of the shutter base plate 431 and the cover plate 432.

A parallel link mechanism is formed with the leading arm 435 and the trailing arm 434 in conjunction with the first blade 436, the second blade 437 and the third blade 438 which are connected to these arms 435 and 434. An arm engaging pin 440 which is provided on the shutter driving lever rotatably engages a hole part 435a formed in the leading arm 435.

Therefore, when the leading arm 435 is driven to swing by the swinging motion of the shutter driving lever, the parallel link mechanism allows the first, second and third blades 436, 437 and 438 to move (travel) in parallel and in the direction of the minor side of the aperture 441. The first blade 436 then forms a slit for an exposure by traveling with its slit forming end moving in parallel with the slit forming end of a first blade of the trailing curtain (not shown).

The shutter driving lever is elastically urged to move in the direction of an arrow A as viewed in FIG. 27 by a spring or the like (not shown). The arm engaging pin 440 provided on the shutter driving lever rotatably engages also a hole part 439a formed in the fourth blade 439. Therefore, the fourth blade 439 also travels when the shutter driving lever swings.

Further, the arm engaging pin 440 is fitted in a guide slot 431c formed in an arcuate shape in the shutter base plate 431.

The fourth blade 439 has a cam slot (a cam part) 439b engaging a pin (an engaging part) 432a which is provided on the cover plate 432. The cam engaging action of the cam slot 439b and the pin 432a controls the posture of the fourth blade 439 while the shutter is traveling.

Further, as shown also in FIG. 30, the fourth blade 439 has its sectional shape in a U shape which is arranged to stow the first, second and third blades 436, 437 and 438 therein when the group of shutter blades is in a superposed state. When the shutter blades 436 to 439 are in a superposed state as shown in FIG. 28, the arm engaging pin 440 is abutting on a pin abutting member (not shown) to prevent the shutter from traveling further.

The brake lever 442 has a pin 442a protruding into the shutter travel space from a hole part 432c formed in the cover plate 432. With the pin 442a abutting on an end surface in the direction of the arrow C of the hole part 432c, the swinging motion in the direction of the arrow C of the brake lever 442 urged by the urging force of the spring 443 is prevented to keep the brake lever 442 at its position shown in FIGS. 27 and 28.

With the shutter (the fifth embodiment) arranged in the above-mentioned manner, in allowing the shutter to travel by releasing the shutter blades 436 to 439 from a charged state (a spread state), the shutter operates as described below.

The shutter is charged and kept in the charged state in a conventionally known manner. For example, the shutter is charged by causing the shutter driving lever to swing in the direction opposite to the direction of the arrow A against an urging force. After charging, the charged state is retained by energizing a magnetic coil to attract an armature provided on the shutter driving lever.

The shutter can be allowed to begin to travel by deenergizing the magnetic coil to cancel the charged state.

The shutter driving lever is arranged to exert an urging force constantly on the leading arm 435 in the direction of the arrow A while the shutter is in all of the different states. Therefore, when the shutter travel is allowed to begin by releasing the shutter from the charged state shown in FIG. 27, the urging force causes the leading arm 435 to begin to swing in the direction of the arrow A.

Then, the swinging motion of the leading arm 435 causes the first, second and third blades 436, 437 and 438 to travel toward the superposed state shown in FIG. 28 while forming a slit in parallel with the major side of the aperture 441 perpendicular to the direction of shutter travel by virtue of the parallel link.

Meanwhile, since the urging force of the shutter driving lever in the direction of the arrow A is acting also on the fourth blade 439, the fourth blade 439 begins to travel at the same time as the commencement of travel by the first, second and third blades 436, 437 and 438. In this instance, the engagement of the cam slot 439b of the fourth blade 439 with the pin 432a of the cover plate 432 causes the fourth blade 439 to travel while varying its traveling attitude or posture.

As apparent from the comparison of FIG. 27 with FIG. 28, the amount of travel of the fourth blade 439 is smaller than that of each of the first, second and third blades 436, 437 and 438. Thus, the fourth blade 439 has the smallest amount of travel among all the shutter blades 436 to 439 and is driven at the slowest speed.

The shutter travel comes to a stop in a state of having the first, second and third blades 436, 437 and 438 stowed inside the U-shaped part of the fourth blade 439, as shown in FIG. 28.

When the travel of the shutter comes to a position shown in FIG. 31 which is near to the end of travel as shown in FIG. 28 after the commencement of the travel, the end part 439c of the fourth blade 439 abuts on the shaft 442a of the brake lever 442.

When the fourth blade 439 travels further from this position, the end part 439c causes the brake lever 442 through its shaft 442a to swing in the direction of an arrow D against the urging force of the spring 443 in the direction of the arrow C (see FIG. 31). After the abutting contact of the end part 439c of the fourth blade 439 on the shaft 442a of the brake lever 442, the urging force in the direction of the arrow C of the spring 443 becomes a resistance to the travel of the fourth blade 439 and thus acts as a braking force immediately before the shutter travel comes to a stop.

The brake arrangement effectively prevents an impact or a hitting noise from taking place when the arm engaging pin 440 abuts on the pin abutting member, as shown in FIG. 28.

Further, in the fifth embodiment, an end part 439d which is at an angle different from the angle of the end part 439c is formed on the upper side of the end part 439c of the fourth blade 439. This end part 439c is arranged to cause the shaft part 442a of the brake lever 442 to abut thereon after the shutter travel comes to a stop. The end part 439c is thus arranged to allow the urging force of the spring 443 to push the fourth blade 439 to swing on the arm engaging pin 440 in the direction of an arrow E.

By this, after the stop of shutter travel, the fourth blade 439 is biased or offset in the direction of parting from the lower end of the aperture 441, so that possible fluctuations in position after the shutter travel due to play of connection or engagement of members within the shutter can be minimized.

The fourth blade 439 in the fifth embodiment is formed in one body and in a U shape for stowing therein the first, second and third blades 436, 437 and 438. This arrangement, however, may be changed to form the fourth blade 439 by forming the driven part which engages the arm engaging pin 440 of the shutter driving lever separately from the light-blocking part and, after that, to join the two parts together, by bonding or the like, as in the case of the arrangement of the fourth embodiment described above referring to FIG. 32.

In that instance, the driven part and the light-blocking part may be made of different materials. For example, the driven part may be formed with metal or a light alloy such as duralumin to increase strength or durability and the light-blocking part with an opaque resin sheet for reduction in weight.

FIGS. 33 to 37 show the arrangement of a focal plane shutter according to a sixth embodiment of the invention. The shutter is adapted for an optical apparatus such as a camera, an interchangeable lens, an image display apparatus arranged to store and display images recorded on a film.

Figure 33:
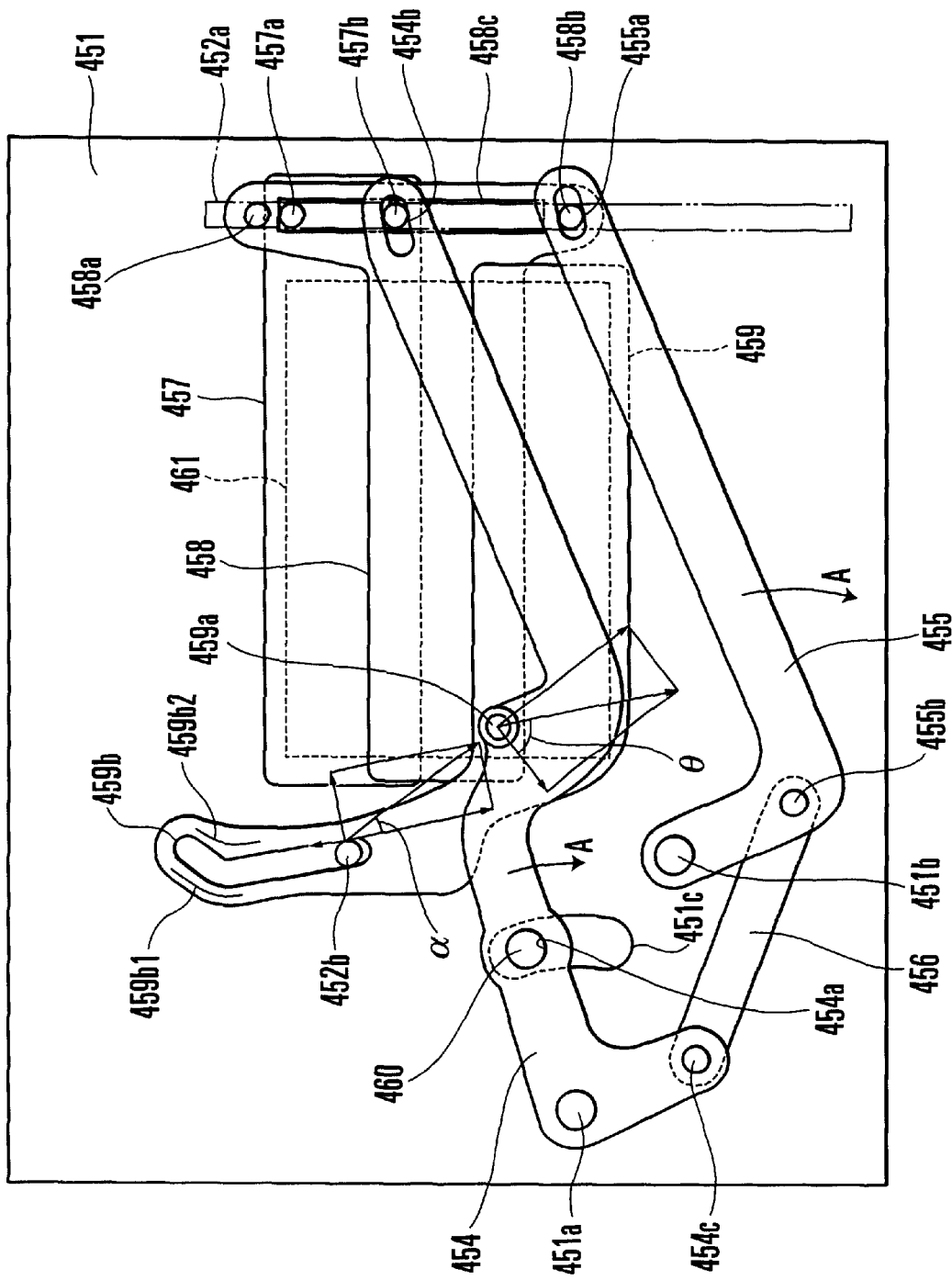
FIG. 33 is a front view showing a focal plane shutter according to a sixth embodiment of the invention in the leading-curtain spread state.
Figure 34:
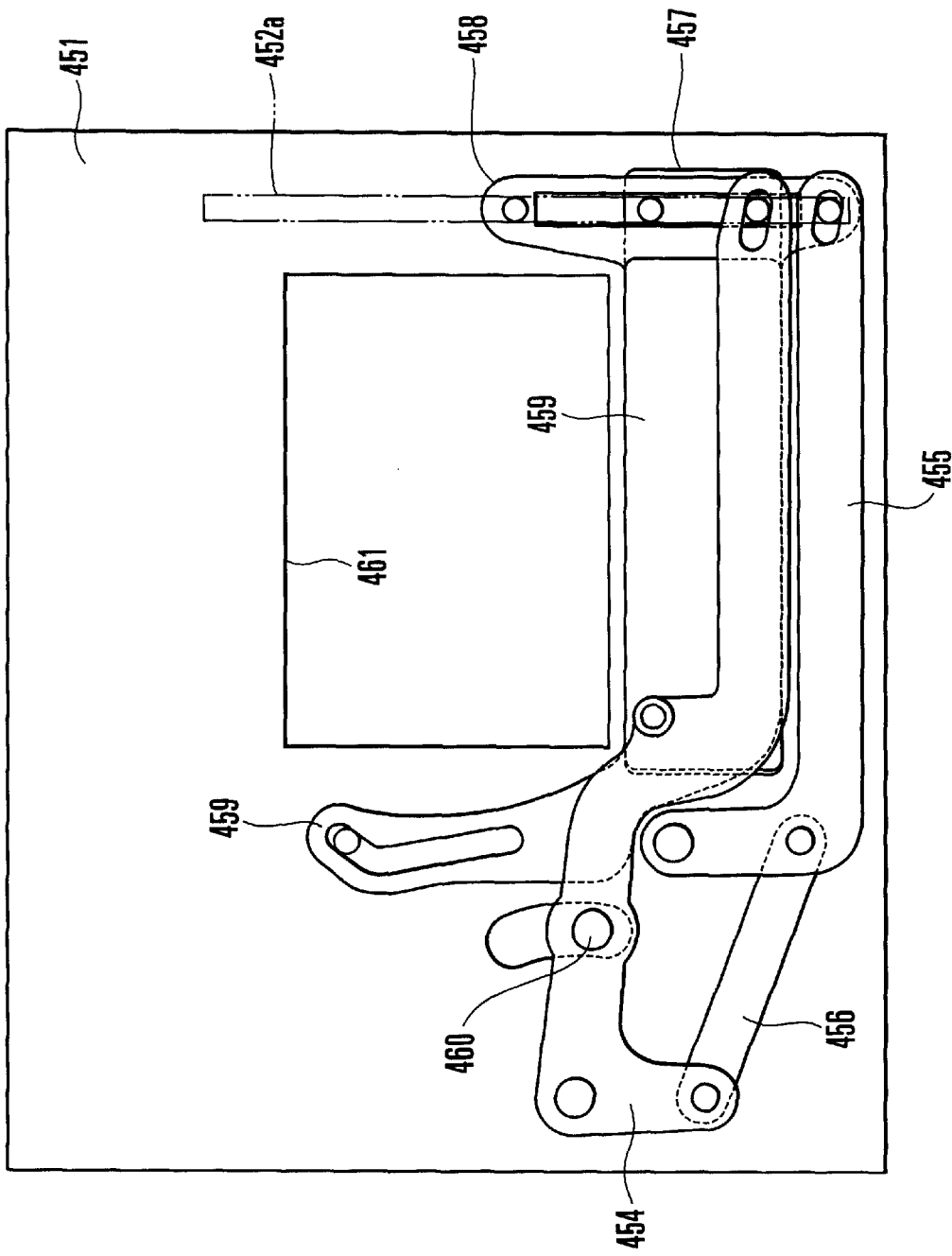
FIG. 34 is a front view showing the focal plane shutter according to the sixth embodiment in the leading-curtain superposed state.
Figure 35:
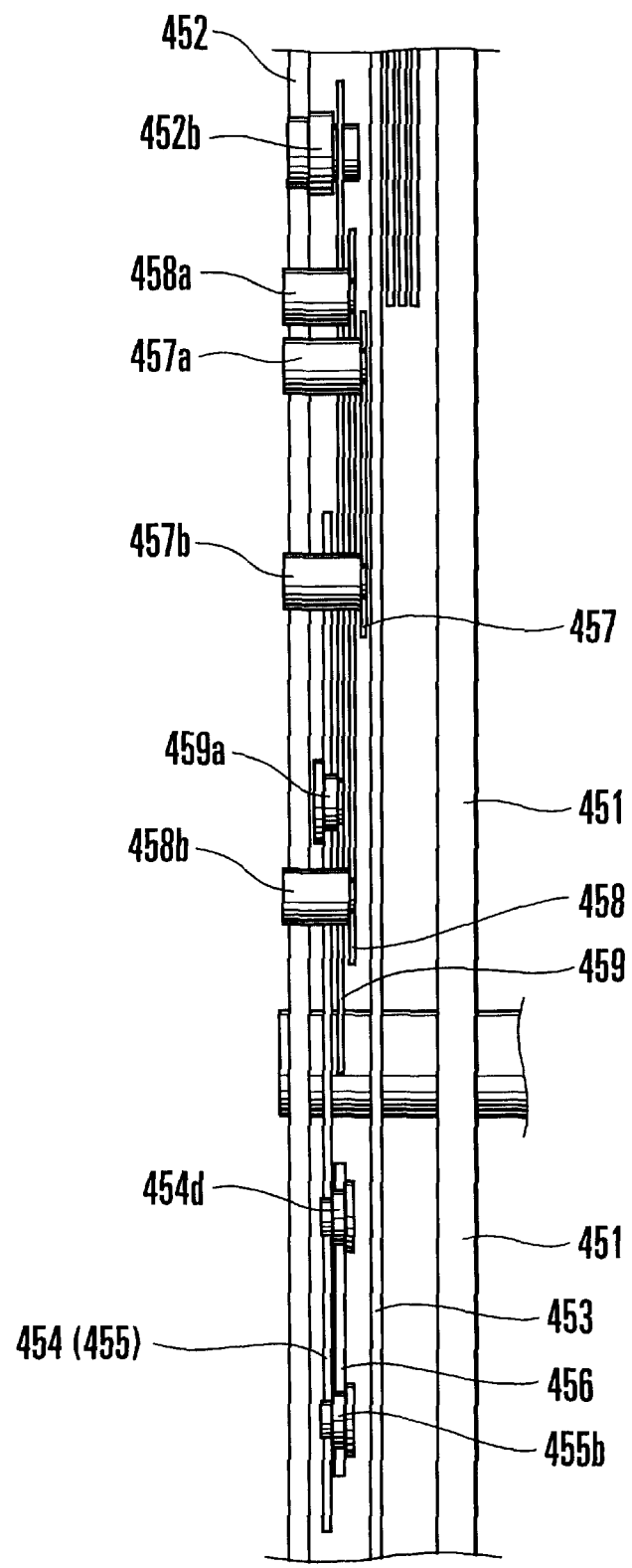
FIG. 35 is a side view showing the focal plane shutter according to the sixth embodiment in the leading-curtain spread state.
Figure 36:
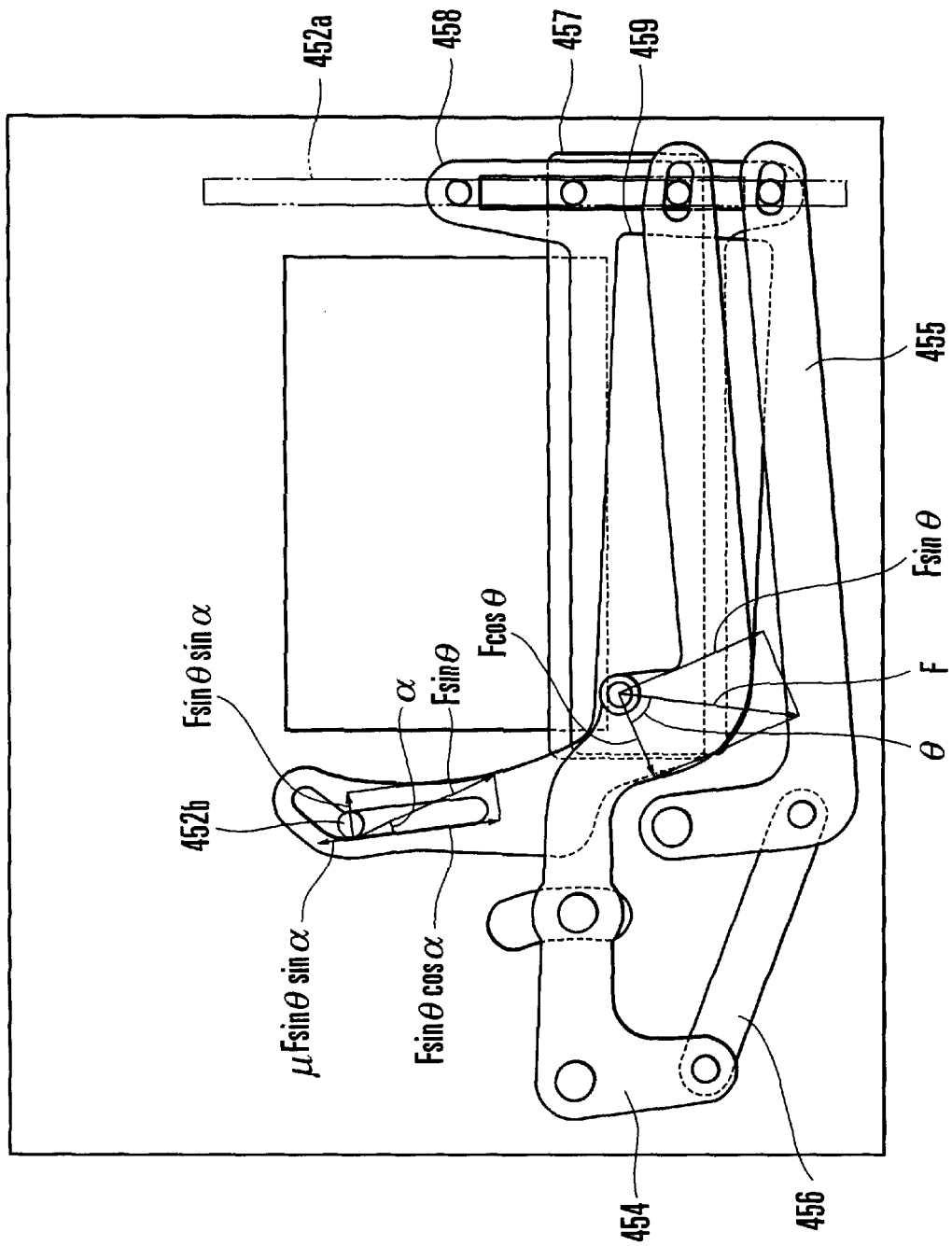
FIG. 36 is a front view showing, in the focal plane shutter according to the sixth embodiment, a force relationship obtained in the state where the shutter is traveling under a small amount of load.
Figure 37:
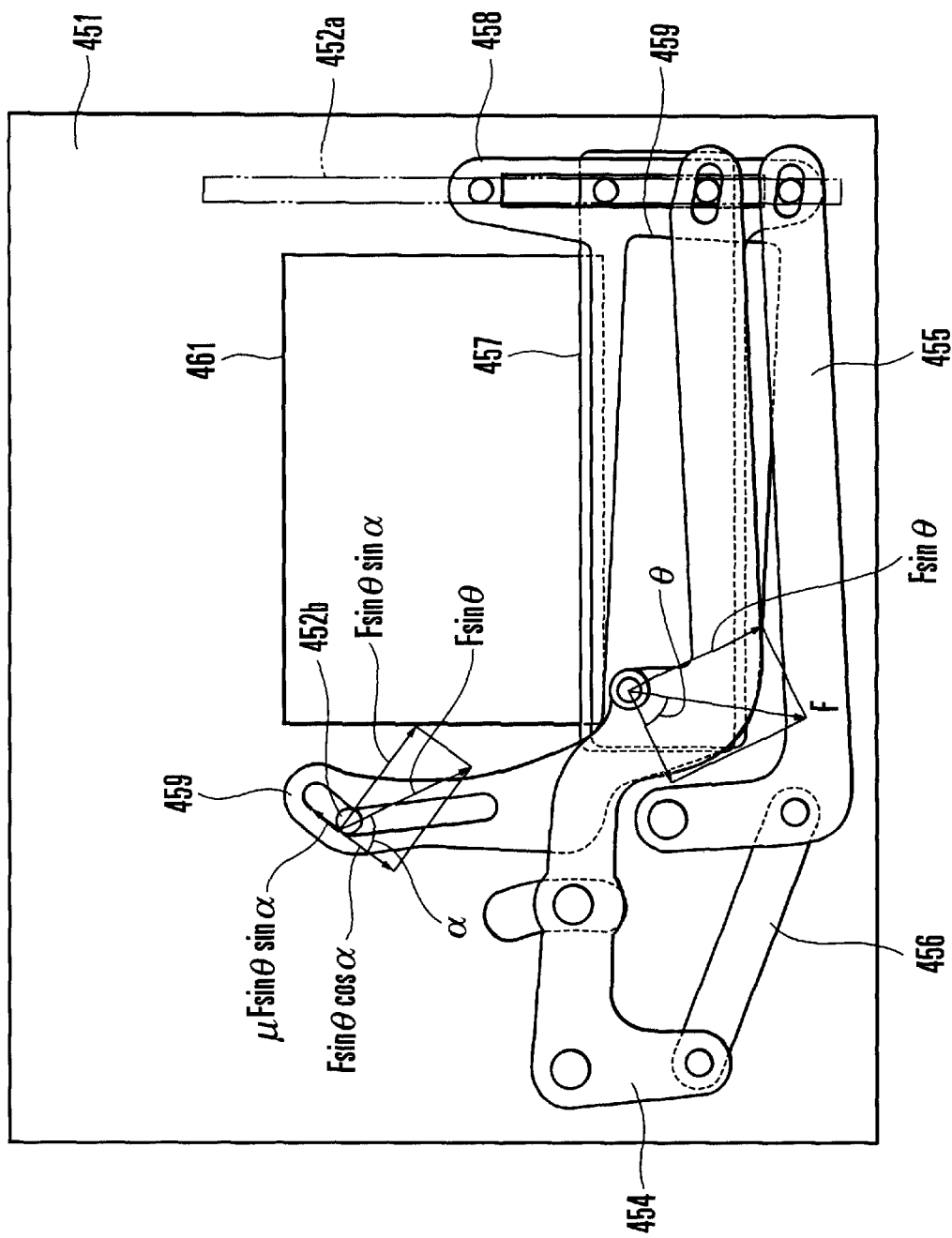
FIG. 37 is a front view showing, in the focal plane shutter according to the sixth embodiment, a force relationship obtained when a braking load begins to act during the travel of the shutter.

FIGS. 33 and 35 show the shutter in a state of spreading its leading curtain. FIG. 34 shows the shutter in a state of having shutter blades of the leading curtain superposed. FIG. 36 shows a force relationship obtained when the shutter is traveling under a small load. FIG. 37 shows the shutter in a state obtained with a braking load beginning to act while the shutter is traveling.

The shutter is arranged to form an exposure slit over an aperture 461 by alternately causing a shutter blade group forming a leading curtain and a shutter blade group forming a trailing curtain to be spread and superposed. The leading curtain and the trailing curtain are arranged substantially in the same manner except that the shutter blade groups swing in the opposite directions in spreading and that the spread and superposed states obtained before and after the shutter travel of one blade group are reverse to those of the other blade group. Therefore, the following description covers only the leading curtain, and the trailing curtain is omitted from the description.

The shutter according to the sixth embodiment is composed of a shutter base plate 451, a cover plate 452 which is fixed in position opposite to the shutter base plate 451 to form a space for shutter travel between them, a partition plate 453 which is arranged to partition the shutter travel space into a apace for the leading curtain and a space for the trailing curtain, first and second arms 454 and 455 which are mounted respectively on shafts 451*a* and 451*b* on the shutter base plate 451 in such a way as to be swingable thereon as shown in FIG. 33, and a connection lever 456 which has one end thereof swingably connected to a shaft 454*c* provided on the first arm 454 and the other end thereof connected to a shaft 455*b* provided on the second arm 455, and first and second blades 457 and 458 which are arranged to be driven respectively by the first arm 454 and the second arm 455.

The shutter further has a shutter driving lever (not shown) swingably mounted on a shaft (not shown) which is coaxial with the shaft 451*a* of the shutter base plate 451 and is located on the surface of the shutter base plate 451 on its side opposite to the side on which the shutter travel space is formed, and a third blade 459 which is arranged to be driven by the first arm 454 when the shutter driving lever makes a swinging motion.

The aperture 461, which is of an approximately rectangular shape, is formed in each of the shutter base plate 451 and the cover plate 452.

The first blade 457 is provided with shafts 457*a* and 457*b* at upper and lower positions at one end thereof. These shafts 457*a* and 457*b* engage a shutter guide 452*a* which is formed to vertically extend in the cover plate 452. The shaft 457*b* further engages a slot part 454*b* formed at one end of the first arm 454.

The second blade 458 is provided with shafts 458*a* and 458*b* at upper and lower positions at one end thereof. These shafts 458*a* and 458*b* also engage the shutter guide 452*a* of the cover plate 452. The shaft 458*b* further engages a slot part 455*a* formed at one end of the second arm 455.

Further, an arm engaging pin 460 which is provided on the shutter driving lever engages a hole part 454*a* formed in the first arm 454.

Therefore, when the first arm 454 is driven to swing by the swinging motion of the shutter driving lever, a link mechanism composed of the first and second arms 454 and 455 and the connection lever 456 allows the first and second blades 457 and 458 to move (travel) in parallel and in the direction of the minor side of the aperture 461, along the shutter guide 452*a*.

The first blade 457 then forms a slit for an exposure by traveling with its slit forming end moving in parallel with the slit forming end of a first blade of the trailing curtain (not shown).

A shaft 459*a* which is provided on the third blade 459 is connected to the first arm 454 to be rotatable thereon. A pin (an engaging part) 452*b* which is provided on the cover plate 452 engages a cam slot 459*b* formed in the third blade 459.

Therefore, when the first arm 454 is driven to swing by the swinging motion of the shutter driving lever, the third blade 459 is driven to travel. The traveling attitude or posture of the third blade 459 is controlled by the cam engagement of the cam slot 459*b* and the pin 452*b*.

When the shutter blades 457 to 459 are in a superposed state shown in FIG. 34, the arm engaging pin 460 is abutting on a pin abutting member (not shown) to prevent the shutter from traveling further.

The shutter driving lever is elastically urged by a spring or the like to move in the direction of an arrow A shown in FIG. 33. The arm engaging pin 460 on the shutter driving lever is inserted into an arcuate guide slot 451*c* formed in the shutter base plate 451. The maximum swingable range is defined by the abutment of the arm engaging pin 460 on the two end parts of the guide slot 451*c*.

With the shutter (the sixth embodiment) arranged in the above-mentioned manner, in allowing the shutter to travel by releasing the shutter blades 457 to 459 from a charged state (spread state), the shutter operates as described below.

The shutter is charged and kept in the charged state in a conventionally known manner. For example, the shutter is charged by causing the shutter driving lever to swing in the direction opposite to the direction of the arrow A against an urging force. After charging, the charged state is retained by energizing a magnetic coil to attract an armature provided on the shutter driving lever.

The shutter can be allowed to begin to travel by deenergizing the magnetic coil to cancel the charged state.

The shutter driving lever is arranged to exert an urging force, through the arm engaging pin 460, constantly on the first arm 454 in the direction of the arrow A while the shutter is in all of the different states. Therefore, when the shutter travel is allowed to begin by releasing the shutter from the charged state shown in FIG. 33, the urging force causes the first arm 454 to begin to swing in the direction of the arrow A.

Then, the swinging motion of the first arm 454 causes the first and second blades 457 and 458 to travel toward the superposed state shown in FIG. 34 while being guided by the shutter guide 452*a* and while forming a slit in parallel with the major side of the aperture 461 perpendicular to the direction of shutter travel by virtue of the parallel link.

Meanwhile, the third blade 459 which is connected to the first arm 454 also begins to travel at the same time as the commencement of travel by the first and second blades 457 and 458. In this instance, the cam engagement of the cam slot 459*b* with the pin 452*b* of the cover plate 452 causes the third blade 459 to travel while varying its traveling attitude or posture.

As apparent from the comparison of FIG. 33 with FIG. 34, the amount of travel of the third blade 459 is smaller than that of each of the first and second blades 457 and 458. Thus, the fourth blade 439 has the smallest amount of travel among all the shutter blades 457 to 459 and is driven at the slowest speed.

Travel resistance taking place between the pin 452*b* and the cam slot 459*b* at the third blade 459 while the shutter is in process of travel varies as described below with reference to FIGS. 36 and 37.

Assuming that a driving force exerted on the arm engaging pin 460 in each of states taking place while the shutter is traveling is F, an effective component F' of the driving force F acting on the third blade 459 can be expressed, according to FIGS. 36 and 37, as follows:

$$F' = F \sin \theta \cos \alpha - \mu F \sin \theta \sin \alpha$$

In the right-hand side of the above formula, the second term "$\mu$ F sin $\theta$ sin $\alpha$" represents a sliding frictional force between the cam slot 459*b* and the pin 452*b*, and "$\mu$" represents a coefficient of friction.

When the effective component F' is at a negative value, the fictional force "$\mu$ F sin $\theta$ sin $\alpha$" becomes a value larger than a component force "F sin $\theta$ sin $\alpha$" causing the cam slot 459*b* to move along the pin 452*b*. Then, the third blade 459 might cease to travel. However, by setting an angle $\alpha$ shown in the formula above at such a value at which a kinetic energy given by the driving force F of the arm engaging pin 460 can be absorbed by the sliding friction term "$\mu$ F sin $\theta$ sin $\alpha$". Then, the kinetic energy can be arranged to act as a braking force immediately before the shutter travel comes to a stop.

In the case of the sixth embodiment, the value of the term "$\mu$ F sin $\theta$ sin $\alpha$" is arranged to be suddenly increased by varying the angles $\alpha$ and $\theta$ during a period of time between the state shown in FIG. 36 and the state shown in FIG. 37. The arrangement is such that a frictional resistance force against the driving force component in the traveling direction of the cam slot 459*b* is increased to let the frictional resistance of the cam slot 459*b* act as a braking force.

The brake arrangement effectively prevents an impact or a hitting noise from taking place when the arm engaging pin 460 abuts on the pin abutting member.

The above-stated brake applying action is arranged, through the shape of the cam slot 459*b*, to be performed when the leading curtain is allowed to travel from its spread state to its superposed state, i.e., when the charged state is canceled. However, if the brake action is arranged to be performed likewise also in charging the shutter, the charging action would be affected by such a brake applying action.

However, some amount of clearance is necessary for sliding contact between the pin 452*b* and the cam slot 459*b*. Therefore, the clearance exists when the third blade 459 travels and also in charging the shutter. The sixth embodiment is arranged, therefore, to generate some resistance at one side surface 459*b*1 of the cam slot 459*b*, at the time of travel, and at the other side surface 459*b*2 of the cam slot 459*b* in charging the shutter.

In this respect, the coefficient of friction of the side surface 459*b*2 of the cam slot 459*b* is set to be smaller than that of the side surface 459*b*1. The resistance taking place in charging the shutter can be lessened by applying a low friction treatment with, for example, a solid lubricant to make it different from the resistance taking place at the time of shutter travel. Therefore, the shutter can be smoothly charged by thus lowering the resistance of each of the shutter blades 457 to 459.

Generally, shutter blades are made of an opaque resin sheet material for reduction in weight. However, the third blade 459 in the sixth embodiment must have some strength and durability as it is provided with the cam slot 459*b* for bringing about a braking force during the travel of the shutter and a part for connection with the first arm 454. To meet this requirement, the third blade 459 is preferably made of for example a metal material or a light alloy such as duralumin and formed in one body.

In such a case, the weight of the third blade 459 becomes heavier than a blade made of a resin sheet material. However, since the travel speed of the third blade 459 is the lowest of all the blades 457 to 459, the inertia which becomes resistance to the shutter travel is small.

In a case where a higher shutter curtain speed is desired, however, the third blade 459 can be arranged as shown in FIG. 32 which relates to the fourth embodiment. In that case, a driven part including the cam slot 459*b* and the part for connection with the first arm 454 is formed separately from a light-blocking part. The light-blocking part is formed with a resin sheet and the driven part with a metal or the like. The two parts are joined together by bonding or the like. The weight of the third blade 459 as a whole thus can be minimized to lessen an adverse effect of inertia.

In the sixth embodiment, the pin 452*b* provided on the cover member 452 (or the shutter base plate) is arranged to engage the cam slot 459*b* formed in the third blade 459. This arrangement, however, may be changed to form a cam slot in the cover member 452 and to arrange a pin on the third blade 459 to engage the cam slot.

In accordance with the invention as described above, a focal plane shutter is arranged as follows. A plurality of link driven blades are arranged as a light-blocking blade group to be driven to travel by a link forming member. One of the light-blocking blade group is arranged to be driven by the link forming member at the lowest speed among these blades. Brake means is arranged to apply a braking force to the blade of the lowest travel speed in such a way as to lower the speed of travel of the light-blocking blade group when the travel of the light-blocking blade group comes near to the end of the travel. The arrangement not only effectively suppresses an increase in number of necessary parts, generation of heat and impact or hitting sound, at the end of the travel, but also permits a structural simplification of the shutter.

Besides, the blade of the lowest travel speed is selected, from among others, as a light-blocking blade to which the braking force is to be applied. Therefore, the resistance caused by inertia at the time of travel of the shutter can be lessened to minimize its adverse effect on the shutter speed.

Further, with this brake means composed of an urging mechanism which is arranged to abut on the blade of the lowest speed at a time point near to the end of the travel of the light-blocking blade group to apply, to the blade of the lowest speed, an urging force in a direction opposite to the direction of travel, the positions of the light-blocking blades at the end of travel can be stabilized by allowing the urging mechanism to abut on the blade of the lowest speed in such a way as to apply the urging force in the direction of travel.

What is claimed is:

1. A shutter device comprising:

a shutter base plate having an aperture part and a protruding part;

a first shutter blade member arranged to travel a predetermined movement distance over the aperture part;

a second shutter blade member arranged to travel a movement distance shorter that the predetermined movement distance of travel of said first shutter blade member over the aperture part said second shutter blade member having a slot engaging the protruding part, said slot being formed in a curved shape;

a first arm member having one end part thereof pivotally supported by said shutter base plate and another end part thereof supporting said first shutter blade member in a swingable manner; and a second arm member having one end part thereof pivotally supported by said shutter base plate and another end part thereof supporting said first shutter blade member in a swingable manner, said second arm member being connected to said second shutter blade member, wherein said first shutter blade member and said second shutter blade member are caused to travel over the aperture part by said second arm member being driven.

2. A shutter device according to claim 1, wherein a connecting part of said second arm member where said second arm member is connected to said second shutter blade member is located between the one end part and the other end part of said second arm member.

3. A shutter device according to claim 1, wherein said first shutter blade member includes a plurality of blade members.

4. A shutter device according to claim 1, wherein the slot of said second shutter blade member has such a shape as to impart a predetermined frictional force to said second shutter blade member in the middle of travel of said second shutter blade member.

5. A shutter device according to claim 1, wherein a part of said second shutter blade member having the slot formed therein has a greater strength than a part of said second shutter blade member arranged to travel over the aperture part.

6. A shutter device according to claim 5, wherein the part of said second shutter blade member having the slot formed therein is thicker than the part of said second shutter blade member arranged to travel over the aperture part.

7. A shutter device according to claim 1, wherein said second shutter blade member has a greater strength than said first shutter blade member.

8. A shutter device according to claim 1, further comprising an imparting member arranged to impart a braking force to said second shutter blade member in the middle of travel of said second shutter blade member.

9. A shutter device according to claim 1, wherein said first shutter blade member and said second shutter blade member are in such oblong shapes that longitudinally extend in a direction perpendicular to a travel direction thereof, and are always parallel with each other with respect to the longitudinal direction.

10. A shutter device according to claim 1, wherein said shutter device is a focal plane shutter disposed in an image plane position.

11. A shutter device comprising:

a shutter base plate having an aperture part;

a first shutter blade member arranged to Travel a predetermined movement distance over the aperture part;

a second shutter blade member arranged to travel a movement distance shorter than the predetermined movement distance of travel of said first shutter blade member over the aperture part, said first shutter blade member and said second shutter blade member traveling over the aperture part in a state of being linked to each other;

imparting means for imparting a braking action to said second shutter blade member in the middle of the travel of said second shutter blade; and wherein said shutter base plate is provided with a protruding part, and said second shutter blade member is provided with a slot engaging the protruding part.

12. A shutter device according to claim 11, further comprising:

a first arm member having one end part thereof pivotally supported by said shutter base plate and another end part thereof supporting said first shutter blade member in a swingable manner; and a second arm member having one end part thereof pivotally supported by said shutter base plate and another end part thereof supporting said first shutter blade member in a swingable manner, said second arm member being connected to said second shutter blade member, wherein said first shutter blade member and said second shutter blade member are caused to travel over the aperture part by said second arm member being driven.

13. A shutter device according to claim 11, wherein said first shutter blade member and said second shutter blade member are in such oblong shapes that longitudinal extend in a direction perpendicular to a travel direction thereof, and are parallel with each other with respect to the longitudinal direction at least at a travel starting position or a travel ending position.

14. A shutter device comprising:

a shutter base plate having an aperture part;

a first shutter blade member arranged to travel a predetermined movement distance over the aperture part;

a second shutter blade member arranged to travel a movement distance shorter than the predetermined movement distance of travel of said first shutter blade member over the aperture part, said first shutter blade member and said second shutter blade member traveling over the aperture part in a state of being linked to each other; and imparting means for imparting a braking action to said second shutter blade member the middle of the travel of said second shutter blade;

wherein said shutter base plate is provided with a protruding part, and said second shutter blade member is provided with a slot engaging the protruding part; and wherein the slot of said second shutter blade member is formed in such a shape as to impart the braking action to said second shutter blade member in the middle of travel of said second shutter blade member.

* * * * *

UNITED STATES PATENT AND TRADEMARK OFFICE
CERTIFICATE OF CORRECTION

PATENT NO. : 6,474,880 B2
DATED : November 5, 2002
INVENTOR(S) : Yasuhiro Toyoda et al.

It is certified that error appears in the above-identified patent and that said Letters Patent is hereby corrected as shown below:

<u>Column 6,</u>
Line 60, delete "ℓe" and insert in boldface -- le --.

<u>Column 19,</u>
Line 33, delete "Sill" and insert -- S111 --.

<u>Column 34,</u>
Line 3, delete "Travel" and insert -- travel --.

Signed and Sealed this

Fourteenth Day of October, 2003

JAMES E. ROGAN
*Director of the United States Patent and Trademark Office*